US012077713B2

(12) United States Patent
Abbott et al.

(10) Patent No.: US 12,077,713 B2
(45) Date of Patent: *Sep. 3, 2024

(54) CIRCULAR CHEMICALS OR POLYMERS FROM PYROLYZED PLASTIC WASTE AND THE USE OF MASS BALANCE ACCOUNTING TO ALLOW FOR CREDITING THE RESULTANT PRODUCTS AS CIRCULAR

(71) Applicant: Chevron Phillips Chemical Company LP, The Woodlands, TX (US)

(72) Inventors: Ronald G. Abbott, Kingwood, TX (US); Scott G. Morrison, Kingwood, TX (US); Steven R. Horlacher, League City, TX (US); Jamie N. Sutherland, Kingwood, TX (US); Bruce D. Murray, Kingwood, TX (US); Jacob M. Hilbrich, Cleveland, TX (US); Charles T. Polito, Humble, TX (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/449,865

(22) Filed: Aug. 15, 2023

(65) Prior Publication Data

US 2023/0407183 A1    Dec. 21, 2023

Related U.S. Application Data

(63) Continuation of application No. 18/173,196, filed on Feb. 23, 2023, now Pat. No. 11,746,297, which is a
(Continued)

(51) Int. Cl.
*C10B 53/07* (2006.01)
*C10G 45/26* (2006.01)
(Continued)

(52) U.S. Cl.
CPC .............. *C10B 53/07* (2013.01); *C10G 45/26* (2013.01); *C10G 45/50* (2013.01); *C10G 51/023* (2013.01);
(Continued)

(58) Field of Classification Search
CPC ........ C10B 53/07; C10G 45/26; C10G 45/50; C10G 51/023; C10G 57/02;
(Continued)

(56) References Cited

U.S. PATENT DOCUMENTS

| | | |
|---|---|---|
| 3,901,961 A | 8/1975 | Hiroki |
| 4,851,601 A | 7/1989 | Fukuda |

(Continued)

FOREIGN PATENT DOCUMENTS

| | | |
|---|---|---|
| CA | 2202941 | 10/1978 |
| EP | 0607862 A1 | 7/1994 |

(Continued)

OTHER PUBLICATIONS

"Cracking the Problem of Waste Plastic." ISCC Press Release dated Apr. 15, 2019. https://www.iscc-system.org/cracking-the-problem-of-waste-plastics/.

(Continued)

*Primary Examiner* — Brian A McCaig
(74) *Attorney, Agent, or Firm* — Eversheds Sutherland (US) LLP

(57) ABSTRACT

This disclosure relates to the production of chemicals and plastics using pyrolysis oil from the pyrolysis of plastic waste as a co-feedstock along with a petroleum-based, fossil fuel-based, or bio-based feedstock. In an aspect, the polymers and chemicals produced according to this disclosure can be certified under International Sustainability and Carbon Certification (ISCC) provisions as circular polymers and chemicals at any point along complex chemical reaction (Continued)

pathways. The use of a mass balance approach which attributes the pounds of pyrolyzed plastic products derived from pyrolysis oil to any output stream of a given unit has been developed, which permits ISCC certification agency approval.

37 Claims, 2 Drawing Sheets

Related U.S. Application Data continuation of application No. 17/934,619, filed on Sep. 23, 2022, now Pat. No. 11,618,855, which is a continuation of application No. 17/487,714, filed on Sep. 28, 2021, now Pat. No. 11,479,726.

(60) Provisional application No. 63/084,311, filed on Sep. 28, 2020.

(51) Int. Cl.
    *C10G 45/50*     (2006.01)
    *C10G 51/02*     (2006.01)
    *C10G 57/02*     (2006.01)

(52) U.S. Cl.
    CPC ..... *C10G 57/02* (2013.01); *C10G 2300/1003* (2013.01); *C10G 2400/04* (2013.01); *C10G 2400/06* (2013.01); *C10G 2400/20* (2013.01); *C10G 2400/22* (2013.01); *C10G 2400/28* (2013.01); *C10G 2400/30* (2013.01)

(58) Field of Classification Search
    CPC ........ C10G 2300/1003; C10G 2400/04; C10G 2400/06; C10G 2400/20; C10G 2400/22; C10G 2400/28; C10G 2400/30
    See application file for complete search history.

(56) References Cited

U.S. PATENT DOCUMENTS

| | | | |
|---|---|---|---|
| 5,216,149 A | 6/1993 | Evans | |
| 5,253,479 A | 10/1993 | Di Cintio | |
| 5,300,704 A | 4/1994 | Evans | |
| 5,321,174 A | 6/1994 | Evans | |
| 5,359,061 A | 10/1994 | Evans | |
| 5,359,099 A | 10/1994 | Evans | |
| 5,364,985 A | 11/1994 | Kirkwood | |
| 5,481,052 A | 1/1996 | Hardman | |
| 5,608,136 A | 3/1997 | Maezawa | |
| 5,639,937 A | 6/1997 | Hover | |
| 5,705,724 A | 1/1998 | Collins | |
| 5,731,483 A | 3/1998 | Stabel | |
| 5,821,553 A | 10/1998 | Evans | |
| 5,849,964 A | 12/1998 | Holighaus | |
| 5,904,838 A | 5/1999 | Kalnes | |
| 6,150,577 A | 11/2000 | Miller | |
| 6,822,126 B2 | 11/2004 | Miller | |
| RE40,124 E | 3/2008 | Kaiser | |
| 7,834,226 B2 | 11/2010 | Miller | |
| 8,088,961 B2 | 1/2012 | Miller | |
| 8,404,912 B1 | 3/2013 | Miller | |
| 8,480,880 B2 | 7/2013 | Miller | |
| 8,552,245 B2 | 10/2013 | Simon | |
| 8,696,994 B2 | 4/2014 | Miller | |
| 9,428,695 B2 | 8/2016 | Narayanaswamy | |
| 9,447,332 B2 | 9/2016 | Narayanaswamy | |
| 9,650,131 B2 | 5/2017 | Jaber | |
| 10,301,235 B1 | 5/2019 | Cavinaw | |
| 10,442,997 B2 | 10/2019 | Narayanaswamy | |
| 10,513,661 B2 | 12/2019 | Narayanaswamy | |
| 10,858,593 B2 | 12/2020 | Ramamurthy | |
| 11,473,016 B2 | 10/2022 | Timken | |
| 11,479,726 B2 * | 10/2022 | Abbott | C10G 51/023 |
| 11,518,943 B2 | 12/2022 | Timken | |
| 11,618,855 B2 | 4/2023 | Abbott | |
| 11,732,197 B2 | 8/2023 | Timken | |
| 2009/0151233 A1 | 6/2009 | Miller | |
| 2009/0170739 A1 | 7/2009 | Miller | |
| 2011/0020190 A1 | 1/2011 | Miller | |
| 2011/0289826 A1 | 12/2011 | Srinakruang | |
| 2012/0184787 A1 | 7/2012 | Miller | |
| 2014/0228204 A1 | 8/2014 | Narayanaswamy | |
| 2014/0228205 A1 | 8/2014 | Narayanaswamy | |
| 2014/0228605 A1 | 8/2014 | Narayanaswamy | |
| 2014/0228606 A1 | 8/2014 | Narayanaswamy | |
| 2016/0090539 A1 | 3/2016 | Frey | |
| 2016/0264874 A1 | 9/2016 | Narayanaswamy | |
| 2016/0264883 A1 | 9/2016 | Narayanaswamy | |
| 2016/0264885 A1 | 9/2016 | Narayanaswamy | |
| 2016/0362609 A1 | 12/2016 | Ward | |
| 2017/0044465 A1 | 2/2017 | Scheibel | |
| 2017/0247817 A1 | 8/2017 | Jan | |
| 2018/0002609 A1 | 1/2018 | Narayanaswamy | |
| 2018/0187087 A1 | 7/2018 | Atkins | |
| 2019/0002399 A1 | 1/2019 | Meenakshi | |
| 2019/0161683 A1 | 5/2019 | Narayanaswamy | |
| 2019/0177626 A1 | 6/2019 | Ramamurthy | |
| 2019/0177652 A1 | 6/2019 | Atkins | |
| 2019/0233744 A1 | 8/2019 | Narayanaswamy | |
| 2019/0241838 A1 | 8/2019 | Scheibel | |
| 2019/0299491 A1 | 10/2019 | Stanislaus | |
| 2019/0367428 A1 | 12/2019 | Ramamurthy | |
| 2020/0017772 A1 | 1/2020 | Ramamurthy | |
| 2020/0017773 A1 | 1/2020 | Ramamurthy | |
| 2020/0080009 A1 | 3/2020 | Derks | |
| 2020/0181498 A1 | 6/2020 | Heeres | |
| 2020/0308492 A1 | 10/2020 | Streiff | |
| 2020/0369965 A1 | 11/2020 | Bitting | |
| 2020/0369966 A1 | 11/2020 | Bitting | |
| 2021/0032545 A1 | 2/2021 | Harandi | |
| 2021/0061972 A1 | 3/2021 | Nagy | |
| 2021/0070958 A1 | 3/2021 | Brita | |
| 2021/0070959 A1 | 3/2021 | Brita | |
| 2021/0108154 A1 | 4/2021 | Scheibel | |
| 2021/0130262 A1 | 5/2021 | Wu | |
| 2021/0130699 A1 | 5/2021 | Bitting | |
| 2021/0130700 A1 | 5/2021 | Wu | |
| 2021/0139620 A1 | 5/2021 | Slivensky | |
| 2021/0130698 A1 | 6/2021 | Sundaram | |
| 2021/0189248 A1 | 6/2021 | Timken | |
| 2021/0189249 A1 | 6/2021 | Timken | |
| 2021/0189250 A1 | 6/2021 | Timken | |
| 2021/0189251 A1 | 6/2021 | Timken | |
| 2021/0189252 A1 | 6/2021 | Timken | |
| 2021/0189253 A1 | 6/2021 | Timken | |
| 2021/0189254 A1 | 6/2021 | Timken | |
| 2021/0301209 A1 | 9/2021 | Timken | |
| 2021/0301210 A1 | 9/2021 | Timken | |
| 2021/0332299 A1 | 10/2021 | Timken | |
| 2021/0332300 A1 | 10/2021 | Timken | |
| 2021/0363432 A1 | 11/2021 | Bitting | |
| 2022/0010211 A1 | 1/2022 | Allegro, II | |
| 2022/0010212 A1 | 1/2022 | Shi | |
| 2022/0010213 A1 | 1/2022 | Sun | |
| 2022/0010217 A1 | 1/2022 | Barger | |
| 2022/0010218 A1 | 1/2022 | Davydov | |
| 2022/0041905 A1 | 2/2022 | Boaventura | |
| 2022/0073826 A1 | 3/2022 | Van Zijl | |
| 2022/0089831 A1 | 3/2022 | Kanattukara | |
| 2022/0089957 A1 | 3/2022 | Van Zijl | |
| 2022/0089968 A1 | 3/2022 | Driedger | |
| 2022/0097279 A1 | 3/2022 | Van Zijl | |
| 2022/0098491 A1 | 3/2022 | Abbott | |
| 2022/0098497 A1 | 3/2022 | Van Zijl | |
| 2022/0135889 A1 | 5/2022 | Van Zijl | |
| 2022/0154078 A1 | 5/2022 | Kann | |

FOREIGN PATENT DOCUMENTS

| | | |
|---|---|---|
| EP | 0713906 B1 | 5/1999 |
| EP | 3744814 A1 | 12/2020 |

(56) References Cited

FOREIGN PATENT DOCUMENTS

| | | |
|---|---|---|
| EP | 3334804 B1 | 1/2021 |
| WO | 1995014069 A1 | 5/1995 |
| WO | 2005021686 A1 | 3/2005 |
| WO | 2014125344 A1 | 8/2014 |
| WO | 2015000842 A1 | 1/2015 |
| WO | 2016000840 A1 | 1/2015 |
| WO | 2015047085 A1 | 4/2015 |
| WO | 2017222380 A1 | 12/2017 |
| WO | 2018025103 A1 | 2/2018 |
| WO | 2018025104 A1 | 2/2018 |
| WO | 2018055555 A1 | 3/2018 |
| WO | 2018069794 A1 | 4/2018 |
| WO | 2018127812 A1 | 7/2018 |
| WO | 2018127813 A1 | 7/2018 |
| WO | 2018127817 A1 | 7/2018 |
| WO | 2020150244 A1 | 7/2020 |
| WO | 2020152319 A1 | 7/2020 |
| WO | 2020152320 A1 | 7/2020 |
| WO | 2020152329 A1 | 7/2020 |
| WO | 2020162317 A1 | 7/2020 |
| WO | 2020162327 A1 | 7/2020 |
| WO | 2020204707 A1 | 10/2020 |
| WO | 2020234679 A1 | 11/2020 |
| WO | 2020242812 A1 | 12/2020 |
| WO | 2020242914 A1 | 12/2020 |
| WO | 2020242916 A1 | 12/2020 |
| WO | 2020242917 A1 | 12/2020 |
| WO | 2020242918 A1 | 12/2020 |
| WO | 2020242920 A1 | 12/2020 |
| WO | 2020242925 A1 | 12/2020 |
| WO | 2020247192 A1 | 12/2020 |
| WO | 2020249853 A1 | 12/2020 |
| WO | 2020249854 A1 | 12/2020 |
| WO | 2020252228 A1 | 12/2020 |
| WO | 2021021849 A1 | 2/2021 |
| WO | 2021037851 A1 | 3/2021 |
| WO | 2021080898 A1 | 4/2021 |
| WO | 2021080899 A1 | 4/2021 |
| WO | 2021087026 A1 | 5/2021 |
| WO | 2021087028 A1 | 5/2021 |
| WO | 2021087032 A1 | 5/2021 |
| WO | 2021087052 A1 | 5/2021 |
| WO | 2021087059 A1 | 5/2021 |
| WO | 2021087062 A1 | 5/2021 |
| WO | 2021087066 A1 | 5/2021 |
| WO | 2021091724 A1 | 5/2021 |
| WO | 2021092288 A1 | 5/2021 |
| WO | 2021087023 A1 | 6/2021 |
| WO | 2021092306 A1 | 6/2021 |
| WO | 2021105326 A1 | 6/2021 |
| WO | 2021105327 A1 | 6/2021 |
| WO | 2021110395 A1 | 6/2021 |
| WO | 2021163106 A1 | 8/2021 |
| WO | 2021163109 A1 | 8/2021 |
| WO | 2021163111 A1 | 8/2021 |
| WO | 2021163113 A1 | 8/2021 |
| WO | 2021165407 A1 | 8/2021 |
| WO | 2021204818 A1 | 10/2021 |
| WO | 2021211517 A1 | 10/2021 |
| WO | 2021211523 A1 | 10/2021 |
| WO | 2021211529 A1 | 10/2021 |
| WO | 2021211537 A1 | 10/2021 |
| WO | 2021224287 A1 | 11/2021 |
| WO | 2021239699 A1 | 12/2021 |
| WO | 2021255591 A2 | 12/2021 |
| WO | 2022017894 A1 | 1/2022 |
| WO | 2022017897 A1 | 1/2022 |
| WO | 2022017899 A1 | 1/2022 |
| WO | 2022017901 A1 | 1/2022 |
| WO | 2022017902 A1 | 1/2022 |
| WO | 2022017903 A1 | 1/2022 |
| WO | 2022017904 A1 | 1/2022 |
| WO | 2022017906 A1 | 1/2022 |

OTHER PUBLICATIONS

International Search Report a pinion for PCT/US2021/052411 date Jan. 5, 2022. pp. 1-10.

Al-Salem, S.M., et al., "A review on thermal and catalytic pyrolysis of plastic solid waste (PSW)", Journal of Environmental Management 197, pp. 177-198 (2017) (53 pp.).

Ellen MacArthur Foundation and CE100 White Paper: Enabling a circular economy for chemicals with the mass balance approach. May 10, 2019.

Kaminsky, W., Recycling of polymers by pyrolysis, Journal De Physique IV, Colloque C7, supplement au Journal de Physique III, vol. 3, Nov. 1993 (10 pp.).

Kiran, N. et al., Recycling of plastic wastes via pyrolysis, Elsevier, Resources Convervation & REcycling, pp. 273-283 (2000) (11 pp.).

Laermann, Michael, Chemical Recycling of Plastic Waste No More. Apr. 10, 2019.

Miandad. R., et al., Effect of plastic waste types on pyrolysis liquid oil. Elsevier, International Biodeterioration & Biodegradation 119, pp. 239-252 (2017) (14 pp.).

Miandad, Rashid et al. Catalytic Pyrolysis of Plastic Waste: Moving Toward Pyrolysis Based Biorefineries. Frontiers in Energy Research. Mar. 19, 2019. vol. 7, Article 27.

Miskolczi, et al., "Fuels production by pyrolysis of waste plastics from agricultural and packaging sectors in a pilot scale reactor". Fuel Processing Technology (2009), 90(7-8), 1032-1040.

Mohammad Ali, et al., "The Conversion of Waste Plastics/Petroleum Residue Mixtures to Transportation Fuels", Chapter 14 in Feedstock Recycling and Pyrolysis of Waste Plastics (2006), 363-380.

Perspectives on Circular Economy in the Context of Chemical Engineering and Sustainable Development. Natalia A. Cano Londono and H. Cabezas, Chemical Engineering 2021, 34; 100738 www.sciencedirect.com (Years: 2021).

SABIC-Geleen ISCC PLUS Certificate. Certificate states that mass balance chain of custody is used. Date of issue Mar. 15, 2019.

Speight, J.G., 1999. The Chemistry and Technology of Petroleum, 3rd edition, Marcel-Dekker, 918 pp.

Third Party Observations Submitted Mar. 15, 2024.

BASF Press Release; Driving circular economy with the mass balance approach: BASF joins forces with members of the Ellen Macarthur Foundation's CE100 network for White Paper publication; May 10, 2019. https://www.basf.com/US/en/who-we-are/sustainability/whats-new/sustainability-news/2019/El-lenMacArthurfoundation-White-Paper-Mass-balance.html.

Plastics Europe, Association of Plastics Manufacturers; Mass Balance Approach to Accelerate the Use of Renewable Feedstocks in Chemical Processes; Jan. 2020. https://plasticseurope.org/knowledge-hub/mass-balance-approach-to-accelerate-the-use-of-renewable-feedstocks-in-chemical-processes/.

Shell Uses Plastic Waste to Produce Chemicals, Media Release Nov. 21, 2019, https://www.shell.com/business-customers/chemicals/media-releases/2019-media-releases/shell-uses-plastic-waste-to-produce-chemicals.html.

Shell uses plastic waste to produce resin feedstocks, Plastics Today, Jan. 21, 2020, https://www.plasticstoday.com/sustainability/shell-uses-plastic-waste-to-produce-resin-feedstocks.

* cited by examiner

CIRCULAR CHEMICALS OR POLYMERS FROM PYROLYZED PLASTIC WASTE AND THE USE OF MASS BALANCE ACCOUNTING TO ALLOW FOR CREDITING THE RESULTANT PRODUCTS AS CIRCULAR

CROSS REFERENCE TO RELATED APPLICATIONS

This application is a continuation of U.S. patent application Ser. No. 18/173,196, now U.S. Pat. No. 11,746,297, filed Feb. 23, 2023, which is a continuation of U.S. patent application Ser. No. 17/934,619, filed Sep. 23, 2022, now U.S. Pat. No. 11,618,855, which is a continuation of U.S. patent application Ser. No. 17/487,714, filed Sep. 28, 2021, now U.S. Pat. No. 11,479,726, which claims the benefit of U.S. Provisional Patent Application No. 63/084,311, filed Sep. 28, 2020, each of which is incorporated herein by reference in its entirety.

TECHNICAL FIELD OF THE DISCLOSURE

This disclosure relates to the production of chemicals and plastics using pyrolysis oil from the pyrolysis of plastic waste as a co-feedstock along with a petroleum-based, fossil fuel-based, or bio-based feedstock.

BACKGROUND OF THE DISCLOSURE

The worldwide environmental impact associated with discarded plastic waste products is substantial, and the incentive to recycle plastic wastes is pervasive. However, there are significant and persistent problems in conventional recycling methods for plastic products. The melts generated from recycled plastics almost invariably include a range of different types of plastics, which tend to separate into different phases. This phase separation results in structural weakness in the recycled product, and significant proportion of virgin plastic must usually be blended in to impart structural integrity to the product.

An alternative recycling method which is potentially more economically viable is feedstock recycling through the use of pyrolyzed plastic waste materials. Pyrolysis breaks down the polymeric components into an oily, liquid material referred to as pyrolysis oil, which can be recycled in a refinery or chemical plant as a feedstock or co-feedstock into various processing units. One hurdle in using pyrolysis oil or most recycling methods, is achieving economic viability. This goal of sustainability in the polymer industry requires economic practicality, which is made more difficult when attempting to accurately account for circular product content.

Therefore, what are needed are improved processes for using pyrolysis oil as a feedstock or co-feedstock. An approved and relatively simple process of accounting for the circular product content might enhance the economics of using pyrolysis oil, and provide advantages under regulatory provisions. In addition, the ability to adjust the relative proportions of co-feedstocks while using a simple accounting process for the circular product content would be useful.

SUMMARY OF THE DISCLOSURE

This disclosure provides for processes and methods for using pyrolysis oil as a feedstock or co-feedstock, for example, in a fluid catalytic cracker or steam cracker, and establishing the weight or fraction of circular product in the resulting chemical or polymer in the product stream through an approved and simple process. In an aspect, the polymers and chemicals of this disclosure can be certified in accordance with the International Sustainability and Carbon Certification (ISCC) provisions, as circular polymers and chemicals. Moreover, this disclosure demonstrates how polymers and chemicals may be certified as circular at any point along complex chemical reaction pathways, even when remote from the point of introduction of the pyrolysis oil. The ability to trace the content of the polymer or chemicals to the original pyrolysis oil co-feedstock allows the ISCC certification to be made.

In an aspect, the production of chemicals and polymers through the use of pyrolysis oil from the pyrolysis of plastic waste as a feedstock or co-feedstock disclosed herein uses a method of tracking the mass balance through a series of processes through which pyrolysis oil is routed within a refinery or chemical plant. For example, these routings can include, but are not limited to:

(a) processing refinery NGLs (natural gas liquids) with pyrolysis oil to produce circular ethylene and subsequently routing the circular ethylene to produce circular polyethylene;

(b) processing refinery NGLs with pyrolysis oil to produce circular ethylene, subsequently routing the circular ethylene to produce circular NAOs (Normal Alpha Olefins), and using the circular NAOs in the production of lubricants, detergents, waxes, and the like;

(c) processing refinery NGLs with pyrolysis oil to produce circular ethylene, subsequently routing the circular ethylene to produce circular alpha olefins such as 1-hexene, and using the circular ethylene and circular 1-hexene to produce circular poly(ethylene-co-1-hexene);

(d) processing the refinery naphtha from pyrolysis oil or with pyrolysis oil in a reforming unit such as the AROMAX® process unit to produce circular benzene and then routing the circular benzene to produce circular ethylbenzene and circular styrene, which can ultimately produce a circular polystyrene;

(e) processing the refinery naphtha from pyrolysis oil or with pyrolysis oil in a reforming unit such as the AROMAX® process unit to produce circular benzene and then routing the benzene to produce a circular cyclohexane which can ultimately produce a circular nylon; and (f) processing petroleum and pyrolysis oil in a refinery crude unit to produce circular naphtha, subsequently using the circular naphtha to produce circular benzene.

These and many other routings of circular product are disclosed herein, each of which allows ISCC certification of a product as circular even when several process steps removed from the introduction of the pyrolysis oil.

According to an aspect, the use of a mass balance approach which attributes the pounds of pyrolyzed plastic products derived from pyrolysis oil to any product of an output stream of a given unit has been developed, which permits ISCC certification agency approval. The ISCC Sustainability Declarations are issued for discrete mass quantities of product, therefore certification is for a particular product weight. Conversion factors for use in the certification calculation may vary considerably depending upon the particular reactor, processing unit, and conditions, and conversion factors are predetermined. The certification calculation of the weight of circular product is based upon the assumption that most of the weight of the pyrolysis oil added into the cracker and mixed with the petroleum-based, fossil fuel-based, or bio-based feed is also manifested in the circular product. Therefore, this calculation assumes that the conversion rate applies to the pyrolysis oil portion of the feed as well as the petroleum-based, fossil fuel-based, or bio-based feedstock.

As demonstrated in the Examples, this certification process uses a free attribution method to assign circular product credit to every product stream, minus any waste streams such as the portion of the stream which is flared. Moreover, the free attribution method allows all the credit produced from mixing a pyrolysis oil stream with a petroleum-based, fossil fuel-based, or bio-based feed to be distributed as desired to any or all of the products from a processing unit, again less any waste. For example, as long as pyrolysis oil is used to generate ethylene, propylene, fuel gas, and any other product which is recovered from a stream, the total circular product credit from all the recovered product can be taken as circular ethylene.

Therefore, in an aspect, this disclosure provides a process for producing chemicals or polymers from plastic waste, the process comprising:
  (a) introducing (i) a pyrolysis oil and (ii) a petroleum-based, fossil fuel-based, or bio-based feed, each at a known feed rate, into a processing unit as a processing unit feed, wherein the feed comprises the pyrolysis oil in a known concentration;
  (c) converting the processing unit feed into one or more processing unit output streams, a portion of each output stream comprising at least one circular product, wherein the weight or the fraction of each circular product attributable to the pyrolysis oil or plastic waste is determined by mass balance; and
  (c) certifying any one or more of the products in the processing unit output streams as Circular in accordance with International Sustainability and Carbon Certification (ISCC) standards, based upon the weight or fraction of the circular product attributable to the pyrolysis oil or plastic waste determined by mass balance and the free attribution method.

According to another aspect, this disclosure provides a process for producing chemicals or polymers from plastic waste, the process comprising:
  (a) providing a pyrolysis oil from plastic waste;
  (b) providing a petroleum-based, fossil fuel-based, or bio-based feed;
  (c) introducing the pyrolysis oil and the petroleum-based, fossil fuel-based, or bio-based feed, each at a known feed rate, into one or more primary processing units, thereby providing one or more primary processing unit feeds, each comprising the pyrolysis oil in a known concentration; and
  (d) converting the one or more primary processing unit feeds into one or more primary processing unit output streams, a portion of each output stream comprising at least one circular product, wherein the weight or the fraction of each circular product attributable to the pyrolysis oil or plastic waste is determined by mass balance.

In a further aspect, this process for producing chemicals or polymers from plastic waste can further comprise:
  (e) transferring at least a portion of one, or at least a portion of more than one, of the primary processing unit output streams, each at a known feed rate, into one or more secondary or subsequent processing units, thereby providing one or more secondary or subsequent processing unit feeds, each comprising a circular product in a known concentration; and
  (f) converting the one or more secondary or subsequent processing unit feeds into one or more secondary or subsequent processing unit output streams, a portion of each output stream comprising at least one circular product, wherein the weight or the fraction of each circular product attributable to the pyrolysis oil or plastic waste is determined by mass balance; and
  (g) repeating steps (e) and (f) any number of times (zero or more) by:
    [1] transferring at least a portion of one, or at least a portion of more than one, of the secondary or subsequent processing unit output streams, each at a known feed rate, into one or more tertiary or subsequent processing units, thereby providing one or more tertiary or subsequent processing unit feeds, each comprising a circular product in a known concentration; and
    [2] converting the one or more tertiary or subsequent processing unit feeds into one or more tertiary or subsequent processing unit output streams, a portion of each output stream comprising at least one circular product, wherein the weight or the fraction of each circular product attributable to the pyrolysis oil or plastic waste is determined by mass balance.

In either of the preceding Aspects (a)-(d) or (a)-(g), the process can further comprise:
  (h) certifying any one or more of the products in the primary processing unit output streams, secondary processing unit output streams, or tertiary or subsequent processing unit output streams, as Circular in accordance with International Sustainability and Carbon Certification (ISCC) standards, based upon the weight or fraction of the circular product attributable to the pyrolysis oil or plastic waste determined by mass balance and the free attribution method.

In the above-described aspects, the terms primary, secondary, tertiary, and subsequent are used to designate reactor priorities in series, while the terms first, second, and third designate reactors at the same level of priority. Therefore, the above-described aspects allow the tracking of a product through any number of reactors in parallel, in series, or in a combination of parallel and series, while accounting for the portion of circular product at each and every stage.

DETAILED DESCRIPTION OF THE DISCLOSURE

General Description

Figure 1:
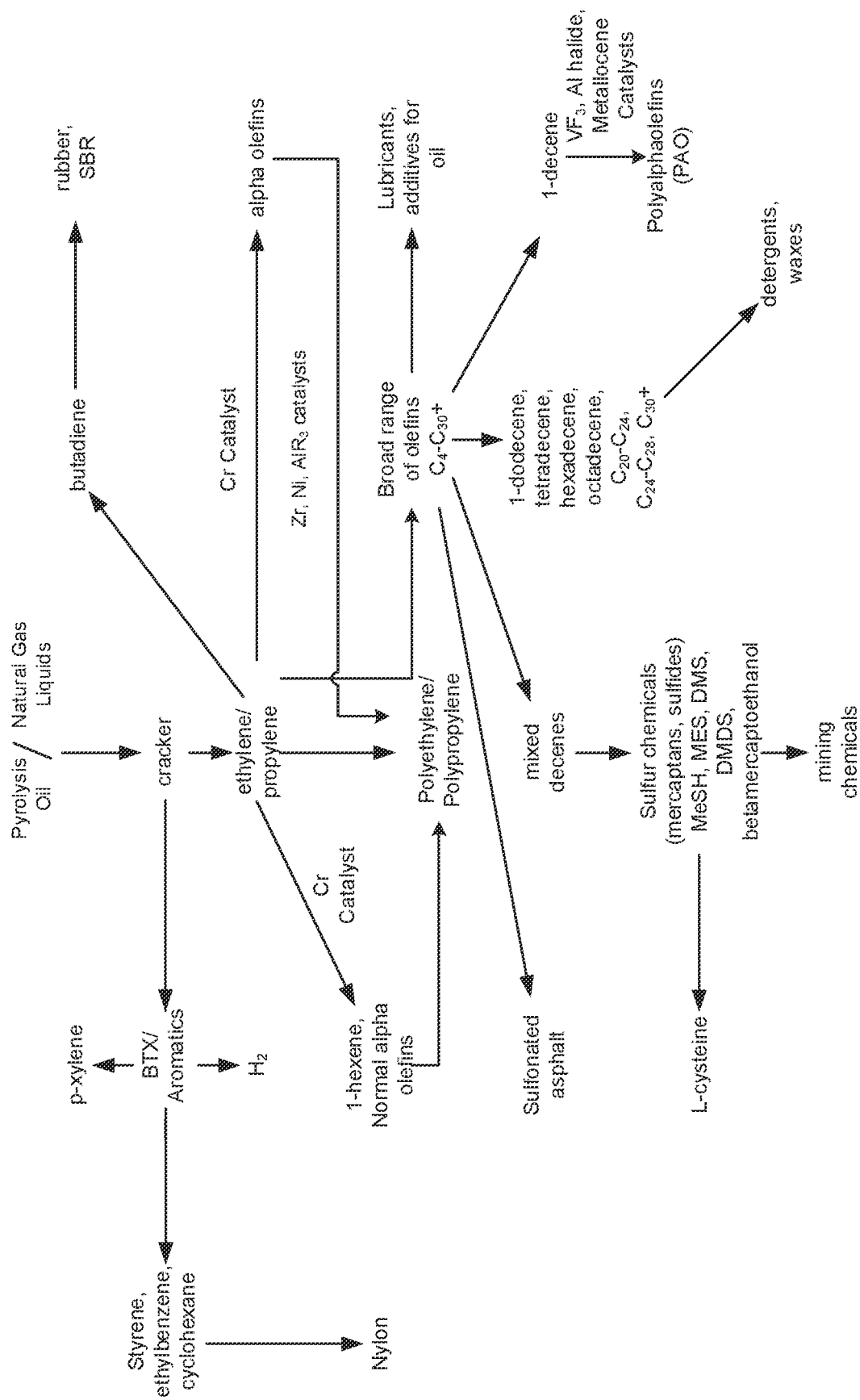
FIG. 1 illustrates aspects of the disclosure showing exemplary process flowchart routings following the introduction of pyrolysis oil as a co-feedstock with natural gas liquids (NGL) to a cracker. For each illustrated product, even those removed several steps from the introduction of the pyrolysis oil, the fraction or percent of circular product can be demonstrated using the mass balance accounting approach disclosed herein.

Provided in this disclosure are processes and methods for using pyrolysis oil as a feedstock or co-feedstock and establishing through an approved and simple process the weight or portion of circular product in the resulting chemical or polymer in the product stream. In an aspect, the polymers and chemicals of this disclosure can be certified in accordance with the International Sustainability and Carbon Certification (ISCC) provisions, as circular polymers and chemicals. The disclosed mass balance accounting approach allows any product or intermediate in a reaction pathway to certified as circular.

Definitions

To define more clearly the terms used herein, the following definitions are provided, and unless otherwise indicated or the context requires otherwise, these definitions are applicable throughout this disclosure. If a term is used in this disclosure but is not specifically defined herein, the definition from the IUPAC Compendium of Chemical Terminology, $2^{nd}$ Ed (1997) can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

Regarding claim transitional terms or phrases, the transitional term "comprising", which is synonymous with "including," "containing," or "characterized by," is inclusive or open-ended and does not exclude additional, unrecited elements or method steps. The transitional phrase "consisting of" excludes any element, step, or ingredient not specified in the claim. The transitional phrase "consisting essentially of" limits the scope of a claim to the specified materials or steps and those that do not materially affect the basic and novel characteristic(s) of the claimed invention. A "consisting essentially of" claim occupies a middle ground between closed claims that are written in a "consisting of" format and fully open claims that are drafted in a "comprising" format. Unless specified to the contrary, describing a compound or composition "consisting essentially of" is not to be construed as "comprising," but is intended to describe the recited component that includes materials which do not significantly alter composition or method to which the term is applied. For example, a feedstock consisting essentially of a material A can include impurities typically present in a commercially produced or commercially available sample of the recited compound or composition. When a claim includes different features and/or feature classes (for example, a method step, feedstock features, and/or product features, among other possibilities), the transitional terms comprising, consisting essentially of, and consisting of, apply only to feature class to which is utilized and it is possible to have different transitional terms or phrases utilized with different features within a claim. For example a method can comprise several recited steps (and other non-recited steps) but utilize a catalyst composition preparation consisting of specific steps but utilize a catalyst composition comprising recited components and other non-recited components. While compositions and methods are described in terms of "comprising" various components or steps, the compositions and methods can also "consist essentially of" or "consist of" the various components or steps.

The terms "a," "an," and "the" are intended, unless specifically indicated otherwise, to include plural alternatives, e.g., at least one. For instance, the disclosure of "an organoaluminum compound" is meant to encompass one organoaluminum compound, or mixtures or combinations of more than one organoaluminum compound unless otherwise specified.

The terms "configured for use" or "adapted for use" and similar language is used herein to reflect that the particular recited structure or procedure is used in an olefin polymerization system or process. For example, unless otherwise specified, a particular structure "configured for use" means it is "configured for use in an olefin polymerization reactor system" and therefore is designed, shaped, arranged, constructed, and/or tailored to effect an olefin polymerization, as would have been understood by the skilled person.

For any particular compound disclosed herein, a general structure or name presented is also intended to encompass all structural isomers, conformational isomers, and stereoisomers that can arise from a particular set of substituents, unless indicated otherwise. Thus, a general reference to a compound includes all structural isomers unless explicitly indicated otherwise; e.g., a general reference to pentane includes n-pentane, 2-methyl-butane, and 2,2-dimethylpropane, while a general reference to a butyl group includes an n-butyl group, a sec-butyl group, an iso-butyl group, and a tert-butyl group. Additionally, the reference to a general structure or name encompasses all enantiomers, diastereomers, and other optical isomers whether in enantiomeric or racemic forms, as well as mixtures of stereoisomers, as the context permits or requires. For any particular formula or name that is presented, any general formula or name presented also encompasses all conformational isomers, regioisomers, and stereoisomers that can arise from a particular set of substituents.

Unless otherwise specified, any carbon-containing group for which the number of carbon atoms is not specified can have, according to proper chemical practice, 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 carbon atoms, or any range or combination of ranges between these values. For example, unless otherwise specified or unless the context requires otherwise, any carbon-containing group can have from 1 to 30 carbon atoms, from 1 to 25 carbon atoms, from 1 to 20 carbon atoms, from 1 to 15 carbon atoms, from 1 to 10 carbon atoms, or from 1 to 5 carbon atoms, and the like. In an aspect, the context could require other ranges or limitations, for example, when the subject carbon-containing group is an aryl group or an alkenyl group, the lower limit of carbons in these subject groups is six carbon atoms and two carbon atoms, respectively. Moreover, other identifiers or qualifying terms may be utilized to indicate the presence or absence of a particular substituent, a particular regiochemistry and/or stereochemistry, or the presence of absence of a branched underlying structure or backbone, and the like.

Various numerical ranges are disclosed herein. When Applicant discloses or claims a range of any type, Applicant's intent is to disclose or claim individually each possible number that such a range could reasonably encompass, including end points of the range as well as any sub-ranges and combinations of sub-ranges encompassed therein, unless otherwise specified. For example, by disclosing a temperature of from 70° C. to 80° C., Applicant's intent is to recite individually 70° C., 71° C., 72° C., 73° C., 74° C., 75° C., 76° C., 77° C., 78° C., 79° C., and 80° C., including any sub-ranges and combinations of sub-ranges encompassed therein, and these methods of describing such ranges are interchangeable. Moreover, all numerical end points of ranges disclosed herein are approximate, unless excluded by proviso. As a representative example, if Applicant states that one or more steps in the processes disclosed herein can be conducted at a temperature in a range from 10° C. to 75° C., this range should be interpreted as encompassing temperatures in a range from "about" 10° C. to "about" 75° C.

Values or ranges may be expressed herein as "about", from "about" one particular value, and/or to "about" another particular value. When such values or ranges are expressed, other embodiments disclosed include the specific value recited, from the one particular value, and/or to the other particular value. Similarly, when values are expressed as approximations, by use of the antecedent "about," it will be understood that the particular value forms another embodiment. It will be further understood that there are a number of values disclosed therein, and that each value is also herein disclosed as "about" that particular value in addition to the value itself. In another aspect, use of the term "about" means±15% of the stated value, ±10% of the stated value, ±5% of the stated value, or ±3% of the stated value.

Applicant reserves the right to proviso out or exclude any individual members of any such group of values or ranges, including any sub-ranges or combinations of sub-ranges within the group, that can be claimed according to a range or in any similar manner, if for any reason Applicant chooses to claim less than the full measure of the disclosure, for example, to account for a reference that Applicant may be unaware of at the time of the filing of the application. Further, Applicant reserves the right to proviso out or exclude any individual substituents, analogs, compounds, ligands, structures, or groups thereof, or any members of a claimed group, if for any reason Applicant chooses to claim less than the full measure of the disclosure, for example, to account for a reference or prior disclosure that Applicant may be unaware of at the time of the filing of the application.

The term "substituted" when used to describe a group, for example, when referring to a substituted analog of a particular group, is intended to describe any non-hydrogen moiety that formally replaces a hydrogen in that group, and is intended to be non-limiting. A group or groups can also be referred to herein as "unsubstituted" or by equivalent terms such as "non-substituted," which refers to the original group in which a non-hydrogen moiety does not replace a hydrogen within that group. Unless otherwise specified, "substituted" is intended to be non-limiting and include inorganic substituents or organic substituents as understood by one of ordinary skill in the art.

An "aliphatic" compound is a class of acyclic or cyclic, saturated or unsaturated, carbon compounds, excluding aromatic compounds, e.g., an aliphatic compound is a non-aromatic organic compound. An "aliphatic group" is a generalized group formed by removing one or more hydrogen atoms (as necessary for the particular group) from a carbon atom of an aliphatic compound. Aliphatic compounds and therefore aliphatic groups can contain organic functional group(s) and/or atom(s) other than carbon and hydrogen.

The term "alkene" whenever used in this specification and claims refers to an olefin that has at least one carbon-carbon double bond. The term "alkene" includes aliphatic or aromatic, cyclic or acyclic, and/or linear and branched alkene unless expressly stated otherwise. The term "alkene," by itself, does not indicate the presence or absence of heteroatoms and/or the presence or absence of other carbon-carbon double bonds unless explicitly indicated. Other identifiers may be utilized to indicate the presence or absence of particular groups within an alkene. Alkenes may also be further identified by the position of the carbon-carbon double bond. Alkenes, having more than one such multiple bond are alkadienes, alkatrienes, and so forth, and may be further identified by the position of the carbon-carbon double bond.

The term "olefin" is used herein in accordance with the definition specified by IUPAC: acyclic and cyclic hydrocarbons having one or more carbon-carbon double bonds apart from the formal ones in aromatic compounds. The class "olefins" subsumes alkenes and cycloalkenes and the corresponding polyenes. Ethylene, propylene, 1-butene, 2-butene, 1-hexene and the like are non-limiting examples of olefins. The term "alpha olefin" as used in this specification and claims refers to an olefin that has a double bond between the first and second carbon atom of the longest contiguous chain of carbon atoms. The term "alpha olefin" includes linear and branched alpha olefins unless expressly stated otherwise.

An "aromatic group" refers to a generalized group formed by removing one or more hydrogen atoms (as necessary for the particular group and at least one of which is an aromatic ring carbon atom) from an aromatic compound. Thus, an "aromatic group" as used herein refers to a group derived by removing one or more hydrogen atoms from an aromatic compound, that is, a compound containing a cyclically conjugated hydrocarbon that follows the Hückel (4n+2) rule and containing (4n+2) pi-electrons, where n is an integer from 1 to about 5. Aromatic compounds and hence "aromatic groups" may be monocyclic or polycyclic unless otherwise specified. Aromatic compounds include "arenes" (hydrocarbon aromatic compounds) and "heteroarenes," also termed "hetarenes" (heteroaromatic compounds formally derived from arenes by replacement of one or more methine (—C=) carbon atoms by trivalent or divalent heteroatoms, in such a way as to maintain the continuous pi-electron system characteristic of aromatic systems and a number of out-of-plane pi-electrons corresponding to the Hückel rule (4n+2)). While arene compounds and heteroarene compounds are mutually exclusive members of the group of aromatic compounds, a compound that has both an arene group and a heteroarene group that compound generally is considered a heteroarene compound. Aromatic compounds, arenes, and heteroarenes may be mono- or polycyclic unless otherwise specified. Examples of arenes include, but are not limited to, benzene, naphthalene, and toluene, among others. Examples of heteroarenes include, but are not limited to furan, pyridine, and methylpyridine, among others. As disclosed herein, the term "substituted" may be used to describe an aromatic group wherein any non-hydrogen moiety formally replaces a hydrogen in that group, and is intended to be non-limiting.

The term "polymer" is used herein generically to include olefin homopolymers, copolymers, terpolymers, and so forth. A copolymer is derived from an olefin monomer and one olefin comonomer, while a terpolymer is derived from an olefin monomer and two olefin comonomers. Accordingly, "polymer" encompasses copolymers, terpolymers, etc., derived from any olefin monomer and comonomer(s) disclosed herein. Similarly, an ethylene polymer would include ethylene homopolymers, ethylene copolymers, ethylene terpolymers, and the like. As an example, an olefin copolymer, such as an ethylene copolymer, can be derived from ethylene and a comonomer, such as 1-butene, 1-hexene, or 1-octene. If the monomer and comonomer were ethylene and 1-hexene, respectively, the resulting polymer could be categorized an as ethylene/1-hexene copolymer.

In like manner, the scope of the term "polymerization" includes homopolymerization, copolymerization, terpolymerization, etc. Therefore, a copolymerization process could involve contacting one olefin monomer (e.g., ethylene) and one olefin comonomer (e.g., 1-hexene) to produce a copolymer.

The term "cracker" is used herein to refer to a stream cracking unit or a fluid catalytic cracking (FCC) unit. Thus, the steam cracking unit comprises a steam cracking furnace into which the pyrolysis oil is fed, upstream pretreatment equipment, and downstream separations equipment. The FCC comprises a fluid catalytic cracking reactor, an upstream pretreater, and downstream separations equipment. Pyrolysis oil is usually fed to the FCC pretreater, although the pyrolysis oil may also be fed to the FCC reactor directly.

The terms "reforming", "reformer" or "reforming unit" are used herein, and the terms "Aromax" or "AROMAX®" unit are also used. While both reforming units and Aromax units make aromatics, there is a difference in the catalysts used in these units. However the methods and processes disclosed herein can be used with either a reforming unit or an Aromax unit, and for the purposes of this disclosure, it should be considered that when one type unit is specified, the other type of unit may also be used and is to be considered disclosed. The reforming catalysts are alumina-based and contain a metal such as platinum. The Aromax catalyst is a zeolite-based catalyst and also contains platinum or other group VIII or 1B metals (Groups 8-11 metals) and a halide such as chloride, fluoride, and the like. Both processes feed naphtha from fluid catalytic cracking (FCC) unit. However, because of the sulfur hydrotreater just upstream of the Aromax unit, it is also possible to feed pyrolysis oil directly to the sulfur hydrotreater, bypassing the FCC unit.

When referring to "natural gas" feed in this disclosure, it is intended to refer to a Natural Gas Liquids (NGL) feed. Thus, the petroleum/fossil fuel feed to the steam cracker/steam cracking furnace can be a light hydrocarbon, mostly saturated feed ranging from $C_2$-$C_5$ (following methane removal), and the steam cracking furnace primarily feeds a mix of C2-C3. A Natural Gas Liquids (NGL) facility separates out the methane, and in some cases, the purified C2-C3 feed. Alternatively, the steam cracking furnace could also feed naphtha (C6-C10), and the steam cracker that feeds naphtha may also mix in pyrolysis oil with the naphtha feed.

Although any methods, devices, and materials similar or equivalent to those described herein can be used in the practice or testing of the invention, the typical methods, devices and materials are herein described.

All publications and patents mentioned herein are incorporated herein by reference for the purpose of describing and disclosing, for example, the constructs and methodologies that are described in the publications, which might be used in connection with the presently described invention. The publications discussed throughout the text are provided solely for their disclosure prior to the filing date of the present application. Nothing herein is to be construed as an admission that the inventors are not entitled to antedate such disclosure by virtue of prior invention.

Production and Certification of Circular Products. In an aspect of this disclosure, there is provided a process for producing chemicals or polymers from plastic waste, the process comprising:
 (a) introducing (i) a pyrolysis oil and (ii) a petroleum-based, fossil fuel-based, or bio-based feed, each at a known feed rate, into a processing unit as a processing unit feed, wherein the feed comprises the pyrolysis oil in a known concentration;
 (c) converting the processing unit feed into one or more processing unit output streams, a portion of each output stream comprising at least one circular product, wherein the weight or the fraction of each circular product attributable to the pyrolysis oil or plastic waste is determined by mass balance; and
 (c) certifying any one or more of the products in the processing unit output streams as Circular in accordance with International Sustainability and Carbon Certification (ISCC) standards, based upon the weight or fraction of the circular product attributable to the pyrolysis oil or plastic waste determined by mass balance and the free attribution method.

In another aspect, there is provided a process for producing chemicals or polymers from plastic waste, the process comprising:
 (a) providing a pyrolysis oil from plastic waste;
 (b) providing a petroleum-based, fossil fuel-based, or bio-based feed;
 (c) introducing the pyrolysis oil and the petroleum-based, fossil fuel-based, or bio-based feed, each at a known feed rate, into one or more primary processing units, thereby providing one or more primary processing unit feeds, each comprising the pyrolysis oil in a known concentration; and
 (d) converting the one or more primary processing unit feeds into one or more primary processing unit output streams, a portion of each output stream comprising at least one circular product, wherein the weight or the fraction of each circular product attributable to the pyrolysis oil or plastic waste is determined by mass balance.

For example, the pyrolysis oil from plastic waste and the petroleum-based, fossil fuel-based, or bio-based feed can be introduced to a cracker (primary processing unit), and the converted to products which include ethylene and propylene and other products, and the weight of the ethylene or the propylene or both the ethylene and the propylene can be certified as circular products.

In a further aspect, it is described herein how a mass balance approach which attributes the pounds of pyrolyzed plastic products derived from pyrolysis oil to any product of an output stream of a given unit has been developed, how this approach can be used to track a circular product or precursor through a number of reactors and processing units in a sequential and/or parallel arrangement, and how the method permits ISCC certification agency approval any one or more of the products throughout the process as circular. Therefore, the approach developed in this disclosure is extremely versatile, because the free attribution allows for properly accounting for the circular product which can be taken as credit in any one product, or in any combination of products as desired.

Accordingly, this disclosure also provides for further steps beyond steps (a) through (d) set out above. For example, there is provided a process for producing chemicals or polymers from plastic waste as described above, further comprising:
 (e) transferring at least a portion of one, or at least a portion of more than one, of the primary processing unit output streams, each at a known feed rate, into one or more secondary or subsequent processing units, thereby providing one or more secondary or subsequent processing unit feeds, each comprising a circular product in a known concentration; and
 (f) converting the one or more secondary or subsequent processing unit feeds into one or more secondary or subsequent processing unit output streams, a portion of each output stream comprising at least one circular product, wherein the weight or the fraction of each circular product attributable to the pyrolysis oil or plastic waste is determined by mass balance; and (g) repeating steps (e) and (f) any number of times (zero or more) by:

[1] transferring at least a portion of one, or at least a portion of more than one, of the secondary or subsequent processing unit output streams, each at a known feed rate, into one or more tertiary or subsequent processing units, thereby providing one or more tertiary or subsequent processing unit feeds, each comprising a circular product in a known concentration; and

[2] converting the one or more tertiary or subsequent processing unit feeds into one or more tertiary or subsequent processing unit output streams, a portion of each output stream comprising at least one circular product, wherein the weight or the fraction of each circular product attributable to the pyrolysis oil or plastic waste is determined by mass balance.

In this aspect, steps (e) and (f) can be carried out any number of times, including zero (0), 1, 2, 3, 4, 5, 6, 7, 8, 9, or 10 times, or more than 10 times. While most processes to track circular products include fewer repetitions, this aspect demonstrates that the disclosed tracking and accounting process can extend through many different steps across many different types of reactors.

The ISCC Sustainability Declarations are issued for discrete mass quantities of product, therefore certification is for a particular product weight. Using conversion factors determined for any particular reactor or conversion process, and as demonstrated in the Examples, this certification process uses a free attribution method to assign circular product credit to every product stream, minus any waste streams. As demonstrated in the Examples, the free attribution method allows all the credit produced from mixing a pyrolysis oil stream with a petroleum-based, fossil fuel-based, or bio-based feed to be distributed as desired to any or all of the products from a processing unit, again less any waste. For example, as long as pyrolysis oil is used to generate ethylene, propylene, fuel gas, and any other product which is recovered from a stream, the total circular product credit from all the recovered product can be taken as circular ethylene. Accordingly, in either of the preceding aspects (a)-(d) or (a)-(g), the process can further comprise:

(h) certifying any one or more of the products in the primary processing unit output streams, secondary processing unit output streams, or tertiary or subsequent processing unit output streams, as Circular in accordance with International Sustainability and Carbon Certification (ISCC) standards, based upon the weight or fraction of the circular product attributable to the pyrolysis oil or plastic waste determined by mass balance and the free attribution method.

In another aspect, this process is applicable regardless of how a pyrolysis oil co-feed may be introduced to a reactor such as a cracker. For example, the pyrolysis oil can be introduced into the primary processing unit by:

(a) combining the pyrolysis oil and the petroleum-based, fossil fuel-based, or bio-based feed prior to introducing the pyrolysis oil and the petroleum-based, fossil fuel-based, or bio-based feed into the primary processing unit;

(b) introducing the pyrolysis oil directly into the primary processing unit; or (c) a combination of (a) and (b).

In either case, the calculation and certification of the weight of circular product is carried out in the same manner as explained herein and as demonstrated in the Examples.

One principal example used to demonstrate the processes of this disclosure is for the introduction of pyrolysis oil as a co-feed with a petroleum-based, fossil fuel-based, or bio-based co-feed, each at known feed rates and concentrations in the total feed, into a cracker, to produce ethylene and propylene and amounts of other products. Therefore, reciting a "primary" processing unit can be a cracker in this example, and "secondary", "tertiary", and "subsequent" processing units can include polymerization reactors, metathesis reactors, oligomerization reactors, and others. The term "processing unit" is also used to include reactors and other units such as distillation towers and other separating units. The accounting and certification process can be applied to a single process or to multiple process (see Examples).

In an aspect, in the process for producing chemicals or polymers from plastic waste, the pyrolysis oil can be present in the primary processing unit feed in a concentration of from about 0.1 wt % to about 25 wt %; alternatively, from about 0.2 wt % to about 22 wt %; alternatively, from about 0.5 wt % to about 20 wt %; alternatively, from about 1 wt % to about 18 wt %; alternatively, from about 2 wt % to about 17 wt %; alternatively, from about 5 wt % to about wt %; or alternatively, from about 8 wt % to about 12 wt %. For example, the pyrolysis oil can be present in the primary processing unit feed in a concentration of about 0.1 wt %, about 0.2 wt %, about 0.5 wt %, about 1 wt %, about 2 wt %, about 3 wt %, about 4 wt %, about 5 wt %, about 6 wt %, about 7 wt %, about 8 wt %, about 9 wt %, about 10 wt %, about 11 wt %, about 12 wt %, about 13 wt %, about 14 wt %, about 15 wt %, about 16 wt %, about 17 wt %, about 18 wt %, about wt %, about 20 wt %, about 21 wt %, about 22 wt %, about 23 wt %, about 24 wt %, about 25 wt %, or any range or combination of ranges therebetween.

The versatility of this process can be demonstrated, in an aspect as follows. In one aspect, the disclosed process can employ two or more primary processing units, and the pyrolysis oil is introduced into only one of the primary processing units. Examples include using pyrolysis oil to form ethylene, and reacting the ethylene with 1-hexene that is formed in another (parallel) primary processing unit. Alternatively, the process can employ two or more primary processing units, and the pyrolysis oil can be introduced, independently, into any two or more primary processing units.

In another aspect, the process can employ two or more secondary processing units, and any primary processing unit output streams are transferred into only one of the secondary processing units. Further, the process can employ two or more secondary processing units, and any primary processing unit output streams are transferred, independently, into any two or more secondary processing units.

Similarly, and according to a further aspect, the disclosed process can employ two or more tertiary processing units, and any secondary processing unit output streams can be transferred into only one of the tertiary processing units. Further, the process can employ two or more tertiary processing units, and any secondary processing unit output streams can be transferred, independently, into any two or more of the tertiary processing units.

Also similarly, and according to a further aspect, the disclosed process can employ two or more subsequent processing units, and any tertiary processing unit output streams can be transferred into only one of the subsequent processing units. Alternatively, the process can employ two or more subsequent processing units, and any tertiary processing unit output streams can be transferred, independently, into any two or more of the subsequent processing units.

In many of the disclosed processes, the pyrolysis oil can be used without being initially separated into its components. For example, some specifications of useful pyrolysis oil are provided herein, which allow the pyrolysis oil to be used as-is without distillation or purification. However, if desired or if the reaction sequence requires, the pyrolysis oil can be further purified or separated into component fractions. For example, the pyrolysis oil can comprise light ($C_2$-$C_5$) hydrocarbons and heavy ($C_{6+}$) hydrocarbons. In an aspect, the pyrolysis oil is not separated into light ($C_2$-$C_5$) hydrocarbons and heavy ($C_{6+}$) hydrocarbons prior to introducing the pyrolysis oil into the primary processing unit. In another aspect, the pyrolysis oil is separated into light ($C_2$-$C_5$) hydrocarbons and heavy ($C_{6+}$) hydrocarbons prior to introducing one of these components into a processing unit or prior to introducing both of these components into separate processing units.

According to another aspect, the disclosed process can further comprising the step of introducing the pyrolysis oil or a fraction thereof into one or more of the secondary processing units or one or more of the secondary input streams, thereby providing one or more secondary processing unit feeds comprising a circular product in a known concentration and the pyrolysis oil or a fraction thereof in a known concentration. Again, the weight or fraction of circular product in any single step or in any combination of steps can be calculated as described herein. In a further aspect, the disclosed process can further comprise the step of introducing the pyrolysis oil or a fraction thereof into one or more of the tertiary or subsequent processing units or one or more of the tertiary or subsequent input streams, thereby providing one or more tertiary or subsequent processing unit feeds comprising a circular product in a known concentration and the pyrolysis oil or a fraction thereof in a known concentration.

In the disclosed process, if desired, at least a portion of one or more of the primary, the secondary, the tertiary, or subsequent processing unit output streams is used as a fuel. In a further aspect, at least a portion of any of the one or more primary processing unit output streams, the one or more secondary processing unit output streams, the one or more tertiary processing unit output streams, or the one or more subsequent processing unit output streams can be recycled to any upstream processing unit as applicable. In this case, the accounting and crediting of a product as circular is continued in the recycled stream as a feed to an upstream reactor or processing unit.

Pyrolysis Oil. The pyrolysis oil (sometimes abbreviated pyoil) of this disclosure can be derived from the pyrolysis of a wide range of plastic wastes. For example, the pyrolysis oil can be derived from pyrolysis of polyolefins, polyethylene, polypropylene, polystyrene, polyethylene terephthalate (PET), polyvinyl chloride (PVC), polyamide, polycarbonate, polyurethane, polyester, copolymers thereof, filled polymers thereof, composites thereof, natural or synthetic rubber, tires, or any combination thereof. In some processes, it may be desirable for the pyrolysis oil to have relatively low concentrations of chloride, which can be accomplished by, for example, selecting plastic wastes having low concentrations of chloride-containing polymers such as PVC. In another aspect, using a pyrolysis oil having relatively low concentrations of chloride may also be accomplished by, for example, purification of the pyrolysis oil prior to using as a feedstock or a co-feedstock.

Certain properties of the pyrolysis oil may be desirable in the processes disclosed herein. For example, in an aspect, the pyrolysis oil can be characterized by any one or any combination of more than one of the following properties:

(a) a Reid Vapor Pressure, psia @ 100° F. (ASTM-D-5191) of ≤15 psia @ 100° F., ≤12 psia @ 100° F., ≤10 psia @ 100° F., ≤5 psia @ 100° F., or any range between two of these recited values;

(b) an Upper Pour Point, ° F. (ASTM D-97 or D5950-14) of ≤200° F., ≤150° F., ≤125° F., or any range between two of these recited values;

(c) a sulfur concentration, wt % (ASTM D-4294 or D2622) of ≤1.8 wt %, ≤1.5 wt %, ≤1.0 wt %, ≤0.7 wt %, or any range between two of these recited values;

(d) a nitrogen concentration, ppm (ASTM D-4629 or D5762) of ≤2500 ppm, ≤3500 ppm, ≤4500 ppm, or any range between two of these recited values;

(e) a water by dist. concentration, wt % (ASTM D-95) of ≤0.1 wt %, ≤0.5 wt %, 0.9 wt %, or any range between two of these recited values;

(f) a sodium concentration, ppm (ASTM D-5185) of ≤2.0 ppm, ≤5.0 ppm, ≤7.5 ppm, ≤10.0 ppm, or any range between two of these recited values;

(g) a nickel concentration, ppm (ASTM D-5185) of ≤1.5 ppm, ≤5.0 ppm, ≤8.0 ppm, ≤12.0 ppm, or any range between two of these recited values;

(h) a vanadium concentration, ppm (ASTM D-5185) of ≤2.5 ppm, ≤6.0 ppm, ≤10.5 ppm, ≤14.0 ppm, or any range between two of these recited values;

(i) an iron concentration, ppm (ASTM D-5185) of ≤1.5 ppm, ≤4.0 ppm, ≤8.0 ppm, ≤10.5 ppm, or any range between two of these recited values;

(j) a copper concentration, ppm (ASTM D-5185) of ≤0.4 ppm, ≤1.8 ppm, ≤3.0 ppm, ≤4.6 ppm, or any range between two of these recited values;

(k) a BS&W, vol % (ASTM D-2709) of ≤0.1 vol %, ≤0.25 vol %, ≤0.50 vol %, ≤1.0 vol % based on water volume without sediment, or any range between two of these recited values;

(l) an Acid Number, mg/KOH/g (ASTM D664) of ≤0.01 mg/KOH/g, ≤0.50 mg/KOH/g, ≤1.2 mg/KOH/g, ≤2.2 mg/KOH/g, or any range between two of these recited values;

(m) a chloride concentration, ppm (UOP 588) of ≤25 ppm, ≤50 ppm, ≤75 ppm, ≤100 ppm, or any range between two of these recited values;

(n) a Distillation End Point, ° F. (D86 or D2887) of ≤600° F., ≤750° F., ≤1000° F., ≤1250° F., ≤1450° F., or any range between two of these recited values;

(o) a Filterable Solids Content, wt % (PR 1826) of ≤0.02 wt %, ≤0.04 wt %, ≤0.06 wt %, ≤1.0 wt %, ≤1.2 wt %, or any range between two of these recited values;

(p) a Heptane Insolubles Content, wt % (ASTM D-3279) of ≤0.02 wt %, ≤0.04 wt %, ≤0.06 wt %, ≤1.0 wt %, ≤1.2 wt %, or any range between two of these recited values;

(q) a fluoride concentration, ppm (ASTM D-7359) of ≤1.0 ppm, ≤1.5 ppm, ≤2 ppm, ≤5 ppm, ≤10 ppm, or ≤15 ppm;

(r) a silicon concentration, ppm (ASTM D-5185) of from ≤1.0 ppm, ≤1.5 ppm, ≤2 ppm, ≤5 ppm, ≤10 ppm, or ≤15 ppm; or (s) a phosphorus concentration, ppm (ASTM D-5185) of ≤1.0 ppm, ≤1.5 ppm, ≤2 ppm, ≤5 ppm, ≤10 ppm, or ≤15 ppm.

In accordance with a further aspect, the pyrolysis oil can be characterized by any one or any combination of more than one of the following properties:
(a) a Reid Vapor Pressure, psia @ 100° F. (ASTM-D-5191) of 5-15 psia @ 100° F.;
(b) an Upper Pour Point, ° F. (ASTM D-97 or D5950-14) of 75-200° F.;
(c) a sulfur concentration, wt % (ASTM D-4294 or D2622) of 0.2-1.5 wt %;
(d) a nitrogen concentration, ppm (ASTM D-4629 or D5762) of 2250-4450 ppm;
(e) a water by dist. concentration, wt % (ASTM D-95) of 0.1-0.9 wt %;
(f) a sodium concentration, ppm (ASTM D-5185) of 2.5-8.5 ppm;
(g) a nickel concentration, ppm (ASTM D-5185) of 1.5-10.5 ppm;
(h) a vanadium concentration, ppm (ASTM D-5185) of 2.0-12.5 ppm;
(i) an iron concentration, ppm (ASTM D-5185) of 2.0-10.5 ppm;
(j) a copper concentration, ppm (ASTM D-5185) of 0.5-4.5 ppm;
(k) a BS&W, vol % (ASTM D-2709) of 0.1-1.0 vol % based on water volume without sediment;
(l) an Acid Number, mg/KOH/g (ASTM D664) of 0.01-2.0 mg/KOH/g;
(m) a chloride concentration, ppm (UOP 588) of 22.5-100 ppm;
(n) a Distillation End Point, ° F. (D86 or D2887) of 600-1600° F.;
(o) a Filterable Solids Content, wt % (PR 1826) of 0.04-0.15 wt %;
(p) a Heptane Insolubles Content, wt % (ASTM D-3279) of 0.03-0.13 wt %;
(q) a fluoride concentration, ppm (ASTM D-7359) of from the detectable limit to ppm or from 1.0 ppm to 25 ppm;
(r) a silicon concentration, ppm (ASTM D-5185) of from the detectable limit to ppm or from 1.0 ppm to 25 ppm; or
(s) a phosphorus concentration, ppm (ASTM D-5185) of from the detectable limit to 25 ppm or from 1.0 ppm to 25 ppm.

In either of these above aspects the pyrolysis oil can be characterized by any number of the recited properties. For example, the pyrolysis oil can be characterized by any ten (10) of the recited properties, any twelve (12) of the recited properties, any fourteen (14) of the recited properties, or all of the recited properties.

Independently of or in addition to the pyrolysis oil properties recited above, in an aspect, the pyrolysis oil also may be characterized by any one, any two, any three, or all four of the following properties:
(a) a Pour Point (ASTM D97 or ISO:3016) of less than or equal to about −40° C.;
(b) a Kinematic Viscosity (ASTM D445 or ISO:3104) of any one or more of (i) about 3.0 mm²/s or from about 2 cSt to about 20 cSt (100° C.), (ii) 11.0 mm²/s (40° C.), or (iii) about 76.0 mm²/s (0° C.);
(c) a Flash point (ISO:2719) of greater than or equal to about 140° C.; or
(d) a dielectric breakdown voltage (ASTM D1816) of from about 10 kV/mm to about 60 kV/mm, from about 15 kV/mm to about 40 kV/mm, or from about 20 kV/mm to about 30 kV/mm.

Antioxidants. In an aspect, it may be desirable to include an antioxidant in combination with the pyrolysis oil, to prevent its degradation and breakdown. The antioxidant can be a natural or a synthetic antioxidant which is combined with the pyrolysis oil. In another aspect, the antioxidant combined with the pyrolysis oil can be: (a) compliant with at least one of the Gulf Cooperation Council Standardization Organization GSO 2231/2012, GSO 839/1997, or GSO 1863/2013 standard; or (b) Halal certified, Kosher certified, or HACCP certified.

A wide range of antioxidants can be used in combination with the pyrolysis oil. In an aspect, the antioxidant can be a natural antioxidant and the natural antioxidant can comprise or can be selected from a plant-based antioxidant, an animal-based antioxidant, or a bioactive peptide is combined with the pyrolysis oil.

In an aspect, the natural antioxidant can comprise or can be selected from olive plant materials, olive oil, olive leaf extracts, a sesame-based antioxidant, sesamol, sesamin, sesamolin, hydroxytyrosol, tyrosol, caffeic acid, ferulic acid, alkannin, shikonin, carnosic acid, carnosic acid-EDTA, α-tocopherol (TCP), propyl gallate (PG), 1-ascorbic acid 6-palmitate (AP), gallic acid, quercetin, myricetin, catechin, genistein, isoflavones, flavanols, cinnamic acid, hydroxtycinnamic acid, oleuropein, oryzanols, tocols, β-carotene, carotenoids, lycopene, marigold, paprika, bixin, or any combination thereof.

According to another aspect, the natural antioxidant can be derived from olive plant material, olive oil mill waste, ajowan (*Carum copticum*), tinctoria roots, rosemary extract, *Guiera senegalensis, Combretum hartmannianum, Majorana syriaca*, sesame, *Artmisia scoparia, Cinnamomum cassia*, rosemary (*Rosemarinus officinalis*), clove (*Syzygium aromaticum*), cinnamon (*Cinnamomum zeylanicum*), broccoli, citrus, chemlali olive, defatted rice brand, bene hull oil (unsaponifiable matter), oregano, green tea, *Cortex fraxini, Polygonum cuspidatum*, marigold, *Capsicum annuum*, and garlic.

When an antioxidant is used with the pyrolysis oil, it can be used in any effective concentration that slows the oxidation sufficiently that it can be used in the disclosed process without significant detrimental effects. For example, in one aspect, the antioxidant is a natural antioxidant which is combined with the pyrolysis oil at a concentration of ≤2500 mMol antioxidant/kg of pyrolysis oil, ≤1750 mMol/kg of pyrolysis oil, or ≤1000 mMol/kg of pyrolysis oil.

In a further aspect, the antioxidant can be a synthetic antioxidant. For example, the synthetic antioxidant can comprise or can be selected from a hindered phenol, a metal salt of a hindered phenol, an oil-soluble polymetal organic compound, a hindered phenylenediamine compound, or a combination thereof. For example, the synthetic antioxidant can comprise or can be selected from 2-t-butyl-4-heptyl phenol, 2-t-butyl-4-octyl phenol, 2-t-butyl-4-dodecyl phenol, 2,6-di-t-butyl-4-methylphenol, 2,6-di-t-butyl-4-heptyl phenol, 2,6-di-t-butyl-4-dodecyl phenol, 2-methyl-6-t-butyl-4-heptyl phenol, 2-methyl-6-t-butyl-4-dodecyl phenol, 2,6-di-alkyl-phenolic proprionic ester derivatives, 2,2'-bis(4-heptyl-6-t-butyl-phenol), 2,2'-bis(4-octyl-6-t-butyl-phenol), 2,2'-bis(4-dodecyl-6-t-butyl-phenol), 4,4'-bis(2,6-di-t-butyl phenol), 4,4'-methylene-bis(2,6-di-t-butyl phenol), 2-t-butyl-4-methoxyphenol, 3-t-butyl-4-methoxyphenol, propyl gallate, 2-(1,1-dimethylethyl)-1,4-benzenediol, or combinations thereof.

In another aspect, the antioxidant can be a synthetic antioxidant which can comprise or can be selected from diphenylamines, phenyl naphthylamines, phenothiazines, imidodibenzyls, diphenyl phenylene diamines, aromatic amines, or combinations thereof.

In a further aspect, the antioxidant can be a synthetic antioxidant which can comprise or can be selected from p,p'-dioctyldiphenylamine, t-octylphenyl-α-naphthylamine, phenyl-α-naphthylamine, p-octylphenyl-α-naphthylamine, or a combination thereof.

Reactor Co-Feeds and Output Streams Containing Circular Products. The processes of this disclosure can include pyrolysis oil as a co-feedstock in addition to the petroleum-based, fossil fuel-based, or bio-based feedstocks in a number of processes. In an aspect, the petroleum-based, fossil fuel-based, or bio-based co-feed can comprise or can be selected from petroleum or natural gas liquids, renewable feedstocks, or combinations thereof. The calculation and certification of products as circular can be carried out through any number of steps in the disclosed process. Circular products not only occur in the output feeds of a reactor but also as components of an input feed of other reactors. Therefore the methods of this disclosure allow tracking of circular products through any number of steps as products and feeds, as illustrated herein. In this section, a wide range of reactor feeds, co-feeds, and circular products are described, which are to be taken as exemplary and not as exhaustive.

According to an aspect, any one or more of the primary processing unit feed, second processing unit feed, tertiary processing unit feed, or subsequent processing unit feed is a circular or a non-circular feed, comprising or selected from a heavy hydrocarbon fraction of petroleum, aromatic hydrocarbons, aliphatic hydrocarbons, hydrogen, naphtha, liquefied petroleum gas (LPG), light ($C_2$-$C_5$) hydrocarbons, a refinery-transfer stream, natural gas liquids, ethylene, propylene, ethane ($C_2$), propane ($C_3$), butane ($C_4$), hexane ($C_6$), octane ($C_8$), decane ($C_{10}$), dodecane ($C_{12}$), propylene-propane mix, ethylene-ethane mix, Normal Alpha Olefins ($C_4$-$C_{30}$+), 1-butene, 1-pentene, 1-hexene, 1-heptene, 1-octene, 1-nonene, 1-decene, 1-dodecene, 1-tetradecene, 1-hexadecene, 1-octadecene, butadiene, benzene, toluene, xylenes, ethylbenzene, styrene, cyclohexane, methylcyclohexane, adipic acid, adiponitrile, hexamethylene diamine (HMDA), caprolactam, 1-dodecene, tetradecene, hexadecene, octadecene, a $C_{20}$-$C_{24}$ normal alpha olefin or polyene, a $C_{24}$-$C_{28}$ normal alpha olefin or polyene, or a $C_{30+}$ normal alpha olefin or polyene.

Figure 2:
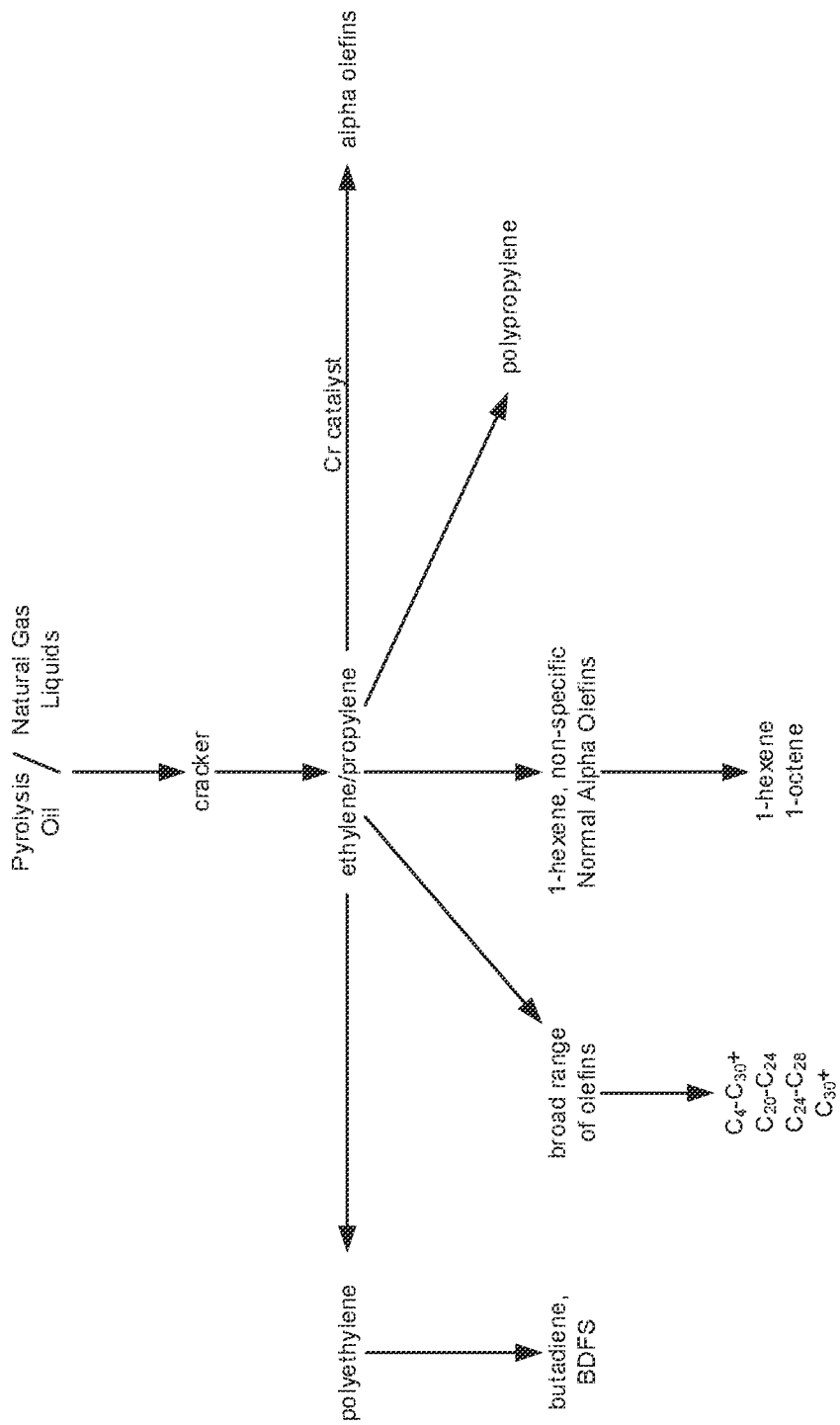
FIG. 2 illustrates other aspects of the disclosure showing further exemplary process routings following the introduction of pyrolysis oil as a co-feedstock with natural gas liquids (NGL) to a cracker. The fraction or percent of circular product can be demonstrated for each product using the mass balance accounting approach disclosed herein.

Aspects of this disclosure are illustrate in FIG. 1 and in FIG. 2. Thus, FIG. 1 and FIG. 2 illustrate aspects of the disclosure showing exemplary process flowchart routings following the introduction of pyrolysis oil as a co-feedstock with natural gas liquids to a cracker. For each illustrated product, even those removed several steps from the introduction of the pyrolysis oil, the fraction or percent of circular product can be demonstrated using the mass balance accounting approach disclosed herein.

For example, in an aspect, (a) the petroleum-based, fossil fuel-based, or bio-based feed can comprise natural gas liquids (NGL); (b) the primary processing unit is a cracker; and (c) the one or more primary processing unit output streams comprise circular ethylene, propylene, benzene, toluene, xylenes, or other aromatics. Further to this aspect, (d) the one or more secondary processing unit output streams, the one or more tertiary processing unit output streams, or the one or more subsequent processing unit output streams can comprise a circular chemical selected independently from xylenes, p-xylene, hydrogen, styrene, ethylbenzene, cyclohexane, nylon, butadiene, rubber, polybutadiene rubber (PBR), styrene-butadiene rubber (SBR), nitrile-butadiene rubber (NBR), polychloroprene rubber (neoprene), Normal Alpha Olefins ($C_4$-$C_{30}$+), 1-butene, 1-pentene, 1-hexene, 1-heptene, 1-octene, 1-nonene, 1-decene, 1-dodecene, 1-tetradecene, 1-hexadecene, 1-octadecene, polyethylene homopolymers and copolymers, polypropylene homopolymers and copolymers, a polyalphaolefin comprising a normal alpha olefin ($C_4$-$C_{30}$+) monomeric unit, a $C_{20}$-$C_{24}$ normal alpha olefin or polyene, a $C_{24}$-$C_{28}$ normal alpha olefin or polyene, a $C_{30+}$ normal alpha olefin or polyene, mixed decenes, mercaptans, organic sulfides, methyl ethyl sulfide (MES), methyl mercaptan (MeSH), dimethyl sulfide (DMS), dimethyl disulfide (DMDS), or betamercaptoethanol, the weight or fraction of which is attributable to the pyrolysis oil or plastic waste is determined by mass balance.

In an aspect, there is provided herein for further using the circular chemical and polymers produced according to this disclosure in the manufacture of synthetic oil, additives for oil, detergents, L-cysteine, mining chemicals, sulfonated asphalt, transformer oils, dielectric fluids, and greases.

In another aspect: (a) the petroleum-based, fossil fuel-based, or bio-based feed can comprise natural gas liquids (NGL); (b) the primary processing unit is a cracker; and (c) the one or more primary processing unit output streams comprise circular ethylene or propylene. Further to this aspect, (d) the one or more secondary processing unit output streams, the one or more tertiary processing unit output streams, or the one or more subsequent processing unit output streams can comprise a circular chemical selected independently from polyethylene homopolymers and copolymers, polypropylene homopolymers and copolymers, butadiene, butadiene feedstock (BDFS), Normal Alpha Olefins ($C_4$-$C_{30}$+), 1-butene, 1-pentene, 1-hexene, 1-heptene, 1-octene, 1-nonene, 1-decene, 1-dodecene, 1-tetradecene, 1-hexadecene, 1-octadecene, a polyalphaolefin comprising a normal alpha olefin ($C_4$-$C_{30}$+) monomeric unit, the weight or fraction of which is attributable to the pyrolysis oil or plastic waste is determined by mass balance.

In a further aspect, (a) the petroleum-based, fossil fuel-based, or bio-based feed can comprise natural gas liquids (NGL); (b) the primary processing unit is a cracker; and (c) the one or more primary processing unit output streams, the one or more secondary processing unit output streams, the one or more tertiary processing unit output streams, or the one or more subsequent processing unit output streams can comprise or can be selected from circular products as illustrated in FIG. 1 or in FIG. 2.

This disclosure also provides for producing chemicals or polymers from plastic waste as disclosed, and further comprising the step of using the circular chemical in the manufacture of a commercial product.

In an aspect, any one or more of the primary, secondary, tertiary, or subsequent processing unit output streams can comprise circular Normal Alpha Olefins ($C_4$-$C_{30}$+), the weight or fraction of which is attributable to the pyrolysis oil or plastic waste is determined by mass balance. For example, any one or more of the primary, secondary, tertiary, or subsequent processing unit output streams can comprise circular 1-butene, 1-pentene, 1-hexene, 1-heptene, 1-octene, 1-nonene, 1-decene, 1-dodecene, 1-tetradecene, 1-hexadecene, 1-octadecene and combinations thereof, the weight or fraction of which is attributable to the pyrolysis oil or plastic waste is determined by mass balance. In another aspect, any one or more of the primary, secondary, tertiary, or subsequent processing unit output streams can comprise circular polyalphaolefins, the weight or fraction of which is attributable to the pyrolysis oil or plastic waste is determined by mass balance.

One or more of the primary, secondary, tertiary, or subsequent processing unit output streams can comprise circular hydrogen, drilling fluids, waxes, aromatic compounds, butadiene, sulfolene, sulfolane, rubber, sulfur compounds (e.g, methyl ethyl sulfide (MES), methyl mercaptan (MeSH), dimethyl sulfide, dimethyl disulfide), sulfonated asphalt (SAS), the weight or fraction of which is attributable to the pyrolysis oil or plastic waste is determined by mass balance.

Because of the flexibility of the process described herein, a wide range of products can be produced and tracked and certified as circular. In an aspect, for example, at least one circular product can comprise or can be selected from normal alpha olefins ($C_4$-$C_{30}$+), ethane, propane, butane, hexane, octane, decane, dodecane, ethylene, propylene, 1-butene, 2-butene, 1-hexene, 1-pentene, 1-hexene, 1-heptene, 1-octene, 1-nonene, 1-decene, 1-dodecene, 1-tetradecene, 1-hexadecene, 1-octadecene, acetylene, hydrogen, isoprene, debutanized aromatic concentrate, amylene, benzene toluene xylenes stream, ethylene-rich gas, propane propylene mix, dicyclopentadiene, propylene in polypropylene mix, polyethylene homopolymers, polyethylene copolymers, ethylene-ionomer copolymers, ethylene-propylene elastomers, chlorosulfonated polyethylene, polypropylene homopolymers, polypropylene copolymers, polyalphaolefin, poly(1-butene) polymers and copolymers, poly(1-pentene) polymers and copolymers, poly(1-hexene) polymers and copolymers, poly(1-heptene) polymers and copolymers, poly(1-octene) polymers and copolymers, poly(1-nonene) polymers and copolymers, poly(1-decene) polymers and copolymers, poly(1-dodecene) polymers and copolymers, poly(1-tetradecene) polymers and copolymers, poly(1-hexadecene) polymers and copolymers, poly(1-octadecene) polymers and copolymers, vinyl chloride, ethylbenzene, acetaldehyde, vinyl acetate, poly(vinyl acetate) homopolymers, poly(vinyl acetate) copolymers, poly(vinyl chloride) homopolymers, poly(vinyl chloride) copolymers, vinyl chloride-vinyl acetate copolymers, 1,1,2-trichloroethane, vinylidene chloride, polyvinylidene chloride, ethylene oxide, ethylene glycol, poly(ethylene terephthalate), polyethylene glycol-polyalkylene glycol copolymers, ethoxylated phenols, ethoxylated amines, diethylene glycol, polyesters, unsaturated polyester, polyester polyols, adipic acid, polyurethane resins, hydroxyethyl starch, hydroxyethyl gums, hydroxyethyl cellulose, ethylbenzene, styrene, divinylbenzene, polystyrene, styrene-butadiene copolymers, acrylonitrile-butadiene-styrene terpolymers, styrene-acrylonitrile copolymers, polyester resins, styrene-divinylbenzene resin, styrene-alkyd copolymers, styrene-maleic anhydride copolymers, acetaldehyde, pentaerythritol, alkyd resins, acetic acid, ethylene-vinyl acetate copolymers, vinyl chloride-vinyl acetate copolymers, poly(vinyl alcohol), poly(vinyl butyral), poly(vinyl formal), acrylonitrile, propylene oxide, cumene, n-butyraldehyde, isobutyraldehyde, allyl chloride, acrylic acid esters, methyl alcohol, ethyl alcohol, isopropyl alcohol, acrylonitrile, polyacrylonitrile, modacrylic copolymers, acrylonitrile butadiene styrene (ABS), styrene acrylonitrile resin (SAN), nitrile elastomers, acrylonitrile copolymers, hexamethylene diamine, nylon 6,6, acrylamide, polyacrylamide homopolymers, polyacrylamide copolymers, propylene oxide, propylene glycol, poly(ethylene glycol) homopolymers, poly(ethylene glycol) copolymers, poly(propylene glycol) homopolymers, poly(propylene glycol) copolymers, n-butyraldehyde, poly(vinyl butyral), n-butyric acid, n-butyric anhydride, cellulose acetate butyrate, isobutyraldehyde, neopentyl glycol, polyurethanes, allyl chloride, epichlorohydrin epoxy resins, acrylic acid esters, acrylic homopolymers and copolymers, isopropyl alcohol, acetone, bisphenol A, epoxy resins, polycarbonates, polysulfones, methyl acrylate, methyl methacrylate, methacrylic acid, poly(methyl methacrylate) homopolymers, poly(methyl methacrylate) copolymers, poly(methacrylate) homopolymers, poly(methacrylate) copolymers, mixed butenes and butane, maleic anhydride, butylene oxide, 1-butene, mixed butenes, isobutene, butane, butadiene, styrene, polybutadiene elastomer, polybutadiene resins, hexamethylene diamine, nylons, chloroprene, neoprene elastomer, 1,5-cyclooctadiene, ethylene-propylene terpolymer elastomer, 1,5,9-cyclododecatriene, dodecanoic acid, nylon 6,12, qiana, lauryl lactam, nylon 12, OH-terminated polymers and copolymers, polyurethane elastomers, 1,4-hexadiene, maleic anhydride, alkyd resins, styrene-maleic anhydride copolymer, butylene oxide, poly(butylene oxide) polyurethanes, mixed butenes, isobutene, poly(butenes), poly(isobutene), butyl rubber, acetic acid, drilling fluids, waxes, aromatic compounds, butadiene, sulfolene, sulfolane, rubbers, methyl ethyl sulfide (MES), methyl mercaptan (MeSH), dimethyl sulfide, dimethyl disulfide, sulfonated asphalt (SAS), benzene, ethylbenzene, benzenesulfonic acid, chlorobenzene, cyclohexane, nitrobenzene, dinitrotoluene, maleic anhydride, toluene, dinitrotoluenes, toluene diisocyanate, urethanes, styrene, benzenesulfonic acid chlorobenzene, phenol, phenolic resins, 2,6-xylenol, poly(phenylene oxide), phenylene oxide, o-xylene, m-xylene, or p-xylene, acetone, cyclohexane, adipic acid, nylon 66, polyurethanes, caprolactam, nylon 6, nitrobenzene, aniline, polymeric isocyanates, urethanes, xylenes, o-xylene, phthalic anhydride, alkyd resins, urethanes, polyurethanes, m-xylene, isophthalic acid, alkyd resins, polyamide resins, diphenyl isophthalate, polybenzimidazoles, p-xylene, terephthalic acid, poly(ethylene terephthalate), poly(butylene terephthalate), methane, formaldehyde, carbon dioxide, carbon disulfide, hydrogen cyanide, methanol, chloroform, acetylene, formaldehyde, urea, urea-formaldehyde resins, melamine-formaldehyde resins, phenol-formaldehyde resins, polyformaldehyde polymers and copolymers (acetal resins), pentaerythritol, alley resins, aniline-formaldehyde resins, butanediol, poly(butylene terephthalate), phosgene, isocyanates, polyurethanes, regenerated cellulose, hydrogen cyanide, hexamethylene diamine, methanol, acetic acid, cellulose acetate, cellulose acetate butyrate, vinyl acetate, poly(vinyl acetate) polymers and copolymers, chloroform, tetrafluoroethylene poly(tetrafluoroethylene), acetylene, acrylate esters, vinyl fluoride, poly(vinyl fluoride), 1,4-butandiol, vinylpyrrolidone, or poly(vinylpyrrolidone), the weight or fraction of which is attributable to the pyrolysis oil or plastic waste is determined by mass balance.

Further Polymeric Products and Intermediates Which Can Be Certified as Circular. The economic importance of polymers and the scale of their production suggests very beneficial applications of the disclosed processes. Therefore, examples of fundamental molecular building blocks and products produced therefrom, including polymer products and intermediates, can be illustrated as follows.

In an aspect, any one or more of the primary, secondary, or tertiary, processing unit output streams can comprise circular ethylene; and a subsequent processing unit output stream can comprise circular polyethylene homopolymers, polyethylene copolymers, ethylene-ionomer copolymers, ethylene-propylene elastomers, chlorosulfonated polyethylene, vinyl chloride, ethylene oxide, ethylbenzene, acetaldehyde, vinyl acetate, or polyvinyl acetate, the weight or fraction of which is attributable to the pyrolysis oil or plastic waste is determined by mass balance.

In another aspect, any one or more of the primary, secondary, or tertiary, processing unit output streams can comprise circular vinyl chloride; and a subsequent processing unit output stream can comprise circular polyvinyl chloride homopolymers, polyvinyl chloride copolymers, vinyl chloride-vinyl acetate copolymers, 1,1,2-trichloroethane, vinylidene chloride, or polyvinylidene chloride, the weight or fraction of which is attributable to the pyrolysis oil or plastic waste is determined by mass balance.

According to a further aspect, any one or more of the primary, secondary, or tertiary, processing unit output streams can comprise circular ethylene oxide; and a subsequent processing unit output stream can comprise circular ethylene glycol, poly(ethylene terephthalate), polyethylene glycol-polyalkylene glycol copolymers, ethoxylated phenols, ethoxylated amines, diethylene glycol, polyester, unsaturated polyester, polyester polyols, adipic acid, polyurethane resins, hydroxyethyl starch, hydroxyethyl gums, or hydroxyethyl cellulose, the weight or fraction of which is attributable to the pyrolysis oil or plastic waste is determined by mass balance.

Another aspect of the disclosure provides that any one or more of the primary, secondary, or tertiary, processing unit output streams can comprise circular ethylbenzene; and a subsequent processing unit output stream can comprise circular styrene, polystyrene, styrene-butadiene copolymers, acrylonitrile-butadiene-styrene terpolymers, styrene-acrylonitrile copolymers, polyester resins, styrene-divinylbenzene resin, styrene-alkyd copolymers, or styrene-maleic anhydride copolymers, the weight or fraction of which is attributable to the pyrolysis oil or plastic waste is determined by mass balance.

Still another aspect of the disclosure provides that any one or more of the primary, secondary, or tertiary, processing unit output streams can comprise circular acetaldehyde; and a subsequent processing unit output stream can comprise circular pentaerythritol, alkyd resins, or acetic acid, the weight or fraction of which is attributable to the pyrolysis oil or plastic waste is determined by mass balance.

In an aspect, for example, any one or more of the primary, secondary, or tertiary, processing unit output streams can comprise circular vinyl acetate; and a subsequent processing unit output stream can comprise circular poly(vinyl acetate), poly(vinyl acetate) copolymers, ethylene-vinyl acetate copolymers, vinyl chloride-vinyl acetate copolymers, the weight or fraction of which is attributable to the pyrolysis oil or plastic waste is determined by mass balance.

A further aspect provides that any one or more of the primary, secondary, or tertiary, processing unit output streams can comprise circular poly(vinyl acetate); and a subsequent processing unit output stream can comprise circular poly(vinyl alcohol), poly(vinyl butyral), poly(vinyl formal), the weight or fraction of which is attributable to the pyrolysis oil or plastic waste is determined by mass balance.

Any one or more of the primary, secondary, or tertiary, processing unit output streams can comprise circular propylene; and a subsequent processing unit output stream can comprise circular polypropylene homopolymers, polypropylene copolymers, acrylonitrile, propylene oxide, cumene, n-butyraldehyde, isobutyraldehyde, allyl chloride, acrylic acid esters, or isopropyl alcohol, the weight or fraction of which is attributable to the pyrolysis oil or plastic waste is determined by mass balance.

Another aspect provides that any one or more of the primary, secondary, or tertiary, processing unit output streams can comprise circular acrylonitrile; and a subsequent processing unit output stream can comprise circular polyacrylonitrile, modacrylic copolymers, acrylonitrile butadiene styrene (ABS), styrene acrylonitrile resin (SAN), nitrile elastomers, acrylonitrile copolymers, hexamethylene diamine, nylon 6,6, acrylamide, polyacrylamide homopolymers, or polyacrylamide copolymers, the weight or fraction of which is attributable to the pyrolysis oil or plastic waste is determined by mass balance.

In an aspect, any one or more of the primary, secondary, or tertiary, processing unit output streams can comprise circular propylene oxide; and a subsequent processing unit output stream can comprise circular propylene glycol, polyesters, poly(propylene glycols) homopolymers, poly(propylene glycols) copolymers, and polyurethanes, the weight or fraction of which is attributable to the pyrolysis oil or plastic waste is determined by mass balance.

Any one or more of the primary, secondary, or tertiary, processing unit output streams can comprise circular n-butyraldehyde; and a subsequent processing unit output stream can comprise circular poly(vinyl butyral), n-butyric acid, n-butyric anhydride, or cellulose acetate butyrate, the weight or fraction of which is attributable to the pyrolysis oil or plastic waste is determined by mass balance.

In addition, any one or more of the primary, secondary, or tertiary, processing unit output streams can comprise circular isobutyraldehyde; and a subsequent processing unit output stream can comprise circular neopentyl glycol, polyesters, or polyurethanes, the weight or fraction of which is attributable to the pyrolysis oil or plastic waste is determined by mass balance.

Any one or more of the primary, secondary, or tertiary, processing unit output streams can comprise circular allyl chloride; and a subsequent processing unit output stream can comprise circular epichlorohydrin or epoxy resins, the weight or fraction of which is attributable to the pyrolysis oil or plastic waste is determined by mass balance.

In another aspect, any one or more of the primary, secondary, or tertiary, processing unit output streams can comprise circular acrylic acid esters; and a subsequent processing unit output stream can comprise circular acrylic homopolymers and copolymers, the weight or fraction of which is attributable to the pyrolysis oil or plastic waste is determined by mass balance.

Any one or more of the primary, secondary, or tertiary, processing unit output streams, according to another aspect, can comprise circular isopropyl alcohol; and a subsequent processing unit output stream can comprise circular acetone, bisphenol A, epoxy resins, polycarbonates, polysulfones, methacrylic acid, poly(methyl methacrylate) homopolymers or poly(methyl methacrylate) copolymers, the weight or fraction of which is attributable to the pyrolysis oil or plastic waste is determined by mass balance.

Any one or more of the primary, secondary, or tertiary, processing unit output streams, in an aspect, can comprise circular mixed butenes and butane; and a subsequent processing unit output stream can comprise circular butadiene, maleic anhydride, butylene oxide, 1-butene, mixed butenes, isobutene, or butane, the weight or fraction of which is attributable to the pyrolysis oil or plastic waste is determined by mass balance.

Further aspects provide that any one or more of the primary, secondary, or tertiary, processing unit output streams can comprise circular butadiene; and a subsequent processing unit output stream can comprise circular styrene, polybutadiene elastomer, polybutadiene resins, hexamethylene diamine, nylons, chloroprene, neoprene elastomer, 1,5- cyclooctadiene, ethylene-propylene terpolymer elastomer, 1,5,9-cyclododecatriene, dodecanoic acid, nylon 6,12, qiana, lauryl lactam, nylon 12, OH-terminated polymers and copolymers, polyurethane elastomers, or 1,4-hexadiene, the weight or fraction of which is attributable to the pyrolysis oil or plastic waste is determined by mass balance.

In an aspect, any one or more of the primary, secondary, or tertiary, processing unit output streams can comprise circular maleic anhydride; and a subsequent processing unit output stream can comprise circular polyesters, alkyd resins, or styrene-maleic anhydride copolymer, the weight or fraction of which is attributable to the pyrolysis oil or plastic waste is determined by mass balance.

According to an aspect, any one or more of the primary, secondary, or tertiary, processing unit output streams can comprise circular butylene oxide; and a subsequent processing unit output stream can comprise circular poly(butylene oxide) or polyurethanes, the weight or fraction of which is attributable to the pyrolysis oil or plastic waste is determined by mass balance.

Any one or more of the primary, secondary, or tertiary, processing unit output streams can comprise circular 1-butene, mixed butenes, or isobutene; and a subsequent processing unit output stream can comprise circular poly(1-butene), poly(butene), poly(isobutene), or butyl rubber, the weight or fraction of which is attributable to the pyrolysis oil or plastic waste is determined by mass balance.

Any one or more of the primary, secondary, or tertiary, processing unit output streams can comprise circular butane; and a subsequent processing unit output stream can comprise circular acetic acid, the weight or fraction of which is attributable to the pyrolysis oil or plastic waste is determined by mass balance.

In a further aspect, any one or more of the primary, secondary, or tertiary, processing unit output streams can comprise circular benzene; and a subsequent processing unit output stream can comprise circular ethylbenzene, benzenesulfonic acid, chlorobenzene, cumene, cyclohexane, nitrobenzene, or maleic anhydride, the weight or fraction of which is attributable to the pyrolysis oil or plastic waste is determined by mass balance.

Any one or more of the primary, secondary, or tertiary, processing unit output streams can comprise circular toluene; and a subsequent processing unit output stream can comprise circular dinitrotoluenes, toluene diisocyanate, or urethanes, the weight or fraction of which is attributable to the pyrolysis oil or plastic waste is determined by mass balance.

Still another aspect provides that any one or more of the primary, secondary, or tertiary, processing unit output streams can comprise circular ethylbenzene; and a subsequent processing unit output stream can comprise circular styrene, the weight or fraction of which is attributable to the pyrolysis oil or plastic waste is determined by mass balance.

Yet another aspect of this disclosure provides that any one or more of the primary, secondary, or tertiary, processing unit output streams can comprise circular benzenesulfonic acid chlorobenzene, or cumene; and a subsequent processing unit output stream can comprise circular phenol, phenolic resins, bisphenol A, 2,6-xylenol, or poly(phenylene oxide), the weight or fraction of which is attributable to the pyrolysis oil or plastic waste is determined by mass balance.

Another aspect provides that any one or more of the primary, secondary, or tertiary, processing unit output streams can comprise circular cumene; and a subsequent processing unit output stream can comprise circular acetone, methyl methacrylate, poly(methyl methacrylate) polymers and copolymers, or bisphenol A, the weight or fraction of which is attributable to the pyrolysis oil or plastic waste is determined by mass balance.

According to an aspect, any one or more of the primary, secondary, or tertiary, processing unit output streams can comprise circular cyclohexane; and a subsequent processing unit output stream can comprise circular adipic acid, nylon 66, polyesters, polyurethanes, caprolactam, or nylon 6, the weight or fraction of which is attributable to the pyrolysis oil or plastic waste is determined by mass balance.

Another aspect of the disclosure provides that any one or more of the primary, secondary, or tertiary, processing unit output streams can comprise circular nitrobenzene; and a subsequent processing unit output stream can comprise circular aniline, polymeric isocyanates, or urethanes, the weight or fraction of which is attributable to the pyrolysis oil or plastic waste is determined by mass balance.

Any one or more of the primary, secondary, or tertiary, processing unit output streams also can comprise circular xylenes; and a subsequent processing unit output stream can comprise circular o-xylene, m-xylene, or p-xylene, the weight or fraction of which is attributable to the pyrolysis oil or plastic waste is determined by mass balance.

In an aspect, any one or more of the primary, secondary, or tertiary, processing unit output streams can comprise circular o-xylene; and a subsequent processing unit output stream can comprise circular phthalic anhydride, alkyd resins, polyester resins, polyester polyols, urethanes, or polyurethanes, the weight or fraction of which is attributable to the pyrolysis oil or plastic waste is determined by mass balance.

In another aspect, any one or more of the primary, secondary, or tertiary, processing unit output streams can comprise circular m-xylene; and a subsequent processing unit output stream can comprise circular isophthalic acid, polyesters, alkyd resins, polyamide resins, diphenyl isophthalate, or polybenzimidazoles, the weight or fraction of which is attributable to the pyrolysis oil or plastic waste is determined by mass balance.

Any one or more of the primary, secondary, or tertiary, processing unit output streams can comprise circular p-xylene; and a subsequent processing unit output stream can comprise circular terephthalic acid, poly(ethylene terephthalate), or poly(butylene terephthalate), the weight or fraction of which is attributable to the pyrolysis oil or plastic waste is determined by mass balance.

In an aspect, any one or more of the primary, secondary, or tertiary, processing unit output streams can comprise circular methane; and a subsequent processing unit output stream can comprise circular formaldehyde, phosgene, carbon dioxide, carbon disulfide, hydrogen cyanide, methanol, chloroform, or acetylene, the weight or fraction of which is attributable to the pyrolysis oil or plastic waste is determined by mass balance.

In addition, any one or more of the primary, secondary, or tertiary, processing unit output streams can comprise circular formaldehyde; and a subsequent processing unit output stream can comprise circular urea-formaldehyde resins, melamine-formaldehyde resins, phenol-formaldehyde resins, polyformaldehyde polymers and copolymers (acetal resins), pentaerythritol, alky resins, aniline-formaldehyde resins, butanediol, or poly(butylene terephthalate), the weight or fraction of which is attributable to the pyrolysis oil or plastic waste is determined by mass balance.

According to an aspect of the disclosure, any one or more of the primary, secondary, or tertiary, processing unit output streams can comprise circular phosgene; and a subsequent processing unit output stream can comprise circular isocyanates, polyurethanes, or polycarbonates, the weight or fraction of which is attributable to the pyrolysis oil or plastic waste is determined by mass balance.

In another aspect, any one or more of the primary, secondary, or tertiary, processing unit output streams can comprise circular carbon dioxide; and a subsequent processing unit output stream can comprise circular urea or urea-formaldehyde resins, the weight or fraction of which is attributable to the pyrolysis oil or plastic waste is determined by mass balance.

Any one or more of the primary, secondary, or tertiary, processing unit output streams can comprise circular carbon disulfide; and a subsequent processing unit output stream can comprise circular regenerated cellulose, the weight or fraction of which is attributable to the pyrolysis oil or plastic waste is determined by mass balance.

Further, any one or more of the primary, secondary, or tertiary, processing unit output streams can comprise circular hydrogen cyanide; and a subsequent processing unit output stream can comprise circular methyl methacrylate, poly(methyl methacrylate), hexamethylene diamine, or nylons, the weight or fraction of which is attributable to the pyrolysis oil or plastic waste is determined by mass balance.

As provided in this disclosure, any one or more of the primary, secondary, or tertiary, processing unit output streams can comprise circular methanol; and a subsequent processing unit output stream can comprise circular acetic acid, cellulose acetate, cellulose acetate butyrate, vinyl acetate, or poly(vinyl acetate) polymers and copolymers, the weight or fraction of which is attributable to the pyrolysis oil or plastic waste is determined by mass balance.

In another aspect, any one or more of the primary, secondary, or tertiary, processing unit output streams can comprise circular chloroform; and a subsequent processing unit output stream can comprise circular tetrafluoroethylene or poly(tetrafluoroethylene), the weight or fraction of which is attributable to the pyrolysis oil or plastic waste is determined by mass balance.

An aspect provides that any one or more of the primary, secondary, or tertiary, processing unit output streams can comprise circular acetylene; and a subsequent processing unit output stream can comprise circular acrylate esters, vinyl fluoride, poly(vinyl fluoride), 1,4-butandiol, poly(butylene terephthalate), vinylpyrrolidone, or poly(vinylpyrrolidone), the weight or fraction of which is attributable to the pyrolysis oil or plastic waste is determined by mass balance.

In another aspect, any one or more of the primary, secondary, or tertiary, processing unit output streams can comprise circular 1,3-butadiene; and a subsequent processing unit output stream can comprise circular sulfolane or circular sulfolene, the weight or fraction of which is attributable to the pyrolysis oil or plastic waste is determined by mass balance.

Further, any one or more of the primary, secondary, or tertiary, processing unit output streams can comprise a circular olefin or diene selected from 1-butene, 1-pentene, 1-hexene, 1-heptene, 1-octene, 1-nonene, 1-decene, 1-dodecene, 1-tetradecene, 1-hexadecene, 1-octadecene, 1,3-butadiene, and combinations thereof; and a subsequent processing unit output stream can comprise circular polyethylene comprising the circular olefin or diene, the weight or fraction of which is attributable to the pyrolysis oil or plastic waste is determined by mass balance.

Still further, any one or more of the primary, secondary, or tertiary, processing unit output streams can comprise circular heptane; and a subsequent processing unit output stream can comprise circular sulfonated asphalt (SAS), the weight or fraction of which is attributable to the pyrolysis oil or plastic waste is determined by mass balance.

In an aspect, any one or more of the primary, secondary, or tertiary, processing unit output streams can comprise circular MeSH; and a subsequent processing unit output stream can comprise circular L-cysteine, the weight or fraction of which is attributable to the pyrolysis oil or plastic waste is determined by mass balance.

Any one or more of the primary, secondary, or tertiary, processing unit output streams can comprise a circular dimethyl sulfide or dimethyl disulfide, the weight or fraction of which is attributable to the pyrolysis oil or plastic waste is determined by mass balance; and the circular dimethyl sulfide or dimethyl disulfide is used in mining operations.

In addition, any one or more of the primary, secondary, or tertiary, processing unit output streams can comprise a circular polyalphaolefin, the weight or fraction of which is attributable to the pyrolysis oil or plastic waste is determined by mass balance; and the circular polyalphaolefin is used in a wind turbine, engine oil (passenger car or heavy-duty diesel), transmission fluid (standard and hybrid vehicle ATF), CVT fluid (continuous variable transmission), axle fluid, industrial gear oil, compressor oil, dielectric fluid (specifically dielectric immersion coolant for computers), hydraulic fluid, industrial gear oil, fiber optic cable filling gel, drilling fluid, oil used in lotions and creams (emollients in cosmetics and toiletries), shampoos, hair care products, greases, gas turbine lubricants, heat transfer fluids, metal-working fluids, textile fluids, bearing oils, gun oils (including CLP—clean lube protect—oils), as a component to be combined with vegetable oils to produce hydraulic fluids and other bio-based lubricants, or as viscosity modifiers and other thickeners.

These examples of fundamental molecular building blocks and products produced therefrom, including polymer products and intermediates, are illustrative of how the disclosed process can be applied across many different technologies and can lead to the certification of many different products as circular, and these illustrations are not intended to be exhaustive.

Reactors for the Production of Circular Chemicals and Polymers. In addition to considering the disclosed process in terms of the feeds, co-feeds, and products, the process can also be described in terms of possible reactor units and combinations of rector units that can produce circular products using pyrolysis oil as a co-feed. Therefore, in these examples, pyrolysis oil can be a feedstock or a co-feedstock, and any of the products can be certified as circular according to the processes disclosed herein. This list is not intended to be exhaustive, but rather exemplary of the types of reactors and reactor combinations that the process can be applied to. The processes for calculating the weight of the circular product is set out in the Examples and explained herein.

In an aspect, for example, the primary, the secondary, the tertiary, or subsequent processing units can comprise or can be selected independently from a refinery crude unit, an atmospheric distillation unit, a vacuum distillation unit, a separation unit, a hydroprocessing unit, a fluid catalytic cracking (FCC) unit, an FCC pre-treating unit upstream of a fluid catalytic cracking (FCC) unit, a steam cracking unit (liquid or gas), a natural gas liquids (NGL) unit, a reforming (aromatics) unit, an alkylation reactor, an aromatics purification unit, a polymerization reactor, an olefin oligomerization unit, an isomerization reactor, a metathesis reactor, a hydroformylation unit, a dehydroformylation unit, an oxidation unit, a reduction unit, a nitration unit, an amination unit, a nitrile unit, an amidation unit, a hydrogenation unit, a Fischer-Tropsch reactor, a methanol-to-olefins reactor, an alkylation unit, a catalytic dehydrogenation unit, a polyester unit, a polyamide unit, or a combination thereof.

In one aspect, one of the primary, the secondary, the tertiary, or subsequent processing units is a refinery crude unit. In the process, (a) one of the primary, the secondary, the tertiary, or subsequent processing units is a refinery crude unit; and (b) one or more of the refinery crude unit output streams comprise circular alkanes, circular naphthenes, circular natural gas liquids, circular light naphtha, circular heavy naphtha, circular gasoline, circular kerosene, circular diesel, or circular fuel oil.

In another aspect, (a) one of the primary, the secondary, the tertiary, or subsequent processing units is a hydroprocessing unit; and (b) the hydroprocessing unit feed further comprises hydrogen. In another aspect, (a) one of the primary, the secondary, the tertiary, or subsequent processing units is a hydroprocessing unit; and (b) the hydroprocessing unit can comprise or can be selected independently from a hydrocracker, a catalytic cracker operated in hydropyrolysis mode, a fluid catalytic cracker operated in hydropyrolysis mode, or a hydrotreater. A further aspect provides that (a) one of the primary, the secondary, the tertiary, or subsequent processing units is hydroprocessing unit; (b) the hydroprocessing unit feed can comprise petroleum or a heavy hydrocarbon fraction of petroleum and hydrogen; and (c) one or more of the hydroproces sing unit output streams comprise circular gasoline, circular fuel oil, circular naphtha, or circular olefins.

In another aspect, one of the primary, the secondary, the tertiary, or subsequent processing units is a fluid catalytic cracker (FCC) or any type of cracking unit. In one aspect, (a) one of the primary, the secondary, the tertiary, or subsequent processing units is a fluid catalytic cracker (FCC) or any type of cracking unit; (b) the FCC unit feed can comprise a heavy hydrocarbon fraction of petroleum; and (c) one or more of the FCC unit output streams comprise circular gasoline, circular fuel oil, circular naphtha, or circular olefins.

A further aspect provides that one of the primary, the secondary, the tertiary, or subsequent processing units is an FCC pre-treating unit upstream of a fluid catalytic cracking (FCC) unit. In this aspect, (a) one of the primary, the secondary, the tertiary, or subsequent processing units is an FCC pre-treating unit upstream of a fluid catalytic cracking (FCC) unit; (b) the FCC pre-treating unit feed can comprise petroleum or a heavy hydrocarbon fraction thereof; and (c) one or more of the FCC pre-treating unit output streams comprise a circular hydrocarbon having a lower sulfur content, a lower aromatic content, or both, as compared with the sulfur content and/or aromatic content in the feed.

In another aspect, one of the primary, the secondary, the tertiary, or subsequent processing units is a steam cracking unit. For example, (a) one of the primary, the secondary, the tertiary, or subsequent processing units is a steam cracking unit; (b) the steam cracking unit feed can comprise naphtha, liquefied petroleum gas (LPG), or light ($C_2$-$C_5$) hydrocarbons; and (c) one or more of the steam cracking unit output streams comprise circular ethylene, circular propylene, or a combination thereof. In this aspect, the concentration of ethylene and propylene in the one or more steam cracking unit output stream is greater than the concentration of ethylene and propylene in the steam cracking unit feed.

In another aspect, (a) one of the primary, the secondary, the tertiary, or subsequent processing units is a natural gas liquids (NGL) unit; and (b) the NGL unit feed can comprise a refinery-transfer stream. Thus, (a) one of the primary, the secondary, the tertiary, or subsequent processing units is a natural gas liquids (NGL) unit; and (b) one or more of the NGL unit output streams comprise circular light (C2-C5) hydrocarbons.

A further aspect provides that (a) the primary processing unit is a natural gas liquids (NGL) unit; and (b) the primary processing unit output stream can comprise circular light (C2-C5) hydrocarbons.

Another aspect of this disclosure provides that one of the primary, the secondary, the tertiary, or subsequent processing units is a reforming unit. For example, (a) the primary processing unit is a reforming unit; and (b) the reforming unit feed can comprise pyrolysis oil and naphtha. In a further example, (a) the primary processing unit is a reforming unit; (b) the reforming unit feed can comprise pyrolysis oil and naphtha; and (c) the reforming unit output stream can comprise circular aromatic hydrocarbons in a higher concentration than is present in the primary processing unit feed.

In an aspect, (a) the secondary processing unit is a separation unit; and (b) the separation unit feed can comprise aromatic hydrocarbons, aliphatic hydrocarbons, and hydrogen. For example, (a) the secondary processing unit is a separation unit; (b) the separation unit feed can comprise aromatic hydrocarbons, aliphatic hydrocarbons, and hydrogen; and (c) the separation unit output streams comprise an aromatic hydrocarbon-rich stream, an aliphatic hydrocarbon-rich stream, and wherein at least a portion of the aliphatic hydrocarbon-rich stream is recycled to the reforming unit.

Another aspect provides that (a) one of the primary, the secondary, the tertiary, or subsequent processing units is a polymerization reactor; (b) the polymerization reactor feed can comprise circular ethylene; and (c) the polymerization output stream can comprise circular polyethylene. In this aspect, the polymerization reactor feed further can comprise a circular comonomer or a non-circular comonomer. Also in this aspect, (a) one of the primary, the secondary, the tertiary, or subsequent processing units is a polymerization reactor; (b) the polymerization reactor feed can comprise circular propylene; and (c) the polymerization output stream can comprise circular polypropylene.

Combination of Reactors for Production of Circular Chemicals and Polymers. In addition, a variety of specific combinations of reactor units or processing units can be envisioned that can use the disclosed process of producing and certifying product as circular. Again, in these examples, pyrolysis oil can be a feedstock or a co-feedstock, and any of the products can be certified as circular according to the processes disclosed herein. These specific combinations of reactors are merely exemplary and not exhaustive.

Combinations Which May Relate to Producing Ethylene, Propylene, and Normal Alpha Olefins. In an aspect: (a) one of the primary processing units is a refinery crude unit, the refinery crude unit feed can comprise petroleum and pyrolysis oil, and the refinery crude unit output stream can comprise circular natural gas liquids; (b) one of the secondary processing units is a natural gas liquids (NGL) unit, wherein the NGL unit feed can comprise circular natural gas liquids from the refinery crude unit, and wherein the NGL unit output stream can comprise circular light ($C_2$-$C_5$) hydrocarbons; and (c) one of the tertiary processing units is a steam cracking unit, the steam cracking unit feed can comprise circular light ($C_2$-$C_5$) hydrocarbons from the NGL unit, and the steam cracking unit output stream can comprise circular light ($C_2$-$C_5$) olefins.

In another aspect of the disclosed process: (a) one of the primary processing units is a natural gas liquids (NGL) unit, the NGL unit feed can comprise natural gas liquids and pyrolysis oil, and the NGL unit output stream can comprise circular light ($C_2$-$C_5$) hydrocarbons; and (b) one of the secondary processing units is a steam cracking unit, the steam cracking unit feed can comprise circular light ($C_2$-$C_5$) hydrocarbons from the NGL unit, and the steam cracking unit output stream can comprise circular light ($C_2$-$C_5$) olefins.

In either of the above aspects which involve an NGL unit: (a) the NGL unit output stream can comprise circular ethane ($C_2$); and (b) the steam cracking unit feed can comprise circular ethane ($C_2$), and the steam cracking unit output stream can comprise circular ethylene. In this aspect, other downstream processing units can be used, for example, (c) one of the tertiary processing units is a polymerization unit, the polymerization unit feed can comprise circular ethylene from the steam cracking unit, and the polymerization unit output stream can comprise circular polyethylene. Also in this aspect, (c) one of the tertiary processing units is an olefin oligomerization unit, the olefin oligomerization unit feed can comprise circular ethylene from the steam cracking unit, and the olefin oligomerization unit output stream can comprise C4 to C30 normal alpha-olefins.

Alternatively, in the above aspects which involve an NGL unit: (a) the NGL unit output stream can comprise circular propane (C3); and (b) the steam cracking unit feed can comprise circular propane (C3), and the steam cracking unit output stream can comprise circular propylene. Further, if desired, (c) one of the tertiary processing units is a polymerization unit, the polymerization unit feed can comprise circular propylene from the steam cracking unit, and the polymerization unit output stream can comprise circular polypropylene.

Combinations Which May Relate to Producing Benzene, Styrene, and Polystyrene. In another aspect of reactor combinations: (a) one of the primary processing units is a refinery crude unit, the refinery crude unit feed can comprise petroleum and pyrolysis oil, and the refinery crude unit output stream can comprise circular naphtha; and (b) one of the secondary processing units is a reforming unit, the reforming unit feed can comprise circular naphtha from the refinery unit, and the reforming unit output stream can comprise circular benzene. Further to this aspect, (c) one of the tertiary processing units is an alkylation unit, the alkylation unit feed can comprise ethylene from the steam cracking unit and circular benzene from the reforming unit, and the alkylation unit output stream can comprise circular ethylbenzene. Still further to this aspect, (d) one of the quaternary processing units is a dehydrogenation unit, the alkylation unit feed can comprise circular ethylbenzene from the alkylation unit, and the dehydrogenation unit output stream can comprise circular styrene. Yet further to this aspect, (e) one of the quinary processing units is a polymerization unit, the polymerization unit feed can comprise circular styrene from the dehydration unit, and the polymerization unit output stream can comprise circular polystyrene.

In another aspect, (a) one of the primary processing units is a refinery crude unit, the refinery crude unit feed can comprise petroleum and pyrolysis oil, and two refinery crude unit output streams comprise, independently, [1] circular natural gas liquids, and [2] circular naphtha; (b) one of the secondary processing units is a natural gas liquids (NGL) unit, wherein the NGL unit feed can comprise circular natural gas liquids from the refinery crude unit, and wherein the NGL unit output stream can comprise circular light ($C_2$-$C_5$) hydrocarbons; and one of the secondary processing units is a reforming unit, wherein the reforming unit feed can comprise circular naphtha from the refinery crude unit, and the reforming unit output streams comprise circular benzene; (c) one of the tertiary processing units is a steam cracking unit, the steam cracking unit feed can comprise circular light ($C_2$-$C_5$) hydrocarbons from the NGL unit, and the steam cracking unit output stream can comprise circular ethylene; (d) one of the quaternary processing units is an alkylation unit, the alkylation unit feed can comprise circular ethylene from the steam cracking unit and circular benzene from the reforming unit, and the alkylation unit output stream can comprise circular ethylbenzene; and (e) one of the quinary processing units is a dehydrogenation unit, the alkylation unit feed can comprise circular ethylbenzene from the alkylation unit, and the dehydrogenation unit output stream can comprise circular styrene. Further to this aspect, (f) one of the senary processing units is a polymerization unit, the polymerization unit feed can comprise circular styrene from the dehydration unit, and the polymerization unit output stream can comprise circular polystyrene.

Combinations Which May Relate to Producing Nylon and Nylon Precursors. In another reactor combination which may be relevant to the production of nylon and its precursors: (a) one of the primary processing unit is a reforming unit, the reforming unit feed can comprise naphtha and pyrolysis oil, and the reforming unit output streams comprise circular benzene; and (b) one of the secondary processing unit is a hydrogenation unit, wherein the hydrogenation unit feed can comprise circular benzene from the reforming unit and hydrogen, and the hydrogenation unit output stream can comprise circular cyclohexane. Further to this aspect, (c) one of the tertiary processing unit is an oxidation unit, the oxidation unit feed can comprise circular cyclohexane, air, and nitric acid, and the oxidation unit output stream can comprise circular adipic acid. Further still to this aspect, (d) one of the quaternary processing unit is a nitrile unit, the nitrile unit feed can comprise circular adipic acid, and the nitrile unit output stream can comprise circular adiponitrile. Still further to this aspect: (e) one of the quinary processing units is a reduction unit, the reduction unit feed can comprise circular adiponitrile, and the reduction unit output stream can comprise circular hexamethylene diamine (HMDA). Further to this aspect: (f) one of the senary processing units is a polymerization unit, the polymerization unit feed comprise circular adipic acid and circular hexamethylene diamine (HMDA), and the polymerization unit output stream can comprise circular Nylon 6,6.

In another reactor combination which may be relevant to the production of nylon and its precursors: (a) one of the primary processing unit is a reforming unit, the reforming unit feed can comprise naphtha and pyrolysis oil, and the reforming unit output streams comprise circular benzene; (b) one of the secondary processing unit is a hydrogenation unit, wherein the hydrogenation unit feed can comprise circular benzene from the reforming unit and hydrogen, and the hydrogenation unit output stream can comprise circular cyclohexane; and (c) one of the tertiary processing units is an amidation unit, the amidation unit feed can comprise circular cyclohexane, and the amidation unit output stream can comprise circular caprolactam. Further to this aspect: (d) one of the quaternary processing units is a polymerization unit, the polymerization unit feed comprise circular caprolactam, and the polymerization unit output stream can comprise circular Nylon 6.

Again, while a variety of reactor combinations for producing circular chemicals and polymers according to this disclosure are presented, specific combinations of reactors are to be considered as merely exemplary and not exhaustive. Using pyrolysis oil as a feedstock or a co-feedstock, and any of the products can be certified as circular according to the processes disclosed herein.

Separation of Pyrolysis Oil. In the aspects of the disclosure described above, the pyrolysis oil was used without prior separation into its light and heavy components. However, it is possible and in some cases may be desirable to separate the pyrolysis oil into components based upon the intended use of the pyrolysis oil and the reactor into which it is desired to introduce the pyrolysis oil as a feed or co-feed. Even if the pyrolysis oil is separated, the accounting process of this disclosure can be used to certify products as circular.

Therefore in one aspect, this disclosure provides a process for producing chemicals or polymers from plastic waste, the process comprising:
(a) providing a pyrolysis oil from plastic waste, wherein the pyrolysis oil comprises light ($C_2$-$C_5$) hydrocarbons and heavy ($C_{6+}$) hydrocarbons;
(b) separating at least a portion of the pyrolysis oil into a pyrolysis gas stream comprising light ($C_2$-$C_5$) hydrocarbons and a pyrolysis liquid stream comprising the heavy ($C_{6+}$) hydrocarbons;
(c) providing a petroleum-based, fossil fuel-based, or bio-based feed;
(d) introducing one or more primary processing unit feeds, each comprising independently, [1] the pyrolysis gas stream, the pyrolysis liquid stream, the pyrolysis oil, or any combination thereof, and [2] the petroleum-based, fossil fuel-based, or bio-based feed, each at a known feed rate, into one or more primary processing units, thereby providing one or more primary processing unit feeds, each comprising a portion of the pyrolysis oil in a known concentration; and
(e) converting the one or more primary processing unit feeds into one or more primary processing unit output streams, a portion of each output stream comprising at least one circular product, wherein the weight or the fraction of each circular product attributable to the pyrolysis oil or plastic waste is determined by mass balance.

This process can further comprise
(f) transferring at least a portion of one, or at least a portion of more than one, of the primary processing unit output streams, each at a known feed rate, into one or more secondary or subsequent processing units, thereby providing one or more secondary or subsequent processing unit feeds, each comprising a circular product in a known concentration; and
(g) converting the one or more secondary or subsequent processing unit feeds into one or more secondary or subsequent processing unit output streams, a portion of each output stream comprising at least one circular product, wherein the weight or the fraction of each circular product attributable to the pyrolysis oil or plastic waste is determined by mass balance; and
(h) repeating steps (f) and (g) any number of times (0 or more) by:
[1] transferring at least a portion of one, or at least a portion of more than one, of the secondary or subsequent processing unit output streams, each at a known feed rate, into one or more tertiary or subsequent processing units, thereby providing one or more tertiary or subsequent processing unit feeds, each comprising a circular product in a known concentration; and
[2] converting the one or more tertiary or subsequent processing unit feeds into one or more tertiary or subsequent processing unit output streams, a portion of each output stream comprising at least one circular product, wherein the weight or the fraction of each circular product attributable to the pyrolysis oil or plastic waste is determined by mass balance.

In this aspect, steps (f) and (g) can be carried out any number of times, including zero (0), 1, 2, 3, 4, 5, 6, 7, 8, 9, or 10 times, or more than 10 times. While most processes to track circular products include fewer repetitions, this aspect demonstrates that the disclosed tracking and accounting process can extend through many different steps across many different types of reactors.

Accordingly, in either of the preceding aspects (a)-(e) or (a)-(h), the process can further comprise:
(i) certifying any one or more of the products in the primary processing unit output streams, secondary processing unit output streams, or tertiary or subsequent processing unit output streams, as Circular in accordance with International Sustainability and Carbon Certification (ISCC) standards, based upon the weight or fraction of the circular product attributable to the pyrolysis oil or plastic waste determined by mass balance and the free attribution method.

In one aspect, the pyrolysis oil, the pyrolysis gas stream, the pyrolysis liquid stream, or a combination thereof can be introduced into one or more of the secondary processing units or one or more of the secondary input streams, thereby providing one or more secondary processing unit feeds comprising a circular product in a known concentration and the pyrolysis oil or a fraction thereof in a known concentration.

In another aspect, the pyrolysis oil, the pyrolysis gas stream, the pyrolysis liquid stream, or a combination thereof is introduced into one or more of the tertiary or subsequent processing units or one or more of the tertiary or subsequent input streams, thereby providing one or more tertiary or subsequent processing unit feeds comprising a circular product in a known concentration and the pyrolysis oil or a fraction thereof in a known concentration.

Further to the process for producing chemicals or polymers from plastic waste according the above-describe aspects: (a) the primary processing unit is a natural gas liquids (NGL) unit, wherein: [1] the NGL unit feed can comprise pyrolysis oil, at least a portion of the pyrolysis gas stream, of both; [2] one or more of the NGL unit output streams can comprise light ($C_2$-$C_5$) hydrocarbons in a higher total concentration than is present in the pyrolysis gas stream; and [3] the fraction of light ($C_2$-$C_5$) hydrocarbons attributable to the pyrolysis oil or plastic waste is determined by mass balance; and (b) the secondary processing unit is a steam cracker, wherein: [1] the steam cracker feed can comprise at least a portion of the NGL unit output stream comprising light ($C_2$-$C_5$) hydrocarbons; [2] the steam cracker product stream comprising ethylene in a higher total concentration than is present in the NGL unit output stream; and [3] the fraction of ethylene attributable to the pyrolysis oil or plastic waste is determined by mass balance.

Further to this aspect, the examples of processing units in this section are also exemplary. For example, the primary, the secondary, the tertiary, or subsequent processing units can comprise or can be selected independently from a refinery crude unit, an atmospheric distillation unit, a vacuum distillation unit, a separation unit, a hydroprocessing unit, a fluid catalytic cracking (FCC) unit, an FCC pre-treating unit upstream of a fluid catalytic cracking (FCC) unit, a steam cracking unit (liquid or gas), a natural gas liquids (NGL) unit, a reforming (aromatics) unit, an alkylation reactor, an aromatics purification unit, a polymerization reactor, an isomerization reactor, a metathesis reactor, a hydroformylation unit, a dehydroformylation unit, an oxidation unit, a reduction unit, a nitration unit, an amination unit, a nitrile unit, an amidation unit, a hydrogenation unit, a Fischer-Tropsch reactor, a methanol-to-olefins reactor, an alkylation unit, a catalytic dehydrogenation unit, a polyester unit, a polyamide unit, or a combination thereof.

In another aspect, the process for producing chemicals or polymers from plastic waste can comprise:
  (a) providing a pyrolysis oil from plastic waste, wherein the pyrolysis oil comprises light ($C_2$-$C_5$) hydrocarbons and heavy ($C_{6+}$) hydrocarbons;
  (b) separating at least a portion of the pyrolysis oil into a pyrolysis gas stream comprising at least a portion of the light ($C_2$-$C_5$) hydrocarbons and a pyrolysis liquid stream comprising at least a portion of the heavy ($C_6$+) hydrocarbons;
  (c) feeding at least a portion of the pyrolysis gas stream to a Natural Gas Liquids (NGL) unit to provide an NGL product stream comprising ethane in a higher total concentration than is present in the pyrolysis gas stream, wherein the fraction of ethane attributable to the pyrolysis oil or plastic waste is determined by mass balance;
  (d) feeding at least a portion of the pyrolysis liquid stream to a reforming unit to provide a reforming product stream comprising benzene in a higher concentration than is present in the pyrolysis liquid stream, wherein the fraction of benzene attributable to the pyrolysis oil or plastic waste is determined by mass balance;
  (e) processing the NGL product stream in a steam cracker to provide a steam cracker product stream comprising ethylene in a higher total concentration than is present in the NGL product stream, wherein the fraction of ethylene olefins attributable to the pyrolysis oil or plastic waste is determined by mass balance;
  (f) feeding the steam cracker product stream, the reforming product stream, or both into one or more subsequent processing units to provide one or more corresponding output streams, a fraction of each output stream comprising a circular product, wherein the fraction of the circular product attributable to the pyrolysis oil or plastic waste is determined by mass balance.

In a further aspect, this process can further comprise the step of:
  (g) certifying the chemical or the polymer as Circular in accordance with International Sustainability and Carbon Certification (ISCC) standards, based upon the weight or fraction of the circular product attributable to the pyrolysis oil or plastic waste determined by mass balance and the free attribution method.

As a further example and aspect, (a) the steam cracker product stream comprising ethylene can be fed to a subsequent polymerization unit; and (b) the circular product can comprise circular polyethylene.

Further Aspects and Embodiments of the Disclosed Process. In a further aspect, the processes and methods of this disclosure can be described in an alternative method, as follows. The following abbreviations are employed in this alternative description.
  P; Processing Unit ("Processing Unit" is broader than "Reactor" because it includes separation units as well as reactors);
  I; Input Stream (one or multiple Input Streams can be used with any Processing Unit);
  F; Feed for any Processing Unit, which is the one or total of the multiple Input Streams;
  O; Output stream (one or multiple Output Streams can exist with any Processing Unit);
  $O^{x.y}$; $I^{x.y}$; and the like: x=Processing Unit number; y=Output or Input Stream number for the $x^{th}$ Processing Unit. For example, two Output Streams for the Primary processing unit would be designated $O^{1.1}$ and $O^{1.2}$, whereas a single Output Stream for the Secondary processing unit would be designated $O^{2.1}$.

Therefore, in an aspect, this disclosure provides a process for producing chemicals or polymers from plastic waste, the process comprising:
  (a) providing a pyrolysis oil from plastic waste, wherein the pyrolysis oil comprises light ($C_2$-$C_5$) hydrocarbons and heavy ($C_{6+}$) hydrocarbons;
  (b) providing a petroleum-based, fossil fuel-based, or bio-based feed;
  (c) introducing [1] the pyrolysis oil or a fraction thereof and [2] the petroleum-based, fossil fuel-based, or bio-based feed, each at a known feed rate, into a primary processing unit ($P^1$) as one or more (a) first input streams ($I^{1.1}$, . . . $I^{1.2}$ a is an integer), thereby providing a primary processing unit feed ($F^1$) comprising the pyrolysis oil in a known concentration; and
  (d) converting the primary processing unit feed ($F^1$) into one or more (m) primary processing unit output streams ($O^{1.1}$, . . . $O^{1.m}$, m is an integer), each output stream comprising at least one circular product, wherein the weight or the fraction of each circular product attributable to the pyrolysis oil or plastic waste is determined by mass balance.

In another aspect, there are provided the further steps of:
  (e) transferring at least a portion of one, or at least a portion of more than one, of the primary processing unit output streams ($O^{1.1}$, . . . $O^{1.m}$) into one or more (x) secondary processing units ($P^2$, . . . $P^{1+x}$, x is an integer) as one or more (b) secondary input streams ($I^{2.1}$, . . . $I^{1+x.1}$, . . . , wherein b is the total number of secondary input streams), thereby providing one or more secondary processing unit feeds ($F^2$, . . . $F_{1+x}$), each comprising a circular product in a known concentration; and
  (f) converting the one or more secondary processing unit feeds ($F^2$, $F^{1+x}$) into one or more (n) secondary processing unit output streams ($O^{2.1}$, . . . $O^{1+x.1}$, . . . , wherein n is the total number of secondary processing unit output streams), each output stream comprising at least one circular product, wherein the weight or the fraction of each circular product attributable to the pyrolysis oil or plastic waste is determined by mass balance.

In yet another aspect, there are provided the further steps of:
  (g) transferring at least a portion of one, or at least a portion of more than one, of the secondary processing unit output streams ($O^{2.1}$, . . . $O^{1+x.1}$, . . . ) into one or more (y) tertiary processing units ($P^{2+x}$, . . . , $P^{2+x+y}$, y is an integer) as one or more (c) tertiary input streams ($I^{3.1}$, . . . $I^{1+x+y.1}$, . . . , wherein c is the total number of tertiary input streams), thereby providing one or more tertiary processing unit feeds ($F^{2+x}, \ldots F^{2+x+y}$), each comprising a circular product in a known concentration; and (h) converting the one or more tertiary processing unit feeds ($F^{2+x}, \ldots F^{2+x+y}$) into one or more (p) tertiary processing unit output streams ($O^{2+x.1}, \ldots O^{2+x+y.1}, \ldots$, wherein p is the total number of tertiary processing unit output streams), each output stream comprising at least one circular product, wherein the weight or the fraction of each circular product attributable to the pyrolysis oil or plastic waste is determined by mass balance.

In still a further aspect, there is provided the further step of (i) certifying any one or more of the primary processing unit output streams ($O^{1.1}, \ldots O^{1.m}$), one or more of the secondary processing unit output streams ($O^{2.1}, \ldots O^{1+x.1}$, or one or more of the tertiary processing unit output streams ($O^{2+x.1}, \ldots O^{2+x+y.1}, \ldots$) as Circular in accordance with International Sustainability and Carbon Certification (ISCC) standards, based upon the weight or fraction of the circular product attributable to the pyrolysis oil or plastic waste determined by mass balance and the free attribution method.

According to a further aspect, this process is applicable regardless of how a pyrolysis oil co-feed may be introduced to a processing unit. For example, the pyrolysis oil can be introduced into the primary processing unit by:

(a) combining the pyrolysis oil and the petroleum-based, fossil fuel-based, or bio-based feed prior to introducing the pyrolysis oil and the petroleum-based, fossil fuel-based, or bio-based feed into the primary processing unit;

(b) introducing the pyrolysis oil directly into the primary processing unit; or (c) a combination of (a) and (b).

In either case, the calculation and certification of the weight of circular product is carried out in the same manner as explained herein and as demonstrated in the Examples.

In one aspect, the pyrolysis oil is not separated into light ($C_2$-$C_5$) hydrocarbons and heavy ($C_{6+}$) hydrocarbons prior to introducing the pyrolysis oil into the primary processing unit ($P^1$). In another aspect, the pyrolysis oil can be separated into the light ($C_2$-$C_5$) hydrocarbons and heavy ($C_{6+}$) hydrocarbons prior to introducing the pyrolysis oil into the primary processing unit ($P^1$), and one of the light ($C_2$-$C_5$) hydrocarbons or the heavy ($C_{6+}$) hydrocarbons is introduced the pyrolysis oil into the primary processing unit ($P^1$).

Another aspect provides that pyrolysis oil comprising light ($C_2$-$C_5$) hydrocarbons and heavy ($C_{6+}$) hydrocarbons can be introduced into one or more of the secondary processing units ($P^2, \ldots P^{1+x}$) or one or more of the secondary input streams ($I^{2.1}, \ldots I^{1+x.1}, \ldots$), thereby providing one or more secondary processing unit feeds ($F^2, \ldots F^{1+x}$) comprising a circular product in a known concentration and the pyrolysis oil. Still a further aspect provides that the pyrolysis oil comprising light ($C_2$-$C_5$) hydrocarbons and heavy ($C_{6+}$) hydrocarbons can be introduced into one or more of the tertiary processing units ($P^{2+x}, \ldots P^{2+x+y}$) or one or more of the tertiary input streams ($I^{3.1}, \ldots I^{1+x+y.1}, \ldots$), thereby providing one or more tertiary processing unit feeds ($F^{2+x}, \ldots F^{2+x+y}$) comprising a circular product in a known concentration and the pyrolysis oil.

In these aspects as well, the primary, the secondary, the tertiary, or subsequent processing units can comprise or can be selected independently from a refinery crude unit, an atmospheric distillation unit, a vacuum distillation unit, a separation unit, a hydroprocessing unit, a fluid catalytic cracking (FCC) unit, an FCC pre-treating unit upstream of a fluid catalytic cracking (FCC) unit, a steam cracking unit (liquid or gas), a natural gas liquids (NGL) unit, a reforming (aromatics) unit, an alkylation reactor, an aromatics purification unit, a polymerization reactor, an olefin oligomerization unit, an isomerization reactor, a metathesis reactor, a hydroformylation unit, a dehydroformylation unit, an oxidation unit, a reduction unit, a nitration unit, an amination unit, a nitrile unit, an amidation unit, a hydrogenation unit, a Fischer-Tropsch reactor, a methanol-to-olefins reactor, an alkylation unit, a catalytic dehydrogenation unit, a polyester unit, a polyamide unit, or a combination thereof.

Compositions Comprising Circular Products. Another aspect of this disclosure provides a composition comprising a circular chemical, polymer, material, or product which is certified as circular in accordance with International Sustainability and Carbon Certification (ISCC) standards. There is also provided a composition comprising a circular chemical or polymer which is certified as circular in accordance with International Sustainability and Carbon Certification (ISCC) standards, wherein the chemical or polymer is produced in accordance with any aspect of this disclosure.

EXAMPLES

General Considerations

Pyrolysis oil. According to this disclosure the pyrolysis oil can be added into an ethylene/ethane cracker, or the pyrolysis oil can be added into a fluid catalytic cracker (FCC) at the refinery level. Therefore unless otherwise noted or unless the context requires otherwise, the term cracker can refer to either an ethylene/ethane cracker a fluid catalytic cracker.

Certification calculations of percent circular product. The ISCC Sustainability Declarations are issued for discrete mass quantities of product, therefore certification is for a particular product weight. Conversion factors for use in the certification calculation may vary considerably depending upon the particular reactor, processing unit, and conditions, and conversion factors are predetermined and therefore backward looking. Conversion factors can be re-determined as required for certification, for example in the absence of a change in processing conditions, conversion factors can be re-determined and adjusted annually. The certification calculation of the weight of circular product is based upon the assumption that most of the weight of the pyrolysis oil added into the cracker and mixed with the petroleum-based, fossil fuel-based, or bio-based feed is also manifested in the circular product. Therefore, this calculation assumes that the conversion rate applies to the pyrolysis oil portion of the feed as well as the petroleum-based, fossil fuel-based, or bio-based feedstock.

Therefore, this certification process uses a free attribution method to assign circular product credit to every product stream, minus any waste streams such as the portion of the stream which is flared. Moreover, the free attribution method allows all the credit produced from mixing a pyrolysis oil stream with a petroleum-based, fossil fuel-based, or bio-based feed to be distributed as desired to any or all of the processing unit (e.g. cracker) products from that stream, again less any waste stream. For example, as long as pyrolysis oil is used to generate ethylene, propylene, fuel gas, and any other product which is recovered from a stream, the total circular product credit from all the recovered product can be taken as circular ethylene.

This free attribution method is reasonably grounded in the measured or calculated conversion factors for the various plants or units which are reflected in this disclosure, which may have conversion factors of >0.90, for example, in a range of from about 0.90 to about 0.998. Therefore, to determine the weight of circular ethylene produced, this ca. 1 conversion factor is multiplied by the weight of pyrolysis oil fed to the cracker. This free attribution principle is also applied to the polyethylene (PE) reactor and the fluid catalytic cracker (FCC), which have similarly high conversion factors. The application of this calculation method is demonstrated in the examples below.

Example 1. Certification Calculation for the Production of Ethylene

A feed containing 10 wt % concentration of pyrolysis oil mixed with petroleum-based, fossil fuel-based, or bio-based feedstock is fed to a cracker. It has been previously calculated over a discrete time period that the cracker converts the feedstock into ethylene (60 wt %), propylene (25 wt %), and fuel gas (12 wt %) mix accounting for 97 wt % recovered product, with the remaining 3 wt % flared. Therefore in this example, the calculated conversion factor for the cracker is 0.97 for the previous time period. Every hundred pounds of total feedstock contain 10 pounds of pyrolysis oil (10 wt % concentration), with the balance being the petroleum-based, fossil fuel-based, or bio-based feed. The weight of circular product attributed to the pyrolysis oil can therefore be calculated as 9.7 pounds (10 pounds×0.97 conversion factor). The entire amount of the 9.7 pounds of circular product is attributed to the recovered ethylene for circularity. Therefore, the resulting circular ethylene is certified as 9.7 pounds in accordance with the ISCC standards.

Example 2. Certification Calculation for the Production of Ethylene Homopolymer

The ethylene produced according to Example 1 containing circular product is fed to a polymerization reactor and converted to ethylene homopolymer. Therefore, 60 pounds of ethylene (100 pounds feedstock×60 wt %) are calculated to contain 9.7 pounds of circular ethylene. It has been previously calculated over a discrete time period that the polymerization reactor converts an ethylene feedstock into polyethylene (98 wt %), with the remaining 2 wt % discarded, therefore in this example, the calculated conversion factor for the polymerization reactor is 0.98 for the previous time period.

The total polyethylene product from 60 pounds of ethylene is 58.8 pounds (60 pounds total ethylene×0.98 conversion factor). The weight of circular polyethylene product attributed to the pyrolysis oil can therefore be calculated as 9.5 pounds (9.7 pounds circular ethylene×0.98 conversion factor) and certified as 9.5 pounds in accordance with the ISCC standards.

Example 3. Certification Calculation for the Production of Ethylene Copolymer

The ethylene produced according to Example 1 containing circular product is fed to a polymerization reactor with non-circular comonomer 1-hexene and converted to poly (ethylene-co-1-hexene) copolymer. Therefore, 60 pounds of ethylene (100 pounds feedstock×60 wt %) are calculated to contain 9.7 pounds of circular ethylene. It has been previously calculated over a discrete time period that the polymerization reactor converts an ethylene and 1-hexene feed into poly(ethylene-co-1-hexene) (98 wt %), with the remaining 2 wt % discarded, therefore in this example also, the calculated conversion factor for the polymerization reactor is for the previous time period.

The total poly(ethylene-co-1-hexene) product from 60 pounds of ethylene is therefore 58.8 pounds (60 pounds total ethylene×0.98 conversion factor). The weight of circular poly(ethylene-co-1-hexene) product attributed to the pyrolysis oil can therefore be calculated as 9.5 pounds (9.7 pounds circular poly(ethylene-co-1-hexene)×0.98 conversion factor) and certified as 9.5 pounds in accordance with the ISCC standards.

Example 4. Certification Calculation for the Production of Ethylene Copolymer

The ethylene produced according to Example 1 containing circular product is fed to a polymerization reactor with circular comonomer 1-hexene and converted to poly(ethylene-co-1-hexene) copolymer. Therefore, 60 pounds of ethylene (100 pounds feedstock×60 wt %) are calculated to contain 9.7 pounds of circular ethylene. The feed in this example can contain 60 pounds of ethylene (9.7 pounds circular) and 5 pounds 1-hexene, of which 1 pounds is certified as circular, for a total feed of 65 pounds with 10.7 pounds (9.7 pounds circular ethylene+1 pounds circular 1-hexene) of the feed being certified as circular. It has been previously calculated over a discrete time period that the polymerization reactor converts an ethylene and 1-hexene feed into poly(ethylene-co-1-hexene) (98 wt %), with the remaining 2 wt % discarded, therefore in this example also, the calculated conversion factor for the polymerization reactor is 0.98 for the previous time period.

The total poly(ethylene-co-1-hexene) product from this 65 pound feed is therefore 63.7 pounds (65 pounds total feed×0.98 conversion factor). The weight of circular poly (ethylene-co-1-hexene) product attributed to the pyrolysis oil can therefore be calculated as pounds [(9.7 pounds circular ethylene×0.98 conversion factor)+(1 pounds circular 1-hexene×0.98 conversion factor)] and certified as 10.49 pounds in accordance with the ISCC standards. This circular product of 10.49 pounds can also be readily calculated using the 10.7 pounds of circular product in the 65 pounds of feed×0.98 conversion factor.

Example 5. Certification Calculation for the Production of Ethylbenzene

The principles illustrated above can be applied to other products and the certification of a certain weight of product produced as circular in accordance with the ISCC standards can be calculated. In this example, a benzene comprising circular benzene is reacted with ethylene comprising circular ethylene in a catalyzed reaction to produce ethylbenzene. Each hundred pounds of total feedstock contain 10 pounds of circular benzene and 5 pounds of circular ethylene. It has been previously calculated over a discrete time period that this reactor converts a benzene and ethylene feed into a mix of ethylbenzene (95 wt %) plus 3% other products which are recovered, with the remaining 2 wt % discarded. Therefore in this example, the calculated conversion factor for the reaction unit is 0.98 for the previous time period.

The total ethylbenzene product from 100 pounds of total feed is therefore 95 pounds (100 pounds total feed×95 wt %). The weight of circular ethylbenzene attributed to the circular benzene and circular ethylene can therefore be calculated as 14.7 pounds [(10 pounds circular benzene× 0.98 conversion factor)+(5 pounds circular ethylene×0.98 conversion factor)] and certified as 14.7 pounds in accordance with the ISCC standards.

According, these and other aspects of the disclosure can further include the various embodiments that are presented in the ASPECTS OF THE DISCLOSURE set out below.

ASPECTS OF THE DISCLOSURE

Aspect 1. A process for producing chemicals or polymers from plastic waste, the process comprising:
  (a) providing a pyrolysis oil from plastic waste;
  (b) providing a petroleum-based, fossil fuel-based, or bio-based feed;
  (c) introducing the pyrolysis oil and the petroleum-based, fossil fuel-based, or bio-based feed, each at a known feed rate, into one or more primary processing units, thereby providing one or more primary processing unit feeds, each comprising the pyrolysis oil in a known concentration; and
  (d) converting the one or more primary processing unit feeds into one or more primary processing unit output streams, a portion of each output stream comprising at least one circular product, wherein the weight or the fraction of each circular product attributable to the pyrolysis oil or plastic waste is determined by mass balance.

Aspect 2. A process for producing chemicals or polymers from plastic waste according to Aspect 1, wherein the process further comprises:
  (e) transferring at least a portion of one, or at least a portion of more than one, of the primary processing unit output streams, each at a known feed rate, into one or more secondary or subsequent processing units, thereby providing one or more secondary or subsequent processing unit feeds, each comprising a circular product in a known concentration; and
  (f) converting the one or more secondary or subsequent processing unit feeds into one or more secondary or subsequent processing unit output streams, a portion of each output stream comprising at least one circular product, wherein the weight or the fraction of each circular product attributable to the pyrolysis oil or plastic waste is determined by mass balance; and
  (g) repeating steps (e) and (f) any number of times (zero or more) by:
    [1] transferring at least a portion of one, or at least a portion of more than one, of the secondary or subsequent processing unit output streams, each at a known feed rate, into one or more tertiary or subsequent processing units, thereby providing one or more tertiary or subsequent processing unit feeds, each comprising a circular product in a known concentration; and
    [2] converting the one or more tertiary or subsequent processing unit feeds into one or more tertiary or subsequent processing unit output streams, a portion of each output stream comprising at least one circular product, wherein the weight or the fraction of each circular product attributable to the pyrolysis oil or plastic waste is determined by mass balance.

Aspect 3. A process for producing chemicals or polymers from plastic waste according to Aspect 2, wherein repeating steps (e) and (f) is carried out 0, 1, 2, 3, 4, 5, 6, 7, 8, 9, or 10 times.

Aspect 4. A process for producing chemicals or polymers from plastic waste according to any of the preceding Aspects, wherein the process further comprises:
  (h) certifying any one or more of the products in the primary processing unit output streams, secondary processing unit output streams, or tertiary or subsequent processing unit output streams, as Circular in accordance with International Sustainability and Carbon Certification (ISCC) standards, based upon the weight or fraction of the circular product attributable to the pyrolysis oil or plastic waste determined by mass balance and the free attribution method.

Aspect 5. A process for producing chemicals or polymers from plastic waste according to any of the preceding Aspects, wherein the pyrolysis oil is introduced into the primary processing unit by:
  (a) combining the pyrolysis oil and the petroleum-based, fossil fuel-based, or bio-based feed prior to introducing the pyrolysis oil and the petroleum-based, fossil fuel-based, or bio-based feed into the primary processing unit;
  (b) introducing the pyrolysis oil directly into the primary processing unit; or
  (c) a combination of (a) and (b).

Aspect 6. A process for producing chemicals or polymers from plastic waste according to any of the preceding Aspects, wherein the pyrolysis oil is present in the primary processing unit feed in a concentration of from about 0.1 wt % to about 25 wt %; alternatively, from about 0.2 wt % to about 22 wt %; alternatively, from about 0.5 wt % to about 20 wt %; alternatively, from about 1 wt % to about 18 wt %; alternatively, from about 2 wt % to about 17 wt %; alternatively, from about 5 wt % to about 15 wt %; or alternatively, from about 8 wt % to about 12 wt %.

Aspect 7. A process for producing chemicals or polymers from plastic waste according to any of the preceding Aspects, wherein the pyrolysis oil is present in the primary processing unit feed in a concentration of about 0.1 wt %, about 0.2 wt %, about 0.5 wt %, about 1 wt %, about 2 wt %, about 3 wt %, about 4 wt %, about 5 wt %, about 6 wt %, about 7 wt %, about 8 wt %, about 9 wt %, about 10 wt %, about 11 wt %, about 12 wt %, about 13 wt %, about 14 wt %, about 15 wt %, about 16 wt %, about 17 wt %, about 18 wt %, about 10 wt %, about 20 wt %, about 21 wt %, about 22 wt %, about 23 wt %, about 24 wt %, about 25 wt %, or any range or combination of ranges therebetween.

Aspect 8. A process for producing chemicals or polymers from plastic waste according to any of Aspects 1-7, wherein the process employs two or more primary processing units, and the pyrolysis oil is introduced into only one of the primary processing units.

Aspect 9. A process for producing chemicals or polymers from plastic waste according to any of Aspects 1-7, wherein the process employs two or more primary processing units, and the pyrolysis oil is introduced, independently, into any two or more primary processing units.

Aspect 10. A process for producing chemicals or polymers from plastic waste according to any of Aspects 1-9, wherein the process employs two or more secondary processing units, and any primary processing unit output streams are transferred into only one of the secondary processing units.

Aspect 11. A process for producing chemicals or polymers from plastic waste according to any of Aspects 1-9, wherein the process employs two or more secondary processing units, and any primary processing unit output streams are transferred, independently, into any two or more secondary processing units.

Aspect 12. A process for producing chemicals or polymers from plastic waste according to any of Aspects 1-11, wherein the process employs two or more tertiary processing units, and any secondary processing unit output streams are transferred into only one of the tertiary processing units.

Aspect 13. A process for producing chemicals or polymers from plastic waste according to any of Aspects 1-11, wherein the process employs two or more tertiary processing units, and any secondary processing unit output streams are transferred, independently, into any two or more of the tertiary processing units.

Aspect 14. A process for producing chemicals or polymers from plastic waste according to any of Aspects 1-13, wherein the process employs two or more subsequent processing units, and any tertiary processing unit output streams are transferred into only one of the subsequent processing units.

Aspect 15. A process for producing chemicals or polymers from plastic waste according to any of Aspects 1-13, wherein the process employs two or more subsequent processing units, and any tertiary processing unit output streams are transferred, independently, into any two or more of the subsequent processing units.

Aspect 16. A process for producing chemicals or polymers from plastic waste according to any of the preceding Aspects, wherein the pyrolysis oil comprises light ($C_2$-$C_5$) hydrocarbons and heavy ($C_{6+}$) hydrocarbons, and the pyrolysis oil is not separated into light ($C_2$-$C_5$) hydrocarbons and heavy ($C_{6+}$) hydrocarbons prior to introducing the pyrolysis oil into the primary processing unit.

Aspect 17. A process for producing chemicals or polymers from plastic waste according to any of the preceding Aspects, further comprising the step of introducing the pyrolysis oil or a fraction thereof into one or more of the secondary processing units or one or more of the secondary input streams, thereby providing one or more secondary processing unit feeds comprising a circular product in a known concentration and the pyrolysis oil or a fraction thereof in a known concentration.

Aspect 18. A process for producing chemicals or polymers from plastic waste according to any of the preceding Aspects, further comprising the step of introducing the pyrolysis oil or a fraction thereof into one or more of the tertiary or subsequent processing units or one or more of the tertiary or subsequent input streams, thereby providing one or more tertiary or subsequent processing unit feeds comprising a circular product in a known concentration and the pyrolysis oil or a fraction thereof in a known concentration.

Aspect 19. A process for producing chemicals or polymers from plastic waste according to any of the preceding Aspects, wherein the pyrolysis oil is derived from pyrolysis of polyolefins, polyethylene, polypropylene, polystyrene, polyethylene terephthalate (PET), polyvinyl chloride (PVC), polyamide, polycarbonate, polyurethane, polyester, copolymers thereof, filled polymers thereof, composites thereof, natural or synthetic rubber, tires, or any combination thereof.

Aspect 20. A process for producing chemicals or polymers from plastic waste according to any of the preceding Aspects, wherein at least a portion of one or more of the primary, the secondary, the tertiary, or subsequent processing unit output streams is used as a fuel.

Aspect 21. A process for producing chemicals or polymers from plastic waste according to any of the preceding Aspects, wherein at least a portion of any of the one or more primary processing unit output streams, the one or more secondary processing unit output streams, the one or more tertiary processing unit output streams, or the one or more subsequent processing unit output streams is recycled to any upstream processing unit.

Aspect 22. A process for producing chemicals or polymers from plastic waste according to any of the preceding Aspects, wherein the pyrolysis oil is characterized by any one or any combination of more than one of the following properties:
  (a) a Reid Vapor Pressure, psia @ 100° F. (ASTM-D-5191) of ≤15 psia @ 100° F., ≤12 psia @ 100° F., ≤10 psia @ 100° F., ≤5 psia @ 100° F., or any range between two of these recited values;
  (b) an Upper Pour Point, ° F. (ASTM D-97 or D5950-14) of ≤200° F., ≤150° F., ≤125° F., or any range between two of these recited values;
  (c) a sulfur concentration, wt % (ASTM D-4294 or D2622) of ≤1.8 wt %, ≤1.5 wt %, ≤1.0 wt %, ≤0.7 wt %, or any range between two of these recited values;
  (d) a nitrogen concentration, ppm (ASTM D-4629 or D5762) of ≤2500 ppm, ≤3500 ppm, ≤4500 ppm, or any range between two of these recited values;
  (e) a water by dist. concentration, wt % (ASTM D-95) of ≤0.1 wt %, ≤0.5 wt %, 0.9 wt %, or any range between two of these recited values;
  (f) a sodium concentration, ppm (ASTM D-5185) of ≤2.0 ppm, ≤5.0 ppm, ≤7.5 ppm, ≤10.0 ppm, or any range between two of these recited values;
  (g) a nickel concentration, ppm (ASTM D-5185) of ≤1.5 ppm, ≤5.0 ppm, ≤8.0 ppm, ≤12.0 ppm, or any range between two of these recited values;
  (h) a vanadium concentration, ppm (ASTM D-5185) of ≤2.5 ppm, ≤6.0 ppm, ≤10.5 ppm, ≤14.0 ppm, or any range between two of these recited values;
  (i) an iron concentration, ppm (ASTM D-5185) of ≤1.5 ppm, ≤4.0 ppm, ≤8.0 ppm, ≤10.5 ppm, or any range between two of these recited values;
  (j) a copper concentration, ppm (ASTM D-5185) of ≤0.4 ppm, ≤1.8 ppm, ≤3.0 ppm, ≤4.6 ppm, or any range between two of these recited values;
  (k) a BS&W, vol % (ASTM D-2709) of ≤0.1 vol %, ≤0.25 vol %, ≤0.50 vol %, ≤1.0 vol % based on water volume without sediment, or any range between two of these recited values;
  (l) an Acid Number, mg/KOH/g (ASTM D664) of ≤0.01 mg/KOH/g, ≤0.50 mg/KOH/g, ≤1.2 mg/KOH/g, ≤2.2 mg/KOH/g, or any range between two of these recited values;
  (m) a chloride concentration, ppm (UOP 588) of ≤25 ppm, ≤50 ppm, ≤75 ppm, ≤100 ppm, or any range between two of these recited values;
  (n) a Distillation End Point, ° F. (D86 or D2887) of ≤600° F., ≤750° F., ≤1000° F., ≤1250° F., ≤1450° F., or any range between two of these recited values;
  (o) a Filterable Solids Content, wt % (PR 1826) of ≤0.02 wt %, ≤0.04 wt %, ≤0.06 wt %, ≤1.0 wt %, ≤1.2 wt %, or any range between two of these recited values; or
  (p) a Heptane Insolubles Content, wt % (ASTM D-3279) of ≤0.02 wt %, ≤0.04 wt %, ≤0.06 wt %, ≤1.0 wt %, ≤1.2 wt %, or any range between two of these recited values;
  (q) a fluoride concentration, ppm (ASTM D-7359) of ≤1.0 ppm, ≤1.5 ppm, ≤2 ppm, ≤5 ppm, ≤10 ppm, or ≤15 ppm;

(r) a silicon concentration, ppm (ASTM D-5185) of from ≤1.0 ppm, ≤1.5 ppm, ≤2 ppm, ≤5 ppm, ≤10 ppm, or ≤15 ppm; or
(s) a phosphorus concentration, ppm (ASTM D-5185) of ≤1.0 ppm, ≤1.5 ppm, ≤2 ppm, ≤5 ppm, ≤10 ppm, or ≤15 ppm.

Aspect 23. A process for producing chemicals or polymers from plastic waste according to any of the preceding Aspects, wherein the pyrolysis oil is characterized by any one or any combination of more than one of the following properties:
(a) a Reid Vapor Pressure, psia @ 100° F. (ASTM-D-5191) of from 5 psia @ 100° F. to 15 psia @ 100° F.;
(b) an Upper Pour Point, ° F. (ASTM D-97 or D5950-14) of from 75° F. to 200° F.;
(c) a sulfur concentration, wt % (ASTM D-4294 or D2622) of from 0.2 wt % to 1.5 wt %;
(d) a nitrogen concentration, ppm (ASTM D-4629 or D5762) of from 2250 ppm to 4450 ppm;
(e) a water by dist. concentration, wt % (ASTM D-95) of from 0.1 wt % to 0.9 wt %;
(f) a sodium concentration, ppm (ASTM D-5185) of from 2.5 ppm to 8.5 ppm;
(g) a nickel concentration, ppm (ASTM D-5185) of from 1.5 ppm to 10.5 ppm;
(h) a vanadium concentration, ppm (ASTM D-5185) of from 2.0 ppm to 12.5 ppm;
(i) an iron concentration, ppm (ASTM D-5185) of from 2.0 ppm to 10.5 ppm;
(j) a copper concentration, ppm (ASTM D-5185) of from 0.5 ppm to 4.5 ppm;
(k) a BS&W, vol % (ASTM D-2709) of from 0.1 vol % to 1.0 vol % based on water volume without sediment;
(l) an Acid Number, mg/KOH/g (ASTM D664) of from 0.01 mg/KOH/g to 2.0 mg/KOH/g;
(m) a chloride concentration, ppm (UOP 588) of from 22.5 ppm to 100 ppm;
(n) a Distillation End Point, ° F. (D86 or D2887) of from 600° F. to 1600° F.;
(o) a Filterable Solids Content, wt % (PR 1826) of from 0.04 wt % to 0.15 wt %;
(p) a Heptane Insolubles Content, wt % (ASTM D-3279) of from 0.03 wt % to 0.13 wt %;
(q) a fluoride concentration, ppm (ASTM D-7359) of from the detectable limit to 25 ppm or from 1.0 ppm to 25 ppm;
(r) a silicon concentration, ppm (ASTM D-5185) of from the detectable limit to 25 ppm or from 1.0 ppm to 25 ppm; or
(s) a phosphorus concentration, ppm (ASTM D-5185) of from the detectable limit to 25 ppm or from 1.0 ppm to 25 ppm.

Aspect 24. A process for producing chemicals or polymers from plastic waste according any of Aspects 22-23, wherein the pyrolysis oil is characterized by any ten (10) of the recited properties, any twelve (12) of the recited properties, any fourteen (14) of the recited properties, or all of the recited properties.

Aspect 25. A process for producing chemicals or polymers from plastic waste according to any of the preceding Aspects, wherein the pyrolysis oil is characterized or further characterized by any one, any two, any three, or all four of the following properties:
(a) a Pour Point (ASTM D97 or ISO:3016) of less than or equal to about −40° C.;
(b) a Kinematic Viscosity (ASTM D445 or ISO:3104) of any one or more of (i) about 3.0 mm²/s or from about 2 cSt to about 20 cSt (100° C.), (ii) 11.0 mm²/s (40° C.), or (iii) about 76.0 mm²/s (0° C.);
(c) a Flash point (ISO:2719) of greater than or equal to about 140° C.; or
(d) a dielectric breakdown voltage (ASTM D1816) of from about 10 kV/mm to about 60 kV/mm, from about 15 kV/mm to about 40 kV/mm, or from about 20 kV/mm to about 30 kV/mm.

Aspect 26. A process for producing chemicals or polymers from plastic waste according to any of the preceding Aspects, wherein a natural or a synthetic antioxidant is combined with the pyrolysis oil.

Aspect 27. A process for producing chemicals or polymers from plastic waste according to any of Aspects 1-25, wherein an antioxidant is combined with the pyrolysis oil, and the antioxidant is: (a) compliant with at least one of the Gulf Cooperation Council Standardization Organization GSO 2231/2012, GSO 839/1997, or GSO 1863/2013 standard; or (b) Halal certified, Kosher certified, or HACCP certified.

Aspect 28. A process for producing chemicals or polymers from plastic waste according to any of Aspects 1-25, wherein a natural antioxidant comprising or selected from a plant-based antioxidant, an animal-based antioxidant, or a bioactive peptide is combined with the pyrolysis oil.

Aspect 29. A process for producing chemicals or polymers from plastic waste according to any of Aspects 1-25, wherein a natural antioxidant is combined with the pyrolysis oil, and the natural antioxidant comprises or is selected from olive plant materials, olive oil, olive leaf extracts, a sesame-based antioxidant, sesamol, sesamin, sesamolin, hydroxytyrosol, tyrosol, caffeic acid, ferulic acid, alkannin, shikonin, carnosic acid, carnosic acid-EDTA, α-tocopherol (TCP), propyl gallate (PG), 1-ascorbic acid 6-palmitate (AP), gallic acid, quercetin, myricetin, catechin, genistein, isoflavones, flavanols, cinnamic acid, hydroxtycinnamic acid, oleuropein, oryzanols, tocols, β-carotene, carotenoids, lycopene, marigold, paprika, bixin, or any combination thereof.

Aspect 30. A process for producing chemicals or polymers from plastic waste according to any of Aspects 1-25, wherein a natural antioxidant is combined with the pyrolysis oil, and the natural antioxidant is derived from olive plant material, olive oil mill waste, ajowan (*Carum copticum*), tinctoria roots, rosemary extract, *Guiera senegalensis*, *Combretum hartmannianum*, *Majorana syriaca*, sesame, *Artmisia scoparia*, *Cinnamomum cassia*, rosemary (*Rosemarinus officinalis*), clove (*Syzygium aromaticum*), cinnamon (*Cinnamomum zeylanicum*), broccoli, citrus, chemlali olive, defatted rice brand, bene hull oil (unsaponifiable matter), oregano, green tea, *Cortex fraxini*, *Polygonum cuspidatum*, marigold, *Capsicum annuum*, and garlic.

Aspect 31. A process for producing chemicals or polymers from plastic waste according to any of Aspects 1-25, wherein a natural antioxidant is combined with the pyrolysis oil, and the natural antioxidant is present at a concentration of ≤2500 mMol antioxidant/kg of pyrolysis oil, ≤1750 mMol/kg of pyrolysis oil, or ≤1000 mMol/kg of pyrolysis oil.

Aspect 32. A process for producing chemicals or polymers from plastic waste according to any of Aspects 1-25, wherein a synthetic antioxidant is combined with the pyrolysis oil, and the synthetic antioxidant comprises or is selected from a hindered phenol, a metal salt of a hindered phenol, an oil-soluble polymetal organic compound, a hindered phenylenediamine compound, or a combination thereof.

Aspect 33. A process for producing chemicals or polymers from plastic waste according to any of Aspects 1-25, wherein a synthetic antioxidant is combined with the pyrolysis oil, and the synthetic antioxidant comprises or is selected from 2-t-butyl-4-heptyl phenol, 2-t-butyl-4-octyl phenol, 2-t-butyl-4-dodecyl phenol, 2,6-di-t-butyl-4-methylphenol, 2,6-di-t-butyl-4-heptyl phenol, 2,6-di-t-butyl-4-dodecyl phenol, 2-methyl-6-t-butyl-4-heptyl phenol, 2-methyl-6-t-butyl-4-dodecyl phenol, 2,6-di-alkyl-phenolic proprionic ester derivatives, 2,2'-bis(4-heptyl-6-t-butyl-phenol), 2,2'-bis(4-octyl-6-t-butyl-phenol), 2,2'-bis(4-dodecyl-6-t-butyl-phenol), 4,4'-bis(2,6-di-t-butyl phenol), 4,4'-methylene-bis (2,6-di-t-butyl phenol), 2-t-butyl-4-methoxyphenol, 3-t-butyl-4-methoxyphenol, propyl gallate, 2-(1,1-dimethylethyl)-1,4-benzenediol, or combinations thereof.

Aspect 34. A process for producing chemicals or polymers from plastic waste according to any of Aspects 1-25, wherein a synthetic antioxidant is combined with the pyrolysis oil, and the synthetic antioxidant comprises or is selected from diphenylamines, phenyl naphthylamines, phenothiazines, imidodibenzyls, diphenyl phenylene diamines, aromatic amines, or combinations thereof.

Aspect 35. A process for producing chemicals or polymers from plastic waste according to any of Aspects 1-25, wherein a synthetic antioxidant is combined with the pyrolysis oil, and the synthetic antioxidant comprises or is selected from p,p'-dioctyldiphenylamine, t-octylphenyl-α-naphthylamine, phenyl-α-naphthylamine, p-octylphenyl-α-naphthylamine, or a combination thereof.

Aspect 36. A process for producing chemicals or polymers from plastic waste according to any of the preceding Aspects, wherein the petroleum-based, fossil fuel-based, or bio-based feed comprises or is selected from petroleum or natural gas liquids, renewable feedstocks, or combinations thereof.

Aspect 37. A process for producing chemicals or polymers from plastic waste according to any of the preceding Aspects, wherein any one or more of the primary processing unit feed, second processing unit feed, tertiary processing unit feed, or subsequent processing unit feed is a circular or a non-circular feed, comprising or selected from a heavy hydrocarbon fraction of petroleum, aromatic hydrocarbons, aliphatic hydrocarbons, hydrogen, naphtha, liquefied petroleum gas (LPG), light ($C_2$-$C_5$) hydrocarbons, a refinery-transfer stream, natural gas liquids, ethylene, propylene, ethane ($C_2$), propane ($C_3$), butane ($C_4$), hexane ($C_6$), octane ($C_8$), decane ($C_{10}$), dodecane ($C_{12}$), propylene-propane mix, ethylene-ethane mix, Normal Alpha Olefins ($C_4$-$C_{30}$+), 1-butene, 1-pentene, 1-hexene, 1-heptene, 1-octene, 1-nonene, 1-decene, 1-dodecene, 1-tetradecene, 1-hexadecene, 1-octadecene, butadiene, benzene, toluene, xylenes, ethylbenzene, styrene, cyclohexane, methylcyclohexane, adipic acid, adiponitrile, hexamethylene diamine (HMDA), caprolactam, 1-dodecene, tetradecene, hexadecane, octadecene, a $C_{20}$-$C_{24}$ normal alpha olefin or polyene, a $C_{24}$-$C_{28}$ normal alpha olefin or polyene, or a $C_{30+}$ normal alpha olefin or polyene.

Aspect 38. A process for producing chemicals or polymers from plastic waste according to any of the preceding Aspects, wherein:
 (a) the petroleum-based, fossil fuel-based, or bio-based feed comprises natural gas liquids (NGL);
 (b) the primary processing unit is a cracker; and
 (c) the one or more primary processing unit output streams comprise circular ethylene, propylene, benzene, toluene, xylenes, or other aromatics.

Aspect 39. A process for producing chemicals or polymers from plastic waste according to Aspect 38, wherein:
 (d) the one or more secondary processing unit output streams, the one or more tertiary processing unit output streams, or the one or more subsequent processing unit output streams comprise a circular chemical selected independently from xylenes, p-xylene, hydrogen, styrene, ethylbenzene, cyclohexane, nylon, butadiene, rubber, polybutadiene rubber (PBR), styrene-butadiene rubber (SBR), nitrile-butadiene rubber (NBR), polychloroprene rubber (neoprene), Normal Alpha Olefins ($C_4$-$C_{30}$+), 1-butene, 1-pentene, 1-hexene, 1-heptene, 1-octene, 1-nonene, 1-decene, 1-dodecene, 1-tetradecene, 1-hexadecene, 1-octadecene, polyethylene homopolymers and copolymers, polypropylene homopolymers and copolymers, a polyalphaolefin comprising a normal alpha olefin ($C_4$-$C_{30}$+) monomeric unit, a $C_{20}$-$C_{24}$ normal alpha olefin or polyene, a $C_{24}$-$C_{28}$ normal alpha olefin or polyene, a $C_{30+}$ normal alpha olefin or polyene, mixed decenes, mercaptans, organic sulfides, methyl ethyl sulfide (MES), methyl mercaptan (MeSH), dimethyl sulfide (DMS), dimethyl disulfide (DMDS), or betamercaptoethanol, the weight or fraction of which is attributable to the pyrolysis oil or plastic waste is determined by mass balance.

Aspect 40. A process for producing chemicals or polymers from plastic waste according to Aspect 39, further comprising the step of using the circular chemical in the manufacture of synthetic oil, additives for oil, detergents, L-cysteine, mining chemicals, sulfonated asphalt, transformer oils, dielectric fluids, and greases.

Aspect 38. A process for producing chemicals or polymers from plastic waste according to any of Aspects 1-37, wherein:
 (a) the petroleum-based, fossil fuel-based, or bio-based feed comprises natural gas liquids (NGL);
 (b) the primary processing unit is a cracker; and
 (c) the one or more primary processing unit output streams, the one or more secondary processing unit output streams, the one or more tertiary processing unit output streams, or the one or more subsequent processing unit output streams comprise or are selected from circular products as illustrated in FIG. 1.

Aspect 42. A process for producing chemicals or polymers from plastic waste according to any of Aspects 1-37, wherein:
 (a) the petroleum-based, fossil fuel-based, or bio-based feed comprises natural gas liquids (NGL);
 (b) the primary processing unit is a cracker; and
 (c) the one or more primary processing unit output streams comprise circular ethylene or propylene.

Aspect 43. A process for producing chemicals or polymers from plastic waste according to Aspect 42, wherein:
 (d) the one or more secondary processing unit output streams, the one or more tertiary processing unit output streams, or the one or more subsequent processing unit output streams comprise a circular chemical selected independently from polyethylene homopolymers and copolymers, polypropylene homopolymers and copolymers, butadiene, butadiene feedstock (BDFS), Normal Alpha Olefins ($C_4$-$C_{30}$+), 1-butene, 1-pentene, 1-hexene, 1-heptene, 1-octene, 1-nonene, 1-decene, 1-dodecene, 1-tetradecene, 1-hexadecene, 1-octadecene, a polyalphaolefin comprising a normal alpha olefin ($C_4$-$C_{30}$+) monomeric unit, the weight or fraction of which is attributable to the pyrolysis oil or plastic waste is determined by mass balance.

Aspect 44 A process for producing chemicals or polymers from plastic waste according to Aspect 43, further comprising the step of using the circular chemical in the manufacture of a commercial product.

Aspect 45. A process for producing chemicals or polymers from plastic waste according to any of Aspects 1-37, wherein:
(a) the petroleum-based, fossil fuel-based, or bio-based feed comprises natural gas liquids (NGL);
(b) the primary processing unit is a cracker; and
(c) the one or more primary processing unit output streams, the one or more secondary processing unit output streams, the one or more tertiary processing unit output streams, or the one or more subsequent processing unit output streams comprise or are selected from circular products as illustrated in FIG. 2.

Aspect 46. A process for producing chemicals or polymers from plastic waste according to any of Aspects 1-37, wherein any one or more of the primary, secondary, tertiary, or subsequent processing unit output streams comprises circular Normal Alpha Olefins ($C_4$-$C_{30}$+), the weight or fraction of which is attributable to the pyrolysis oil or plastic waste is determined by mass balance.

Aspect 47. A process for producing chemicals or polymers from plastic waste according to any of Aspects 1-37, wherein any one or more of the primary, secondary, tertiary, or subsequent processing unit output streams comprises circular 1-butene, 1-pentene, 1-hexene, 1-heptene, 1-octene, 1-nonene, 1-decene, 1-dodecene, 1-tetradecene, 1-hexadecene, 1-octadecene and combinations thereof, the weight or fraction of which is attributable to the pyrolysis oil or plastic waste is determined by mass balance.

Aspect 48. A process for producing chemicals or polymers from plastic waste according to any of Aspects 1-37, wherein any one or more of the primary, secondary, tertiary, or subsequent processing unit output streams comprises circular polyalphaolefins, the weight or fraction of which is attributable to the pyrolysis oil or plastic waste is determined by mass balance.

Aspect 49. A process for producing chemicals or polymers from plastic waste according to any of Aspects 1-37, wherein any one or more of the primary, secondary, tertiary, or subsequent processing unit output streams comprises circular hydrogen, drilling fluids, waxes, aromatic compounds, butadiene, sulfolene, sulfolane, rubber, sulfur compounds (e.g, methyl ethyl sulfide (MES), methyl mercaptan (MeSH), dimethyl sulfide, dimethyl disulfide), sulfonated asphalt (SAS), the weight or fraction of which is attributable to the pyrolysis oil or plastic waste is determined by mass balance.

Aspect 50. A process for producing chemicals or polymers from plastic waste according to any of the preceding Aspects, wherein at least one circular product comprises or is selected from normal alpha olefins ($C_4$-$C_{30}$+), ethane, propane, butane, hexane, octane, decane, dodecane, ethylene, propylene, 1-butene, 2-butene, 1-hexene, 1-pentene, 1-hexene, 1-heptene, 1-octene, 1-nonene, 1-decene, 1-dodecene, 1-tetradecene, 1-hexadecene, 1-octadecene, acetylene, hydrogen, isoprene, debutanized aromatic concentrate, amylene, benzene toluene xylenes stream, ethylene-rich gas, propane propylene mix, dicyclopentadiene, propylene in polypropylene mix, polyethylene homopolymers, polyethylene copolymers, ethylene-ionomer copolymers, ethylene-propylene elastomers, chlorosulfonated polyethylene, polypropylene homopolymers, polypropylene copolymers, polyalphaolefin, poly(1-butene) polymers and copolymers, poly(1-pentene) polymers and copolymers, poly(1-hexene) polymers and copolymers, poly(1-heptene) polymers and copolymers, poly(1-octene) polymers and copolymers, poly(1-nonene) polymers and copolymers, poly(1-decene) polymers and copolymers, poly(1-dodecene) polymers and copolymers, poly(1-tetradecene) polymers and copolymers, poly(1-hexadecene) polymers and copolymers, poly(1-octadecene) polymers and copolymers, vinyl chloride, ethylbenzene, acetaldehyde, vinyl acetate, poly(vinyl acetate) homopolymers, poly(vinyl acetate) copolymers, poly(vinyl chloride) homopolymers, poly(vinyl chloride) copolymers, vinyl chloride-vinyl acetate copolymers, 1,1,2-trichloroethane, vinylidene chloride, polyvinylidene chloride, ethylene oxide, ethylene glycol, poly(ethylene terephthalate), polyethylene glycol-polyalkylene glycol copolymers, ethoxylated phenols, ethoxylated amines, diethylene glycol, polyesters, unsaturated polyester, polyester polyols, adipic acid, polyurethane resins, hydroxyethyl starch, hydroxyethyl gums, hydroxyethyl cellulose, ethylbenzene, styrene, divinylbenzene, polystyrene, styrene-butadiene copolymers, acrylonitrile-butadiene-styrene terpolymers, styrene-acrylonitrile copolymers, polyester resins, styrene-divinylbenzene resin, styrene-alkyd copolymers, styrene-maleic anhydride copolymers, acetaldehyde, pentaerythritol, alkyd resins, acetic acid, ethylene-vinyl acetate copolymers, vinyl chloride-vinyl acetate copolymers, poly(vinyl alcohol), poly(vinyl butyral), poly(vinyl formal), acrylonitrile, propylene oxide, cumene, n-butyraldehyde, isobutyraldehyde, allyl chloride, acrylic acid esters, methyl alcohol, ethyl alcohol, isopropyl alcohol, acrylonitrile, polyacrylonitrile, modacrylic copolymers, acrylonitrile butadiene styrene (ABS), styrene acrylonitrile resin (SAN), nitrile elastomers, acrylonitrile copolymers, hexamethylene diamine, nylon 6,6, acrylamide, polyacrylamide homopolymers, polyacrylamide copolymers, propylene oxide, propylene glycol, poly(ethylene glycol) homopolymers, poly(ethylene glycol) copolymers, poly(propylene glycol) homopolymers, poly(propylene glycol) copolymers, n-butyraldehyde, poly(vinyl butyral), n-butyric acid, n-butyric anhydride, cellulose acetate butyrate, isobutyraldehyde, neopentyl glycol, polyurethanes, allyl chloride, epichlorohydrin epoxy resins, acrylic acid esters, acrylic homopolymers and copolymers, isopropyl alcohol, acetone, bisphenol A, epoxy resins, polycarbonates, polysulfones, methyl acrylate, methyl methacrylate, methacrylic acid, poly(methyl methacrylate) homopolymers, poly(methyl methacrylate) copolymers, poly(methacrylate) homopolymers, poly(methacrylate) copolymers, mixed butenes and butane, maleic anhydride, butylene oxide, 1-butene, mixed butenes, isobutene, butane, butadiene, styrene, polybutadiene elastomer, polybutadiene resins, hexamethylene diamine, nylons, chloroprene, neoprene elastomer, 1,5-cyclooctadiene, ethylene-propylene terpolymer elastomer, 1,5,9-cyclododecatriene, dodecanoic acid, nylon 6,12, qiana, lauryl lactam, nylon 12, OH-terminated polymers and copolymers, polyurethane elastomers, 1,4-hexadiene, maleic anhydride, alkyd resins, styrene-maleic anhydride copolymer, butylene oxide, poly(butylene oxide) polyurethanes, mixed butenes, isobutene, poly(butenes), poly(isobutene), butyl rubber, acetic acid, drilling fluids, waxes, aromatic compounds, butadiene, sulfolene, sulfolane, rubbers, methyl ethyl sulfide (MES), methyl mercaptan (MeSH), dimethyl sulfide, dimethyl disulfide, sulfonated asphalt (SAS), benzene, ethylbenzene, benzenesulfonic acid, chlorobenzene, cyclohexane, nitrobenzene, dinitrobenzene, maleic anhydride, toluene, dinitrotoluenes, toluene diisocyanate, urethanes, styrene, benzenesulfonic acid chlorobenzene, phenol, phenolic resins, 2,6-xylenol, poly(phenylene oxide), phenylene oxide, o-xylene, m-xylene, or p-xylene, acetone, cyclohexane, adipic acid, nylon 66, polyurethanes, caprolactam, nylon 6, nitrobenzene, aniline, polymeric isocyanates, urethanes, xylenes, o-xylene, phthalic anhydride, alkyd resins, urethanes, polyurethanes, m-xylene, isophthalic acid, alkyd resins, polyamide resins, diphenyl isophthalate, polybenzimidazoles, p-xylene, terephthalic acid, poly(ethylene terephthalate), poly(butylene terephthalate), methane, formaldehyde, carbon dioxide, carbon disulfide, hydrogen cyanide, methanol, chloroform, acetylene, formaldehyde, urea, urea-formaldehyde resins, melamine-formaldehyde resins, phenol-formaldehyde resins, polyformaldehyde polymers and copolymers (acetal resins), pentaerythritol, alky resins, aniline-formaldehyde resins, butanediol, poly(butylene terephthalate), phosgene, isocyanates, polyurethanes, regenerated cellulose, hydrogen cyanide, hexamethylene diamine, methanol, acetic acid, cellulose acetate, cellulose acetate butyrate, vinyl acetate, poly(vinyl acetate) polymers and copolymers, chloroform, tetrafluoroethylene poly(tetrafluoroethylene), acetylene, acrylate esters, vinyl fluoride, poly(vinyl fluoride), 1,4-butandiol, vinylpyrrolidone, or poly(vinylpyrrolidone), the weight or fraction of which is attributable to the pyrolysis oil or plastic waste is determined by mass balance.

Aspect 51. A process for producing chemicals or polymers from plastic waste according to any of Aspects 1-37, wherein any one or more of the primary, secondary, or tertiary, processing unit output streams comprises circular ethylene; and
  a subsequent processing unit output stream comprises circular polyethylene homopolymers, polyethylene copolymers, ethylene-ionomer copolymers, ethylene-propylene elastomers, chlorosulfonated polyethylene, vinyl chloride, ethylene oxide, ethylbenzene, acetaldehyde, vinyl acetate, or polyvinyl acetate, the weight or fraction of which is attributable to the pyrolysis oil or plastic waste is determined by mass balance.

Aspect 52. A process for producing chemicals or polymers from plastic waste according to any of Aspects 1-37, wherein any one or more of the primary, secondary, or tertiary, processing unit output streams comprises circular vinyl chloride; and
  a subsequent processing unit output stream comprises circular polyvinyl chloride homopolymers, polyvinyl chloride copolymers, vinyl chloride-vinyl acetate copolymers, 1,1,2-trichloroethane, vinylidene chloride, or polyvinylidene chloride, the weight or fraction of which is attributable to the pyrolysis oil or plastic waste is determined by mass balance.

Aspect 53. A process for producing chemicals or polymers from plastic waste according to any of Aspects 1-37, wherein any one or more of the primary, secondary, or tertiary, processing unit output streams comprises circular ethylene oxide; and
  a subsequent processing unit output stream comprises circular ethylene glycol, poly(ethylene terephthalate), polyethylene glycol-polyalkylene glycol copolymers, ethoxylated phenols, ethoxylated amines, diethylene glycol, polyester, unsaturated polyester, polyester polyols, adipic acid, polyurethane resins, hydroxyethyl starch, hydroxyethyl gums, or hydroxyethyl cellulose, the weight or fraction of which is attributable to the pyrolysis oil or plastic waste is determined by mass balance.

Aspect 54. A process for producing chemicals or polymers from plastic waste according to any of Aspects 1-37, wherein any one or more of the primary, secondary, or tertiary, processing unit output streams comprises circular ethylbenzene; and
  a subsequent processing unit output stream comprises circular styrene, polystyrene, styrene-butadiene copolymers, acrylonitrile-butadiene-styrene terpolymers, styrene-acrylonitrile copolymers, polyester resins, styrene-divinylbenzene resin, styrene-alkyd copolymers, or styrene-maleic anhydride copolymers, the weight or fraction of which is attributable to the pyrolysis oil or plastic waste is determined by mass balance.

Aspect 55. A process for producing chemicals or polymers from plastic waste according to any of Aspects 1-37, wherein any one or more of the primary, secondary, or tertiary, processing unit output streams comprises circular acetaldehyde; and
  a subsequent processing unit output stream comprises circular pentaerythritol, alkyd resins, or acetic acid, the weight or fraction of which is attributable to the pyrolysis oil or plastic waste is determined by mass balance.

Aspect 56. A process for producing chemicals or polymers from plastic waste according to any of Aspects 1-37, wherein any one or more of the primary, secondary, or tertiary, processing unit output streams comprises circular vinyl acetate; and
  a subsequent processing unit output stream comprises circular poly(vinyl acetate), poly(vinyl acetate) copolymers, ethylene-vinyl acetate copolymers, vinyl chloride-vinyl acetate copolymers, the weight or fraction of which is attributable to the pyrolysis oil or plastic waste is determined by mass balance.

Aspect 57. A process for producing chemicals or polymers from plastic waste according to any of the Aspects 1-37, wherein any one or more of the primary, secondary, or tertiary, processing unit output streams comprises circular poly(vinyl acetate); and
  a subsequent processing unit output stream comprises circular poly(vinyl alcohol), poly(vinyl butyral), poly(vinyl formal), the weight or fraction of which is attributable to the pyrolysis oil or plastic waste is determined by mass balance.

Aspect 58. A process for producing chemicals or polymers from plastic waste according to any of Aspects 1-37, wherein any one or more of the primary, secondary, or tertiary, processing unit output streams comprises circular propylene; and
  a subsequent processing unit output stream comprises circular polypropylene homopolymers, polypropylene copolymers, acrylonitrile, propylene oxide, cumene, n-butyraldehyde, isobutyraldehyde, allyl chloride, acrylic acid esters, or isopropyl alcohol, the weight or fraction of which is attributable to the pyrolysis oil or plastic waste is determined by mass balance.

Aspect 59. A process for producing chemicals or polymers from plastic waste according to any of Aspects 1-37, wherein any one or more of the primary, secondary, or tertiary, processing unit output streams comprises circular acrylonitrile; and
  a subsequent processing unit output stream comprises circular polyacrylonitrile, modacrylic copolymers, acrylonitrile butadiene styrene (ABS), styrene acrylonitrile resin (SAN), nitrile elastomers, acrylonitrile copolymers, hexamethylene diamine, nylon 6,6, acrylamide, polyacrylamide homopolymers, or polyacrylamide copolymers, the weight or fraction of which is attributable to the pyrolysis oil or plastic waste is determined by mass balance.

Aspect 60. A process for producing chemicals or polymers from plastic waste according to any of Aspects 1-37, wherein any one or more of the primary, secondary, or tertiary, processing unit output streams comprises circular propylene oxide; and
 a subsequent processing unit output stream comprises circular propylene glycol, polyesters, poly(propylene glycols) homopolymers, poly(propylene glycols) copolymers, and polyurethanes, the weight or fraction of which is attributable to the pyrolysis oil or plastic waste is determined by mass balance.

Aspect 61. A process for producing chemicals or polymers from plastic waste according to any of Aspects 1-37, wherein any one or more of the primary, secondary, or tertiary, processing unit output streams comprises circular n-butyraldehyde; and
 a subsequent processing unit output stream comprises circular poly(vinyl butyral), n-butyric acid, n-butyric anhydride, or cellulose acetate butyrate, the weight or fraction of which is attributable to the pyrolysis oil or plastic waste is determined by mass balance.

Aspect 62. A process for producing chemicals or polymers from plastic waste according to any of Aspects 1-37, wherein any one or more of the primary, secondary, or tertiary, processing unit output streams comprises circular isobutyraldehyde; and
 a subsequent processing unit output stream comprises circular neopentyl glycol, polyesters, or polyurethanes, the weight or fraction of which is attributable to the pyrolysis oil or plastic waste is determined by mass balance.

Aspect 63. A process for producing chemicals or polymers from plastic waste according to any of Aspects 1-37, wherein any one or more of the primary, secondary, or tertiary, processing unit output streams comprises circular allyl chloride; and
 a subsequent processing unit output stream comprises circular epichlorohydrin or epoxy resins, the weight or fraction of which is attributable to the pyrolysis oil or plastic waste is determined by mass balance.

Aspect 64. A process for producing chemicals or polymers from plastic waste according to any of Aspects 1-37, wherein any one or more of the primary, secondary, or tertiary, processing unit output streams comprises circular acrylic acid esters; and
 a subsequent processing unit output stream comprises circular acrylic homopolymers and copolymers, the weight or fraction of which is attributable to the pyrolysis oil or plastic waste is determined by mass balance.

Aspect 65. A process for producing chemicals or polymers from plastic waste according to any of Aspects 1-37, wherein any one or more of the primary, secondary, or tertiary, processing unit output streams comprises circular isopropyl alcohol; and
 a subsequent processing unit output stream comprises circular acetone, bisphenol A, epoxy resins, polycarbonates, polysulfones, methacrylic acid, poly(methyl methacrylate) homopolymers or poly(methyl methacrylate) copolymers, the weight or fraction of which is attributable to the pyrolysis oil or plastic waste is determined by mass balance.

Aspect 66. A process for producing chemicals or polymers from plastic waste according to any of Aspects 1-37, wherein any one or more of the primary, secondary, or tertiary, processing unit output streams comprises circular mixed butenes and butane; and
 a subsequent processing unit output stream comprises circular butadiene, maleic anhydride, butylene oxide, 1-butene, mixed butenes, isobutene, or butane, the weight or fraction of which is attributable to the pyrolysis oil or plastic waste is determined by mass balance.

Aspect 67. A process for producing chemicals or polymers from plastic waste according to any of Aspects 1-37, wherein any one or more of the primary, secondary, or tertiary, processing unit output streams comprises circular butadiene; and
 a subsequent processing unit output stream comprises circular styrene, polybutadiene elastomer, polybutadiene resins, hexamethylene diamine, nylons, chloroprene, neoprene elastomer, 1,5-cyclooctadiene, ethylene-propylene terpolymer elastomer, 1,5,9-cyclododecatriene, dodecanoic acid, nylon 6,12, qiana, lauryl lactam, nylon 12, OH-terminated polymers and copolymers, polyurethane elastomers, or 1,4-hexadiene, the weight or fraction of which is attributable to the pyrolysis oil or plastic waste is determined by mass balance.

Aspect 68. A process for producing chemicals or polymers from plastic waste according to any of Aspects 1-37, wherein any one or more of the primary, secondary, or tertiary, processing unit output streams comprises circular maleic anhydride; and
 a subsequent processing unit output stream comprises circular polyesters, alkyd resins, or styrene-maleic anhydride copolymer, the weight or fraction of which is attributable to the pyrolysis oil or plastic waste is determined by mass balance.

Aspect 69. A process for producing chemicals or polymers from plastic waste according to any of Aspects 1-37, wherein any one or more of the primary, secondary, or tertiary, processing unit output streams comprises circular butylene oxide; and
 a subsequent processing unit output stream comprises circular poly(butylene oxide) or polyurethanes, the weight or fraction of which is attributable to the pyrolysis oil or plastic waste is determined by mass balance.

Aspect 70. A process for producing chemicals or polymers from plastic waste according to any of Aspects 1-37, wherein any one or more of the primary, secondary, or tertiary, processing unit output streams comprises circular 1-butene, mixed butenes, or isobutene; and
 a subsequent processing unit output stream comprises circular poly(1-butene), poly(butene), poly(isobutene), or butyl rubber, the weight or fraction of which is attributable to the pyrolysis oil or plastic waste is determined by mass balance.

Aspect 71. A process for producing chemicals or polymers from plastic waste according to any of Aspects 1-37, wherein any one or more of the primary, secondary, or tertiary, processing unit output streams comprises circular butane; and
 a subsequent processing unit output stream comprises circular acetic acid, the weight or fraction of which is attributable to the pyrolysis oil or plastic waste is determined by mass balance.

Aspect 72. A process for producing chemicals or polymers from plastic waste according to any of Aspects 1-37, wherein any one or more of the primary, secondary, or tertiary, processing unit output streams comprises circular benzene; and
 a subsequent processing unit output stream comprises circular ethylbenzene, benzenesulfonic acid, chlorobenzene, cumene, cyclohexane, nitrobenzene, or maleic anhydride, the weight or fraction of which is attributable to the pyrolysis oil or plastic waste is determined by mass balance.

Aspect 73. A process for producing chemicals or polymers from plastic waste according to any of Aspects 1-37, wherein any one or more of the primary, secondary, or tertiary, processing unit output streams comprises circular toluene; and
 a subsequent processing unit output stream comprises circular dinitrotoluenes, toluene diisocyanate, or urethanes, the weight or fraction of which is attributable to the pyrolysis oil or plastic waste is determined by mass balance.

Aspect 74. A process for producing chemicals or polymers from plastic waste according to any of Aspects 1-37, wherein any one or more of the primary, secondary, or tertiary, processing unit output streams comprises circular ethylbenzene; and
 a subsequent processing unit output stream comprises circular styrene, the weight or fraction of which is attributable to the pyrolysis oil or plastic waste is determined by mass balance.

Aspect 75. A process for producing chemicals or polymers from plastic waste according to any of Aspects 1-37, wherein any one or more of the primary, secondary, or tertiary, processing unit output streams comprises circular benzenesulfonic acid chlorobenzene, or cumene; and
 a subsequent processing unit output stream comprises circular phenol, phenolic resins, bisphenol A, 2,6-xylenol, or poly(phenylene oxide), the weight or fraction of which is attributable to the pyrolysis oil or plastic waste is determined by mass balance.

Aspect 76. A process for producing chemicals or polymers from plastic waste according to any of Aspects 1-37, wherein any one or more of the primary, secondary, or tertiary, processing unit output streams comprises circular cumene; and
 a subsequent processing unit output stream comprises circular acetone, methyl methacrylate, poly(methyl methacrylate) polymers and copolymers, or bisphenol A, the weight or fraction of which is attributable to the pyrolysis oil or plastic waste is determined by mass balance.

Aspect 77. A process for producing chemicals or polymers from plastic waste according to any of Aspects 1-37, wherein any one or more of the primary, secondary, or tertiary, processing unit output streams comprises circular cyclohexane; and
 a subsequent processing unit output stream comprises circular adipic acid, nylon 66, polyesters, polyurethanes, caprolactam, or nylon 6, the weight or fraction of which is attributable to the pyrolysis oil or plastic waste is determined by mass balance.

Aspect 78. A process for producing chemicals or polymers from plastic waste according to any of Aspects 1-37, wherein any one or more of the primary, secondary, or tertiary, processing unit output streams comprises circular nitrobenzene; and
 a subsequent processing unit output stream comprises circular aniline, polymeric isocyanates, or urethanes, the weight or fraction of which is attributable to the pyrolysis oil or plastic waste is determined by mass balance.

Aspect 79. A process for producing chemicals or polymers from plastic waste according to any of Aspects 1-37, wherein any one or more of the primary, secondary, or tertiary, processing unit output streams comprises circular xylenes; and
 a subsequent processing unit output stream comprises circular o-xylene, m-xylene, or p-xylene, the weight or fraction of which is attributable to the pyrolysis oil or plastic waste is determined by mass balance.

Aspect 80. A process for producing chemicals or polymers from plastic waste according to any of Aspects 1-37, wherein any one or more of the primary, secondary, or tertiary, processing unit output streams comprises circular o-xylene; and
 a subsequent processing unit output stream comprises circular phthalic anhydride, alkyd resins, polyester resins, polyester polyols, urethanes, or polyurethanes, the weight or fraction of which is attributable to the pyrolysis oil or plastic waste is determined by mass balance.

Aspect 81. A process for producing chemicals or polymers from plastic waste according to any of Aspects 1-37, wherein any one or more of the primary, secondary, or tertiary, processing unit output streams comprises circular m-xylene; and
 a subsequent processing unit output stream comprises circular isophthalic acid, polyesters, alkyd resins, polyamide resins, diphenyl isophthalate, or polybenzimidazoles, the weight or fraction of which is attributable to the pyrolysis oil or plastic waste is determined by mass balance.

Aspect 82. A process for producing chemicals or polymers from plastic waste according to any of Aspects 1-37, wherein any one or more of the primary, secondary, or tertiary, processing unit output streams comprises circular p-xylene; and
 a subsequent processing unit output stream comprises circular terephthalic acid, poly(ethylene terephthalate), or poly(butylene terephthalate), the weight or fraction of which is attributable to the pyrolysis oil or plastic waste is determined by mass balance.

Aspect 83. A process for producing chemicals or polymers from plastic waste according to any of Aspects 1-37, wherein any one or more of the primary, secondary, or tertiary, processing unit output streams comprises circular methane; and
 a subsequent processing unit output stream comprises circular formaldehyde, phosgene, carbon dioxide, carbon disulfide, hydrogen cyanide, methanol, chloroform, or acetylene, the weight or fraction of which is attributable to the pyrolysis oil or plastic waste is determined by mass balance.

Aspect 84. A process for producing chemicals or polymers from plastic waste according to any of Aspects 1-37, wherein any one or more of the primary, secondary, or tertiary, processing unit output streams comprises circular formaldehyde; and
 a subsequent processing unit output stream comprises circular urea-formaldehyde resins, melamine-formaldehyde resins, phenol-formaldehyde resins, polyformaldehyde polymers and copolymers (acetal resins), pentaerythritol, alky resins, aniline-formaldehyde resins, butanediol, or poly(butylene terephthalate), the weight or fraction of which is attributable to the pyrolysis oil or plastic waste is determined by mass balance.

Aspect 85. A process for producing chemicals or polymers from plastic waste according to any of Aspects 1-37, wherein any one or more of the primary, secondary, or tertiary, processing unit output streams comprises circular phosgene; and a subsequent processing unit output stream comprises circular isocyanates, polyurethanes, or polycarbonates, the weight or fraction of which is attributable to the pyrolysis oil or plastic waste is determined by mass balance.

Aspect 86. A process for producing chemicals or polymers from plastic waste according to any of Aspects 1-37, wherein any one or more of the primary, secondary, or tertiary, processing unit output streams comprises circular carbon dioxide; and
a subsequent processing unit output stream comprises circular urea or urea-formaldehyde resins, the weight or fraction of which is attributable to the pyrolysis oil or plastic waste is determined by mass balance.

Aspect 87. A process for producing chemicals or polymers from plastic waste according to any of Aspects 1-37, wherein any one or more of the primary, secondary, or tertiary, processing unit output streams comprises circular carbon disulfide; and
a subsequent processing unit output stream comprises circular regenerated cellulose, the weight or fraction of which is attributable to the pyrolysis oil or plastic waste is determined by mass balance.

Aspect 88. A process for producing chemicals or polymers from plastic waste according to any of Aspects 1-37, wherein any one or more of the primary, secondary, or tertiary, processing unit output streams comprises circular hydrogen cyanide; and
a subsequent processing unit output stream comprises circular methyl methacrylate, poly(methyl methacrylate), hexamethylene diamine, or nylons, the weight or fraction of which is attributable to the pyrolysis oil or plastic waste is determined by mass balance.

Aspect 89. A process for producing chemicals or polymers from plastic waste according to any of Aspects 1-37, wherein any one or more of the primary, secondary, or tertiary, processing unit output streams comprises circular methanol; and
a subsequent processing unit output stream comprises circular acetic acid, cellulose acetate, cellulose acetate butyrate, vinyl acetate, or poly(vinyl acetate) polymers and copolymers, the weight or fraction of which is attributable to the pyrolysis oil or plastic waste is determined by mass balance.

Aspect 90. A process for producing chemicals or polymers from plastic waste according to any of Aspects 1-37, wherein any one or more of the primary, secondary, or tertiary, processing unit output streams comprises circular chloroform; and
a subsequent processing unit output stream comprises circular tetrafluoroethylene or poly(tetrafluoroethylene), the weight or fraction of which is attributable to the pyrolysis oil or plastic waste is determined by mass balance.

Aspect 91. A process for producing chemicals or polymers from plastic waste according to any of Aspects 1-37, wherein any one or more of the primary, secondary, or tertiary, processing unit output streams comprises circular acetylene; and
a subsequent processing unit output stream comprises circular acrylate esters, vinyl fluoride, poly(vinyl fluoride), 1,4-butandiol, poly(butylene terephthalate), vinylpyrrolidone, or poly(vinylpyrrolidone), the weight or fraction of which is attributable to the pyrolysis oil or plastic waste is determined by mass balance.

Aspect 92. A process for producing chemicals or polymers from plastic waste according to any of Aspects 1-37, wherein any one or more of the primary, secondary, or tertiary, processing unit output streams comprises circular 1,3-butadiene; and
a subsequent processing unit output stream comprises circular sulfolane or circular sulfolene, the weight or fraction of which is attributable to the pyrolysis oil or plastic waste is determined by mass balance.

Aspect 93. A process for producing chemicals or polymers from plastic waste according to any of Aspects 1-37, wherein any one or more of the primary, secondary, or tertiary, processing unit output streams comprises a circular olefin or diene selected from 1-butene, 1-pentene, 1-hexene, 1-heptene, 1-octene, 1-nonene, 1-decene, 1-dodecene, 1-tetradecene, 1-hexadecene, 1-octadecene, 1,3-butadiene, and combinations thereof; and
a subsequent processing unit output stream comprises circular polyethylene comprising the circular olefin or diene, the weight or fraction of which is attributable to the pyrolysis oil or plastic waste is determined by mass balance.

Aspect 94. A process for producing chemicals or polymers from plastic waste according to any of Aspects 1-37, wherein any one or more of the primary, secondary, or tertiary, processing unit output streams comprises circular heptane; and
a subsequent processing unit output stream comprises circular sulfonated asphalt (SAS), the weight or fraction of which is attributable to the pyrolysis oil or plastic waste is determined by mass balance.

Aspect 95. A process for producing chemicals or polymers from plastic waste according to any of Aspects 1-37, wherein any one or more of the primary, secondary, or tertiary, processing unit output streams comprises circular MeSH; and
a subsequent processing unit output stream comprises circular L-cysteine, the weight or fraction of which is attributable to the pyrolysis oil or plastic waste is determined by mass balance.

Aspect 96. A process for producing chemicals or polymers from plastic waste according to any of Aspects 1-37, wherein any one or more of the primary, secondary, or tertiary, processing unit output streams comprises a circular dimethyl sulfide or dimethyl disulfide, the weight or fraction of which is attributable to the pyrolysis oil or plastic waste is determined by mass balance; and
the circular dimethyl sulfide or dimethyl disulfide is used in mining operations.

Aspect 97. A process for producing chemicals or polymers from plastic waste according to any of Aspects 1-37, wherein any one or more of the primary, secondary, or tertiary, processing unit output streams comprises a circular polyalphaolefin, the weight or fraction of which is attributable to the pyrolysis oil or plastic waste is determined by mass balance; and
the circular polyalphaolefin is used in a wind turbine, engine oil (passenger car or heavy-duty diesel), transmission fluid (standard and hybrid vehicle ATF), CVT fluid (continuous variable transmission), axle fluid, industrial gear oil, compressor oil, dielectric fluid (specifically dielectric immersion coolant for computers), hydraulic fluid, industrial gear oil, fiber optic cable filling gel, drilling fluid, oil used in lotions and creams (emollients in cosmetics and toiletries), shampoos, hair care products, greases, gas turbine lubricants, heat transfer fluids, metalworking fluids, textile fluids, bearing oils, gun oils (including CLP— clean lube protect—oils), as a component to be combined with vegetable oils to produce hydraulic fluids and other bio-based lubricants, or as viscosity modifiers and other thickeners.

Aspect 3. A process for producing chemicals or polymers from plastic waste according to any of the preceding Aspects, wherein the primary, the secondary, the tertiary, or subsequent processing units comprise or are selected independently from a refinery crude unit, an atmospheric distillation unit, a vacuum distillation unit, a separation unit, a hydroprocessing unit, a fluid catalytic cracking (FCC) unit, an FCC pre-treating unit upstream of a fluid catalytic cracking (FCC) unit, a steam cracking unit (liquid or gas), a natural gas liquids (NGL) unit, a reforming (aromatics) unit, an alkylation reactor, an aromatics purification unit, a polymerization reactor, an olefin oligomerization unit, an isomerization reactor, a metathesis reactor, a hydroformylation unit, a dehydroformylation unit, an oxidation unit, a reduction unit, a nitration unit, an amination unit, a nitrile unit, an amidation unit, a hydrogenation unit, a Fischer-Tropsch reactor, a methanol-to-olefins reactor, an alkylation unit, a catalytic dehydrogenation unit, a polyester unit, a polyamide unit, or a combination thereof.

Aspect 99. A process for producing chemicals or polymers from plastic waste according to any of Aspects 1-37, wherein one of the primary, the secondary, the tertiary, or subsequent processing units is a refinery crude unit.

Aspect 100. A process for producing chemicals or polymers from plastic waste according to any of Aspects 1-37, wherein: (a) one of the primary, the secondary, the tertiary, or subsequent processing units is a refinery crude unit; and (b) one or more of the refinery crude unit output streams comprise circular alkanes, circular naphthenes, circular natural gas liquids, circular light naphtha, circular heavy naphtha, circular gasoline, circular kerosene, circular diesel, or circular fuel oil.

Aspect 101. A process for producing chemicals or polymers from plastic waste according to any of Aspects 1-37, wherein: (a) one of the primary, the secondary, the tertiary, or subsequent processing units is a hydroprocessing unit; and (b) the hydroprocessing unit feed further comprises hydrogen.

Aspect 102. A process for producing chemicals or polymers from plastic waste according to any of Aspects 1-37, wherein: (a) one of the primary, the secondary, the tertiary, or subsequent processing units is a hydroprocessing unit; and (b) the hydroprocessing unit comprises or is selected independently from a hydrocracker, a catalytic cracker operated in hydropyrolysis mode, a fluid catalytic cracker operated in hydropyrolysis mode, or a hydrotreater.

Aspect 103. A process for producing chemicals or polymers from plastic waste according to any of Aspects 1-37, wherein: (a) one of the primary, the secondary, the tertiary, or subsequent processing units is hydroprocessing unit; (b) the hydroprocessing unit feed comprises petroleum or a heavy hydrocarbon fraction of petroleum and hydrogen; and (c) one or more of the hydroprocessing unit output streams comprise circular gasoline, circular fuel oil, circular naphtha, or circular olefins.

Aspect 104. A process for producing chemicals or polymers from plastic waste according to any of Aspects 1-37, wherein one of the primary, the secondary, the tertiary, or subsequent processing units is a fluid catalytic cracking (FCC) unit.

Aspect 105. A process for producing chemicals or polymers from plastic waste according to any of Aspects 1-37, wherein: (a) one of the primary, the secondary, the tertiary, or subsequent processing units is a fluid catalytic cracking (FCC) unit; (b) the FCC unit feed comprises a heavy hydrocarbon fraction of petroleum; and (c) one or more of the FCC unit output streams comprise circular gasoline, circular fuel oil, circular naphtha, or circular olefins.

Aspect 106. A process for producing chemicals or polymers from plastic waste according to any of Aspects 1-37, wherein one of the primary, the secondary, the tertiary, or subsequent processing units is an FCC pre-treating unit upstream of a fluid catalytic cracking (FCC) unit.

Aspect 107. A process for producing chemicals or polymers from plastic waste according to any of Aspects 1-37, wherein: (a) one of the primary, the secondary, the tertiary, or subsequent processing units is an FCC pre-treating unit upstream of a fluid catalytic cracking (FCC) unit; (b) the FCC pre-treating unit feed comprises petroleum or a heavy hydrocarbon fraction thereof; and (c) one or more of the FCC pre-treating unit output streams comprise a circular hydrocarbon having a lower sulfur content, a lower aromatic content, or both, as compared with the sulfur content and/or aromatic content in the feed.

Aspect 108. A process for producing chemicals or polymers from plastic waste according to any of Aspects 1-37, wherein one of the primary, the secondary, the tertiary, or subsequent processing units is a steam cracking unit.

Aspect 109. A process for producing chemicals or polymers from plastic waste according to any of Aspects 1-37, wherein: (a) one of the primary, the secondary, the tertiary, or subsequent processing units is a steam cracking unit; (b) the steam cracking unit feed comprises naphtha, liquefied petroleum gas (LPG), or light (C2-C5) hydrocarbons; and (c) one or more of the steam cracking unit output streams comprise circular ethylene, circular propylene, or a combination thereof.

Aspect 110. A process for producing chemicals or polymers from plastic waste according to Aspect 109, wherein the concentration of ethylene and propylene in the one or more steam cracking unit output stream is greater than the concentration of ethylene and propylene in the steam cracking unit feed.

Aspect 111. A process for producing chemicals or polymers from plastic waste according to any of Aspects 1-37, wherein: (a) one of the primary, the secondary, the tertiary, or subsequent processing units is a natural gas liquids (NGL) unit; and (b) the NGL unit feed comprises a refinery-transfer stream.

Aspect 112. A process for producing chemicals or polymers from plastic waste according to any of Aspects 1-37, wherein: (a) one of the primary, the secondary, the tertiary, or subsequent processing units is a natural gas liquids (NGL) unit; and (b) one or more of the NGL unit output streams comprise circular light (C2-C5) hydrocarbons.

Aspect 113. A process for producing chemicals or polymers from plastic waste according to any of Aspects 1-37, wherein: (a) the primary processing unit is a natural gas liquids (NGL) unit; and (b) the primary processing unit output stream comprises circular light (C2-C5) hydrocarbons.

Aspect 114. A process for producing chemicals or polymers from plastic waste according to any of Aspects 1-37, wherein one of the primary, the secondary, the tertiary, or subsequent processing units is a reforming unit.

Aspect 115. A process for producing chemicals or polymers from plastic waste according to any of Aspects 1-37, wherein: (a) the primary processing unit is a reforming unit; and (b) the reforming unit feed comprises pyrolysis oil and naphtha.

Aspect 116. A process for producing chemicals or polymers from plastic waste according to any of Aspects 1-37, wherein: (a) the primary processing unit is a reforming unit; (b) the reforming unit feed comprises pyrolysis oil and naphtha; and (c) the reforming unit output stream comprises circular aromatic hydrocarbons in a higher concentration than is present in the primary processing unit feed.

Aspect 117. A process for producing chemicals or polymers from plastic waste according to Aspect 116, wherein: (a) the secondary processing unit is a separation unit; and (b) the separation unit feed comprises aromatic hydrocarbons, aliphatic hydrocarbons, and hydrogen.

Aspect 118. A process for producing chemicals or polymers from plastic waste according to Aspect 116, wherein: (a) the secondary processing unit is a separation unit; (b) the separation unit feed comprises aromatic hydrocarbons, aliphatic hydrocarbons, and hydrogen; and (c) the separation unit output streams comprise an aromatic hydrocarbon-rich stream, an aliphatic hydrocarbon-rich stream, and wherein at least a portion of the aliphatic hydrocarbon-rich stream is recycled to the reforming unit.

Aspect 119. A process for producing chemicals or polymers from plastic waste according to any of Aspects 1-37, wherein: (a) one of the primary, the secondary, the tertiary, or subsequent processing units is a polymerization reactor; (b) the polymerization reactor feed comprises circular ethylene; and (c) the polymerization output stream comprises circular polyethylene.

Aspect 120. A process for producing chemicals or polymers from plastic waste according to Aspect 119, wherein the polymerization reactor feed further comprises a circular comonomer or a non-circular comonomer.

Aspect 121. A process for producing chemicals or polymers from plastic waste according to any of Aspects 1-37, wherein: (a) one of the primary, the secondary, the tertiary, or subsequent processing units is a polymerization reactor; (b) the polymerization reactor feed comprises circular propylene; and (c) the polymerization output stream comprises circular polypropylene.

Aspect 122. A process for producing chemicals or polymers from plastic waste according to any of Aspects 1-37, wherein:
(a) one of the primary processing units is a refinery crude unit, the refinery crude unit feed comprises petroleum and pyrolysis oil, and the refinery crude unit output stream comprises circular natural gas liquids;
(b) one of the secondary processing units is a natural gas liquids (NGL) unit, wherein the NGL unit feed comprises circular natural gas liquids from the refinery crude unit, and wherein the NGL unit output stream comprises circular light ($C_2$-$C_5$) hydrocarbons; and
(c) one of the tertiary processing units is a steam cracking unit, the steam cracking unit feed comprises circular light ($C_2$-$C_5$) hydrocarbons from the NGL unit, and the steam cracking unit output stream comprises circular light ($C_2$-$C_5$) olefins.

Aspect 123. A process for producing chemicals or polymers from plastic waste according to any of Aspects 1-37, wherein:
(a) one of the primary processing units is a natural gas liquids (NGL) unit, the NGL unit feed comprises natural gas liquids and pyrolysis oil, and the NGL unit output stream comprises circular light ($C_2$-$C_5$) hydrocarbons; and
(b) one of the secondary processing units is a steam cracking unit, the steam cracking unit feed comprises circular light ($C_2$-$C_5$) hydrocarbons from the NGL unit, and the steam cracking unit output stream comprises circular light ($C_2$-$C_5$) olefins.

Aspect 124. A process for producing chemicals or polymers from plastic waste according to any of Aspects 122-123, wherein:
(a) the NGL unit output stream comprises circular ethane ($C_2$); and
(b) the steam cracking unit feed comprises circular ethane ($C_2$), and the steam cracking unit output stream comprises circular ethylene.

Aspect 125. A process for producing chemicals or polymers from plastic waste according to any of Aspects 122-124, wherein:
(c) one of the tertiary processing units is a polymerization unit, the polymerization unit feed comprises circular ethylene from the steam cracking unit, and the polymerization unit output stream comprises circular polyethylene.

Aspect 126. A process for producing chemicals or polymers from plastic waste according to any of Aspects 122-124, wherein:
(c) one of the tertiary processing units is an olefin oligomerization unit, the olefin oligomerization unit feed comprises circular ethylene from the steam cracking unit, and the olefin oligomerization unit output stream comprises $C_4$ to $C_{30}$ normal alpha-olefins.

Aspect 127. A process for producing chemicals or polymers from plastic waste according to Aspect 122-123, wherein:
(a) the NGL unit output stream comprises circular propane ($C_3$); and
(b) the steam cracking unit feed comprises circular propane ($C_3$), and the steam cracking unit output stream comprises circular propylene.

Aspect 128. A process for producing chemicals or polymers from plastic waste according to Aspect 127, wherein:
(c) one of the tertiary processing units is a polymerization unit, the polymerization unit feed comprises circular propylene from the steam cracking unit, and the polymerization unit output stream comprises circular polypropylene.

Aspect 129. A process for producing chemicals or polymers from plastic waste according to any of Aspects 1-37, wherein:
(a) one of the primary processing units is a refinery crude unit, the refinery crude unit feed comprises petroleum and pyrolysis oil, and the refinery crude unit output stream comprises circular naphtha; and
(b) one of the secondary processing units is a reforming unit, the reforming unit feed comprises circular naphtha from the refinery unit, and the reforming unit output stream comprises circular benzene.

Aspect 130. A process for producing chemicals or polymers from plastic waste according to Aspect 129, wherein:
(c) one of the tertiary processing units is an alkylation unit, the alkylation unit feed comprises ethylene from the steam cracking unit and circular benzene from the reforming unit, and the alkylation unit output stream comprises circular ethylbenzene.

Aspect 131. A process for producing chemicals or polymers from plastic waste according to Aspect 130, wherein:
(d) one of the quaternary processing units is a dehydrogenation unit, the alkylation unit feed comprises circular ethylbenzene from the alkylation unit, and the dehydrogenation unit output stream comprises circular styrene.

Aspect 132. A process for producing chemicals or polymers from plastic waste according to Aspect 131, wherein:
- (e) one of the quinary processing units is a polymerization unit, the polymerization unit feed comprises circular styrene from the dehydration unit, and the polymerization unit output stream comprises circular polystyrene.

Aspect 133. A process for producing chemicals or polymers from plastic waste according to any of Aspects 1-37, wherein:
- (a) one of the primary processing units is a refinery crude unit, the refinery crude unit feed comprises petroleum and pyrolysis oil, and two refinery crude unit output streams comprise, independently, [1] circular natural gas liquids, and [2] circular naphtha;
- (b) one of the secondary processing units is a natural gas liquids (NGL) unit, wherein the NGL unit feed comprises circular natural gas liquids from the refinery crude unit, and wherein the NGL unit output stream comprises circular light ($C_2$-$C_5$) hydrocarbons; and
one of the secondary processing units is a reforming unit, wherein the reforming unit feed comprises circular naphtha from the refinery crude unit, and the reforming unit output streams comprise circular benzene;
- (c) one of the tertiary processing units is a steam cracking unit, the steam cracking unit feed comprises circular light ($C_2$-$C_5$) hydrocarbons from the NGL unit, and the steam cracking unit output stream comprises circular ethylene;
- (d) one of the quaternary processing units is an alkylation unit, the alkylation unit feed comprises circular ethylene from the steam cracking unit and circular benzene from the reforming unit, and the alkylation unit output stream comprises circular ethylbenzene; and
- (e) one of the quinary processing units is a dehydrogenation unit, the alkylation unit feed comprises circular ethylbenzene from the alkylation unit, and the dehydrogenation unit output stream comprises circular styrene.

Aspect 134. A process for producing chemicals or polymers from plastic waste according to Aspect 133, wherein:
- (f) one of the senary processing units is a polymerization unit, the polymerization unit feed comprises circular styrene from the dehydration unit, and the polymerization unit output stream comprises circular polystyrene.

Aspect 135. A process for producing chemicals or polymers from plastic waste according to any of Aspects 1-37, wherein:
- (a) one of the primary processing unit is a reforming unit, the reforming unit feed comprises naphtha and pyrolysis oil, and the reforming unit output streams comprise circular benzene; and
- (b) one of the secondary processing unit is a hydrogenation unit, wherein the hydrogenation unit feed comprises circular benzene from the reforming unit and hydrogen, and the hydrogenation unit output stream comprises circular cyclohexane.

Aspect 136. A process for producing chemicals or polymers from plastic waste according to Aspect 135, wherein:
- (c) one of the tertiary processing unit is an oxidation unit, the oxidation unit feed comprises circular cyclohexane, air, and nitric acid, and the oxidation unit output stream comprises circular adipic acid.

Aspect 137. A process for producing chemicals or polymers from plastic waste according to Aspect 136, wherein:
- (d) one of the quaternary processing unit is a nitrile unit, the nitrile unit feed comprises circular adipic acid, and the nitrile unit output stream comprises circular adiponitrile.

Aspect 138. A process for producing chemicals or polymers from plastic waste according to Aspect 137, wherein:
- (e) one of the quinary processing units is a reduction unit, the reduction unit feed comprises circular adiponitrile, and the reduction unit output stream comprises circular hexamethylene diamine (HMDA).

Aspect 139. A process for producing chemicals or polymers from plastic waste according to Aspect 138, wherein:
- (f) one of the senary processing units is a polymerization unit, the polymerization unit feed comprise circular adipic acid and circular hexamethylene diamine (HMDA), and the polymerization unit output stream comprises circular Nylon 6,6.

Aspect 140. A process for producing chemicals or polymers from plastic waste according to Aspect 135, wherein:
- (c) one of the tertiary processing units is an amidation unit, the amidation unit feed comprises circular cyclohexane, and the amidation unit output stream comprises circular caprolactam.

Aspect 141. A process for producing chemicals or polymers from plastic waste according to Aspect 140, wherein:
- (d) one of the quaternary processing units is a polymerization unit, the polymerization unit feed comprise circular caprolactam, and the polymerization unit output stream comprises circular Nylon 6.

Aspect 142. A process for producing chemicals or polymers from plastic waste, the process comprising:
- (a) providing a pyrolysis oil from plastic waste, wherein the pyrolysis oil comprises light ($C_2$-$C_5$) hydrocarbons and heavy ($C_{6+}$) hydrocarbons;
- (b) separating at least a portion of the pyrolysis oil into a pyrolysis gas stream comprising light ($C_2$-$C_5$) hydrocarbons and a pyrolysis liquid stream comprising the heavy ($C_{6+}$) hydrocarbons;
- (c) providing a petroleum-based, fossil fuel-based, or bio-based feed;
- (d) introducing one or more primary processing unit feeds, each comprising independently, [1] the pyrolysis gas stream, the pyrolysis liquid stream, the pyrolysis oil, or any combination thereof, and [2] the petroleum-based, fossil fuel-based, or bio-based feed, each at a known feed rate, into one or more primary processing units, thereby providing one or more primary processing unit feeds, each comprising a portion of the pyrolysis oil in a known concentration; and
- (e) converting the one or more primary processing unit feeds into one or more primary processing unit output streams, a portion of each output stream comprising at least one circular product, wherein the weight or the fraction of each circular product attributable to the pyrolysis oil or plastic waste is determined by mass balance.

Aspect 143. A process for producing chemicals or polymers from plastic waste according to Aspect 142, wherein the process further comprises:
- (f) transferring at least a portion of one, or at least a portion of more than one, of the primary processing unit output streams, each at a known feed rate, into one or more secondary or subsequent processing units, thereby providing one or more secondary or subsequent processing unit feeds, each comprising a circular product in a known concentration; and (g) converting the one or more secondary or subsequent processing unit feeds into one or more secondary or subsequent processing unit output streams, a portion of each output stream comprising at least one circular product, wherein the weight or the fraction of each circular product attributable to the pyrolysis oil or plastic waste is determined by mass balance; and (h) repeating steps (f) and (g) any number of times (0 or more) by:
  [1] transferring at least a portion of one, or at least a portion of more than one, of the secondary or subsequent processing unit output streams, each at a known feed rate, into one or more tertiary or subsequent processing units, thereby providing one or more tertiary or subsequent processing unit feeds, each comprising a circular product in a known concentration; and
  [2] converting the one or more tertiary or subsequent processing unit feeds into one or more tertiary or subsequent processing unit output streams, a portion of each output stream comprising at least one circular product, wherein the weight or the fraction of each circular product attributable to the pyrolysis oil or plastic waste is determined by mass balance.

Aspect 144. A process for producing chemicals or polymers from plastic waste according to Aspect 143, wherein repeating steps (f) and (g) is carried out 0, 1, 2, 3, 4, 5, 6, 7, 8, 9, or 10 times.

Aspect 145. A process for producing chemicals or polymers from plastic waste according to any of Aspects 142-144, wherein the process further comprises:
  (i) certifying any one or more of the products in the primary processing unit output streams, secondary processing unit output streams, or tertiary or subsequent processing unit output streams, as Circular in accordance with International Sustainability and Carbon Certification (ISCC) standards, based upon the weight or fraction of the circular product attributable to the pyrolysis oil or plastic waste determined by mass balance and the free attribution method.

Aspect 146. A process for producing chemicals or polymers from plastic waste according to any of Aspects 143-145, wherein the pyrolysis oil, the pyrolysis gas stream, the pyrolysis liquid stream, or a combination thereof is introduced into one or more of the secondary processing units or one or more of the secondary input streams, thereby providing one or more secondary processing unit feeds comprising a circular product in a known concentration and the pyrolysis oil or a fraction thereof in a known concentration.

Aspect 147. A process for producing chemicals or polymers from plastic waste according to any of Aspects 143-146, wherein the pyrolysis oil, the pyrolysis gas stream, the pyrolysis liquid stream, or a combination thereof is introduced into one or more of the tertiary or subsequent processing units or one or more of the tertiary or subsequent input streams, thereby providing one or more tertiary or subsequent processing unit feeds comprising a circular product in a known concentration and the pyrolysis oil or a fraction thereof in a known concentration.

Aspect 148. A process for producing chemicals or polymers from plastic waste according to any of Aspects 143-147, wherein:
  (a) the primary processing unit is a natural gas liquids (NGL) unit, wherein: [1] the NGL unit feed comprises pyrolysis oil, at least a portion of the pyrolysis gas stream, of both; [2] one or more of the NGL unit output streams comprises light ($C_2$-$C_5$) hydrocarbons in a higher total concentration than is present in the pyrolysis gas stream; and [3] the fraction of light ($C_2$-$C_5$) hydrocarbons attributable to the pyrolysis oil or plastic waste is determined by mass balance; and
  (b) the secondary processing unit is a steam cracker, wherein: [1] the steam cracker feed comprises at least a portion of the NGL unit output stream comprising light ($C_2$-$C_5$) hydrocarbons; [2] the steam cracker product stream comprising ethylene in a higher total concentration than is present in the NGL unit output stream; and [3] the fraction of ethylene attributable to the pyrolysis oil or plastic waste is determined by mass balance.

Aspect 149. A process for producing chemicals or polymers from plastic waste according to any of Aspects 142-148, wherein the primary, the secondary, the tertiary, or subsequent processing units comprise or are selected independently from a refinery crude unit, an atmospheric distillation unit, a vacuum distillation unit, a separation unit, a hydroprocessing unit, a fluid catalytic cracking (FCC) unit, an FCC pre-treating unit upstream of a fluid catalytic cracking (FCC) unit, a steam cracking unit (liquid or gas), a natural gas liquids (NGL) unit, a reforming (aromatics) unit, an alkylation reactor, an aromatics purification unit, a polymerization reactor, an isomerization reactor, a metathesis reactor, a hydroformylation unit, a dehydroformylation unit, an oxidation unit, a reduction unit, a nitration unit, an amination unit, a nitrile unit, an amidation unit, a hydrogenation unit, a Fischer-Tropsch reactor, a methanol-to-olefins reactor, an alkylation unit, a catalytic dehydrogenation unit, a polyester unit, a polyamide unit, or a combination thereof.

Aspect 150. A process for producing chemicals or polymers from plastic waste, the process comprising:
  (a) providing a pyrolysis oil from plastic waste, wherein the pyrolysis oil comprises light ($C_2$-$C_5$) hydrocarbons and heavy ($C_{6+}$) hydrocarbons;
  (b) separating at least a portion of the pyrolysis oil into a pyrolysis gas stream comprising at least a portion of the light ($C_2$-$C_5$) hydrocarbons and a pyrolysis liquid stream comprising at least a portion of the heavy ($C_{6+}$) hydrocarbons;
  (c) feeding at least a portion of the pyrolysis gas stream to a Natural Gas Liquids (NGL) unit to provide an NGL product stream comprising ethane in a higher total concentration than is present in the pyrolysis gas stream, wherein the fraction of ethane attributable to the pyrolysis oil or plastic waste is determined by mass balance;
  (d) feeding at least a portion of the pyrolysis liquid stream to a reforming unit to provide a reforming product stream comprising benzene in a higher concentration than is present in the pyrolysis liquid stream, wherein the fraction of benzene attributable to the pyrolysis oil or plastic waste is determined by mass balance;
  (e) processing the NGL product stream in a steam cracker to provide a steam cracker product stream comprising ethylene in a higher total concentration than is present in the NGL product stream, wherein the fraction of ethylene olefins attributable to the pyrolysis oil or plastic waste is determined by mass balance;
  (f) feeding the steam cracker product stream, the reforming product stream, or both into one or more subsequent processing units to provide one or more corresponding output streams, a fraction of each output stream comprising a circular product, wherein the fraction of the circular product attributable to the pyrolysis oil or plastic waste is determined by mass balance.

Aspect 151. A process for producing chemicals or polymers from plastic waste according to Aspect 150, further comprising the step of:
- (g) certifying the chemical or the polymer as Circular in accordance with International Sustainability and Carbon Certification (ISCC) standards, based upon the weight or fraction of the circular product attributable to the pyrolysis oil or plastic waste determined by mass balance and the free attribution method.

Aspect 152. A process for producing chemicals or polymers from plastic waste according to any of Aspects 150-151, wherein:
- (a) the steam cracker product stream comprising ethylene is fed to a subsequent polymerization unit; and
- (b) the circular product comprises circular polyethylene.

Aspect 153. A process for producing chemicals or polymers from plastic waste, the process comprising:
- (a) providing a pyrolysis oil from plastic waste, wherein the pyrolysis oil comprises light ($C_2$-$C_5$) hydrocarbons and heavy ($C_{6+}$) hydrocarbons;
- (b) providing a petroleum-based, fossil fuel-based, or bio-based feed;
- (c) introducing [1] the pyrolysis oil or a fraction thereof and [2] the petroleum-based, fossil fuel-based, or bio-based feed, each at a known feed rate, into a primary processing unit ($P^1$) as one or more (a) first input streams ($I^{1.1}, \ldots I^{1.a}$, a is an integer), thereby providing a primary processing unit feed ($F^1$) comprising the pyrolysis oil in a known concentration; and
- (d) converting the primary processing unit feed ($F^1$) into one or more (m) primary processing unit output streams ($O^{1.1}, \ldots O^{1.m}$, m is an integer), each output stream comprising at least one circular product, wherein the weight or the fraction of each circular product attributable to the pyrolysis oil or plastic waste is determined by mass balance.

Aspect 154. A process for producing chemicals or polymers from plastic waste according to Aspect 153, wherein the process further comprises:
- (e) transferring at least a portion of one, or at least a portion of more than one, of the primary processing unit output streams ($O^{1.1}, \ldots O^{1.m}$) into one or more (x) secondary processing units ($P^2, \ldots P^{1+x}$, x is an integer) as one or more (b) secondary input streams ($I^{2.1}, \ldots I^{1+x.1}, \ldots$, wherein b is the total number of secondary input streams), thereby providing one or more secondary processing unit feeds ($F^2, \ldots F^{1+x}$), each comprising a circular product in a known concentration; and
- (f) converting the one or more secondary processing unit feeds ($F^2, \ldots F^{1+x}$) into one or more (n) secondary processing unit output streams ($O^{2.1}, \ldots O^{1+x.1}, \ldots$, wherein n is the total number of secondary processing unit output streams), each output stream comprising at least one circular product, wherein the weight or the fraction of each circular product attributable to the pyrolysis oil or plastic waste is determined by mass balance.

Aspect 155. A process for producing chemicals or polymers from plastic waste according to Aspect 154, wherein the process further comprises:
- (g) transferring at least a portion of one, or at least a portion of more than one, of the secondary processing unit output streams ($O^{2.1}, \ldots O^{1+x.1}, \ldots$) into one or more (y) tertiary processing units ($P^{2+x}, \ldots P^{2+x+y}$, y is an integer) as one or more (c) tertiary input streams ($I^{3.1}, \ldots I^{1+x+y.1}, \ldots$, wherein c is the total number of tertiary input streams), thereby providing one or more tertiary processing unit feeds ($F^{2+x}, \ldots F^{2+x+y}$), each comprising a circular product in a known concentration; and
- (h) converting the one or more tertiary processing unit feeds ($F^{2+x}, \ldots F^{2+x+y}$) into one or more (p) tertiary processing unit output streams ($O^{2+x.1}, \ldots O^{2+x+y.1}, \ldots$, wherein p is the total number of tertiary processing unit output streams), each output stream comprising at least one circular product, wherein the weight or the fraction of each circular product attributable to the pyrolysis oil or plastic waste is determined by mass balance.

Aspect 156. A process for producing chemicals or polymers from plastic waste according to any of Aspects 153-155, wherein the process further comprises:
- (i) certifying any one or more of the primary processing unit output streams ($O^{1.1}, \ldots O^{1.m}$), one or more of the secondary processing unit output streams ($O^{2.1}, \ldots O^{1+x.1}$, or one or more of the tertiary processing unit output streams ($O^{2+x.1}, \ldots O^{2+x+y.1}, \ldots$) as Circular in accordance with International Sustainability and Carbon Certification (ISCC) standards, based upon the weight or fraction of the circular product attributable to the pyrolysis oil or plastic waste determined by mass balance and the free attribution method.

Aspect 157. A process for producing chemicals or polymers from plastic waste according to any of Aspects 153-156, wherein the pyrolysis oil is introduced into the primary processing unit by:
- (a) combining the pyrolysis oil and the petroleum-based, fossil fuel-based, or bio-based feed prior to introducing the pyrolysis oil and the petroleum-based, fossil fuel-based, or bio-based feed into the primary processing unit;
- (b) introducing the pyrolysis oil directly into the primary processing unit; or
- (c) a combination of (a) and (b).

Aspect 158. A process for producing chemicals or polymers from plastic waste according to any of Aspects 153-157, wherein the pyrolysis oil is not separated into light (C2-C5) hydrocarbons and heavy (C6+) hydrocarbons prior to introducing the pyrolysis oil into the primary processing unit (P1).

Aspect 159. A process for producing chemicals or polymers from plastic waste according to any of Aspects 153-157, wherein the pyrolysis oil is separated into the light ($C_2$-$C_5$) hydrocarbons and heavy ($C_{6+}$) hydrocarbons prior to introducing the pyrolysis oil into the primary processing unit ($P^1$), and one of the light ($C_2$-$C_5$) hydrocarbons or the heavy ($C_{6+}$) hydrocarbons is introduced the pyrolysis oil into the primary processing unit ($P^1$).

Aspect 160. A process for producing chemicals or polymers from plastic waste according to any of Aspects 154-159, wherein the pyrolysis oil comprising light ($C_2$-$C_5$) hydrocarbons and heavy ($C_{6+}$) hydrocarbons is introduced into one or more of the secondary processing units ($P^2, \ldots P^{1+x}$) or one or more of the secondary input streams ($I^{2.1}, \ldots I^{1+x.1}, \ldots$), thereby providing one or more secondary processing unit feeds ($F^2, \ldots F^{1+x}$) comprising a circular product in a known concentration and the pyrolysis oil.

Aspect 161. A process for producing chemicals or polymers from plastic waste according to any of Aspects 154-160, wherein the pyrolysis oil comprising light ($C_2$-$C_5$) hydrocarbons and heavy ($C_{6+}$) hydrocarbons is introduced into one or more of the tertiary processing units ($P^{2+x}, \ldots P^{2+x+y}$) or one or more of the tertiary input streams ($I^{3.1}, \ldots I^{1+x+y.1}, \ldots$), thereby providing one or more tertiary processing unit feeds ($F^{2+x}, \ldots F^{2+x+y}$) comprising a circular product in a known concentration and the pyrolysis oil.

Aspect 162. A process for producing chemicals or polymers from plastic waste according to any of Aspects 153-161, wherein the primary, the secondary, the tertiary, or subsequent processing units comprise or are selected independently from a refinery crude unit, an atmospheric distillation unit, a vacuum distillation unit, a separation unit, a hydroprocessing unit, a fluid catalytic cracking (FCC) unit, an FCC pre-treating unit upstream of a fluid catalytic cracking (FCC) unit, a steam cracking unit (liquid or gas), a natural gas liquids (NGL) unit, a reforming (aromatics) unit, an alkylation reactor, an aromatics purification unit, a polymerization reactor, an olefin oligomerization unit, an isomerization reactor, a metathesis reactor, a hydroformylation unit, a dehydroformylation unit, an oxidation unit, a reduction unit, a nitration unit, an amination unit, a nitrile unit, an amidation unit, a hydrogenation unit, a Fischer-Tropsch reactor, a methanol-to-olefins reactor, an alkylation unit, a catalytic dehydrogenation unit, a polyester unit, a polyamide unit, or a combination thereof.

Aspect 163. A process for producing chemicals or polymers from plastic waste according to any of the preceding Aspects, wherein the process further comprises certifying any one or more of the products in the primary processing unit output streams, secondary processing unit output streams, or tertiary or subsequent processing unit output streams, as Circular in accordance with International Sustainability and Carbon Certification (ISCC) standards, based upon the weight or fraction of the circular product attributable to the pyrolysis oil or plastic waste determined by mass balance and the free attribution method.

Aspect 164. A composition comprising a circular chemical or polymer which is certified as circular in accordance with International Sustainability and Carbon Certification (ISCC) standards, wherein the chemical or polymer is produced in accordance with any of the preceding Aspects.

Aspect 165. A composition comprising a circular chemical or polymer which is certified as circular in accordance with International Sustainability and Carbon Certification (ISCC) standards.

Aspect 166. A process for producing chemicals or polymers from plastic waste, the process comprising:
(a) introducing (i) a pyrolysis oil and (ii) a petroleum-based, fossil fuel-based, or bio-based feed, each at a known feed rate, into a processing unit as a processing unit feed, wherein the feed comprises the pyrolysis oil in a known concentration;
(c) converting the processing unit feed into one or more processing unit output streams, a portion of each output stream comprising at least one circular product, wherein the weight or the fraction of each circular product attributable to the pyrolysis oil or plastic waste is determined by mass balance; and
(c) certifying any one or more of the products in the processing unit output streams as Circular in accordance with International Sustainability and Carbon Certification (ISCC) standards, based upon the weight or fraction of the circular product attributable to the pyrolysis oil or plastic waste determined by mass balance and the free attribution method.

We claim:
1. A process for producing chemicals or polymers from plastic waste, the process comprising:
(a) providing a pyrolysis oil from plastic waste;
(b) providing a petroleum-based feed, a fossil fuel-based feed, or a bio-based feed;
(c) introducing the pyrolysis oil and the petroleum-based feed, the fossil fuel-based feed, or the bio-based feed, each at a known feed rate, into a primary processing unit selected from a steam cracker, thereby providing a primary processing unit feed comprising the pyrolysis oil in a known concentration; and
(d) converting the primary processing unit feed into a primary processing unit output stream comprising circular ethylene, wherein the weight or the fraction of the circular ethylene attributable to the pyrolysis oil or plastic waste is determined by mass balance;
(e) transferring the circular ethylene to one or more secondary processing units comprising an olefin oligomerization unit, thereby providing one or more secondary processing unit feeds comprising the circular ethylene in a known concentration; and
(f) converting the one or more secondary processing unit feeds into one or more secondary processing unit output streams comprising at least one circular product selected from a C4-C30+ Normal Alpha Olefin (NAO), wherein the weight or the fraction of each circular product attributable to the pyrolysis oil or plastic waste is determined by mass balance.

2. The process for producing chemicals or polymers from plastic waste according to claim 1, wherein:
at least one circular product in the one or more primary processing unit output streams or the one or more secondary processing unit output streams is certified as Circular in accordance with International Sustainability and Carbon Certification (ISCC) standards, based upon the weight or fraction of the circular product attributable to the pyrolysis oil or plastic waste determined by mass balance and a free attribution method.

3. The process for producing chemicals or polymers from plastic waste according to claim 1, further comprising separating the one or more secondary processing unit output streams into fractions, each comprising a circular product, wherein the weight or the fraction of each circular product attributable to the pyrolysis oil or plastic waste is determined by mass balance.

4. The process for producing chemicals or polymers from plastic waste according to claim 1, wherein the secondary processing unit output stream comprises circular 1-butene, 1-hexene, 1-octene, 1-decene, 1-dodecene, 1-tetradecene, 1-hexadecene, 1-octadecene, or combinations thereof.

5. The process for producing chemicals or polymers from plastic waste according to claim 1, wherein the secondary processing unit output stream comprises circular 1-butene, 1-hexene, or 1-octene.

6. The process for producing chemicals or polymers from plastic waste according to claim 1, wherein the secondary processing unit output stream comprises circular 1-decene or 1-docedene.

7. The process for producing chemicals or polymers from plastic waste according to claim 1, wherein the secondary processing unit output stream comprises a C20-C24 normal alpha olefin.

8. The process for producing chemicals or polymers from plastic waste according to claim 1, wherein the secondary processing unit output stream comprises a C24-C28 normal alpha olefin.

9. The process for producing chemicals or polymers from plastic waste according to claim 1, wherein the secondary processing unit output stream comprises a C30+ normal alpha olefin.

10. The process for producing chemicals or polymers from plastic waste according to claim 1, wherein the primary processing unit output stream further comprises circular propylene.

11. The process for producing chemicals or polymers from plastic waste according to claim 10, wherein the process further comprises separating the circular ethylene and the circular propylene.

12. The process for producing chemicals or polymers from plastic waste according to claim 1, wherein the process further comprises:
(g) transferring at least a portion of the one or more secondary processing unit output streams, each at a known feed rate, into one or more tertiary or subsequent processing units, thereby providing one or more tertiary or subsequent processing unit feeds, each comprising a circular product in a known concentration; and
(h) converting the one or more tertiary or subsequent processing unit feeds into one or more tertiary or subsequent processing unit output streams, a portion of each output stream comprising at least one circular product, wherein the weight or the fraction of each circular product attributable to the pyrolysis oil or plastic waste is determined by mass balance; and
(i) optionally, repeating steps (g) and (h) one or more times by:
[1] transferring at least a portion of the one or more tertiary or subsequent processing unit output streams, each at a known feed rate, into one or more subsequent processing units, thereby providing one or more subsequent processing unit feeds, each comprising a circular product in a known concentration; and
[2] converting the one or more subsequent processing unit feeds into one or more subsequent processing unit output streams, a portion of each output stream comprising at least one circular product, wherein the weight or the fraction of each circular product attributable to the pyrolysis oil or plastic waste is determined by mass balance.

13. The process for producing chemicals or polymers from plastic waste according to claim 12, wherein:
at least one circular product in the one or more secondary processing unit output streams, the one or more tertiary processing unit output streams, or the one or more subsequent processing unit output streams is certified as Circular in accordance with International Sustainability and Carbon Certification (ISCC) standards, based upon the weight or fraction of the circular product attributable to the pyrolysis oil or plastic waste determined by mass balance and a free attribution method.

14. The process for producing chemicals or polymers from plastic waste according to claim 12, wherein repeating steps (g) and (h) is carried out 1, 2, 3, 4, 5, 6, 7, 8, 9, or 10 times.

15. The process for producing chemicals or polymers from plastic waste according to claim 12, wherein the tertiary or subsequent processing unit is an olefin oligomerization unit, and the tertiary or subsequent processing unit output stream comprises an oligomer of the C4-C30+ Normal Alpha Olefin (NAO).

16. The process for producing chemicals or polymers from plastic waste according to claim 15, wherein the tertiary or subsequent processing unit output stream comprises a circular product selected from an oligomer of 1-butene, 1-pentene, 1-hexene, 1-heptene, 1-octene, 1-nonene, 1-decene, 1-dodecene, 1-tetradecene, 1-hexadecene, and 1-octadecene.

17. The process for producing chemicals or polymers from plastic waste according to claim 15, wherein the tertiary or subsequent processing unit output stream comprises a circular product selected from an oligomer of a C20-C24 normal alpha olefin, a C24-C28 normal alpha olefin, or a C30+ normal alpha olefin.

18. The process for producing chemicals or polymers from plastic waste according to claim 12, wherein the tertiary or subsequent processing unit is an olefin polymerization unit, and the tertiary or subsequent processing unit output stream comprises a circular product selected from a polymer of the C4-C30+ Normal Alpha Olefin (NAO).

19. The process for producing chemicals or polymers from plastic waste according to claim 18, wherein the tertiary or subsequent processing unit output stream comprises a circular product selected from a polymer of 1-butene, 1-pentene, 1-hexene, 1-heptene, 1-octene, 1-nonene, 1-decene, 1-dodecene, 1-tetradecene, 1-hexadecene, and 1-octadecene.

20. The process for producing chemicals or polymers from plastic waste according to claim 18, wherein the tertiary or subsequent processing unit output stream comprises a circular product selected from a polymer of a C20-C24 normal alpha olefin, a C24-C28 normal alpha olefin, or a C30+ normal alpha olefin.

21. The process for producing chemicals or polymers from plastic waste according to claim 12, wherein the tertiary or subsequent processing unit is an olefin polymerization unit, the tertiary or subsequent processing unit feed further comprises ethylene, and the tertiary or subsequent processing unit output stream comprises a circular product selected from a co-polymer of ethylene and the C4-C30+ Normal Alpha Olefin (NAO).

22. The process for producing chemicals or polymers from plastic waste according to claim 21, wherein the tertiary or subsequent processing unit output streams comprises a circular product selected from an ethylene co-polymer of 1-butene, 1-pentene, 1-hexene, 1-heptene, 1-octene, 1-nonene, 1-decene, 1-dodecene, 1-tetradecene, 1-hexadecene, and 1-octadecene.

23. The process for producing chemicals or polymers from plastic waste according to claim 21, wherein the tertiary or subsequent processing unit output streams comprises a circular product selected from an ethylene co-polymer of a C20-C24 normal alpha olefin, a C24-C28 normal alpha olefin, or a C30+ normal alpha olefin.

24. The process for producing chemicals or polymers from plastic waste according to claim 12, wherein:
the secondary processing unit output stream comprises circular 1-decene or circular 1-docedene;
the tertiary processing unit is an olefin polymerization reactor, and
the tertiary processing unit output stream comprises a poly-1-decene or a poly-1-dodecene.

25. The process for producing chemicals or polymers from plastic waste according to claim 12, wherein:
the secondary processing unit output stream comprises circular 1-decene or circular 1-docedene;
the tertiary processing unit is an olefin oligomerization reactor, and
the tertiary processing unit output stream comprises a dimer of 1-decene or a dimer of 1-dodecene.

26. A process for producing chemicals or polymers from plastic waste according to claim 1, wherein the petroleum-based feed, the fossil fuel-based feed, or the bio-based feed comprises petroleum or Natural Gas Liquids (NGL), renewable feedstocks, or combinations thereof.

27. A process for producing chemicals or polymers from plastic waste according to claim 1, wherein the petroleum-based feed, the fossil fuel-based feed, or the bio-based feed comprises Natural Gas Liquids (NGL).

28. A process for producing chemicals or polymers from plastic waste according to claim 1, wherein the petroleum-based feed, the fossil fuel-based feed, or the bio-based feed comprises circular or non-circular naphtha.

29. A process for producing chemicals or polymers from plastic waste according to claim 1, wherein a natural or a synthetic antioxidant is combined with the pyrolysis oil.

30. A process for producing chemicals or polymers from plastic waste according to claim 1, wherein a natural antioxidant is combined with the pyrolysis oil in a concentration of ≤2500 mMol antioxidant/kg of pyrolysis oil.

31. A process for producing chemicals or polymers from plastic waste according to claim 1, wherein the pyrolysis oil is characterized by any of the following properties:
 (i) a Pour Point (ASTM D97 or ISO:3016) of less than or equal to about −40° C.;
 (ii) a Kinematic Viscosity (ASTM D445 or ISO:3104) of any one or more of (i) about 3.0 mm2/s or from about 2 cSt to about 20 cSt (100° C.), (ii) 11.0 mm2/s (40° C.), or (iii) about 76.0 mm2/s (0° C.);
 (iii) a Flash point (ISO:2719) of greater than or equal to about 140° C.; or
 (iv) a dielectric breakdown voltage (ASTM D1816) of from about 10 kV/mm to about 60 kV/mm.

32. The process for producing chemicals or polymers from plastic waste according to claim 31, wherein the pyrolysis oil is characterized by any one of the properties (i)-(iv).

33. The process for producing chemicals or polymers from plastic waste according to claim 31, wherein the pyrolysis oil is characterized by any two of the properties (i)-(iv).

34. The process for producing chemicals or polymers from plastic waste according to claim 31, wherein the pyrolysis oil is characterized by any three of the properties (i)-(iv).

35. The process for producing chemicals or polymers from plastic waste according to claim 31, wherein the pyrolysis oil is characterized by all four of the properties (i)-(iv).

36. A process for producing chemicals or polymers from plastic waste according to claim 1, wherein the pyrolysis oil is characterized by any of the following properties:
 (a) a Reid Vapor Pressure, psia @ 100° F. (ASTM-D-5191) of from 5 psia @ 100° F. to 15 psia @ 100° F.;
 (b) an Upper Pour, ° F. (ASTM D-97 or D5950-14) of from 75° F. to 200° F.;
 (c) a sulfur concentration, wt % (ASTM D-4294 or D2622) of from 0.2 wt % to 1.5 wt %;
 (d) a nitrogen concentration, ppm (ASTM D-4629 or D5762) of from 2250 ppm to 4450 ppm;
 (e) a water by dist. concentration, wt % (ASTM D-95) of from 0.1 wt % to 0.9 wt %;
 (f) a sodium concentration, ppm (ASTM D-5185) of from 2.5 ppm to 8.5 ppm;
 (g) a nickel concentration, ppm (ASTM D-5185) of from 1.5 ppm to 10.5 ppm;
 (h) a vanadium concentration, ppm (ASTM D-5185) of from 2.0 ppm to 12.5 ppm;
 (i) an iron concentration, ppm (ASTM D-5185) of from 2.0 ppm to 10.5 ppm;
 (j) a copper concentration, ppm (ASTM D-5185) of from 0.5 ppm to 4.5 ppm;
 (k) a BS&W, vol % (ASTM D-2709) of from 0.1 vol % to 1.0 vol % based on water volume without sediment;
 (l) an Acid Number, mg/KOH/g (ASTM D664) of from 0.01 mg/KOH/g to 2.0 mg/KOH/g;
 (m) a chloride concentration, ppm (UOP 588) of from 22.5 ppm to 100 ppm;
 (n) a Distillation End Point, ° F. (D86 or D2887) of from 600° F. to 1600° F.;
 (o) a Filterable Solids Content, wt % (PR 1826) of from 0.04 wt % to 0.15 wt %;
 (p) a Heptane Insolubles Content, wt % (ASTM D-3279) of from 0.03 wt % to 0.13 wt %;
 (q) a fluoride concentration, ppm (ASTM D-7359) of from the detectable limit to 25 ppm;
 (r) a silicon concentration, ppm (ASTM D-5185) of from the detectable limit to 25 ppm; or
 (s) a phosphorus concentration, ppm (ASTM D-5185) of from the detectable limit to 25 ppm.

37. A process for producing chemicals or polymers from plastic waste, the process comprising:
 (a) providing a pyrolysis oil from plastic waste;
 (b) providing a petroleum-based feed, a fossil fuel-based feed, or a bio-based feed;
 (c) introducing the pyrolysis oil and the petroleum-based feed, the fossil fuel-based feed, or the bio-based feed, each at a known feed rate, into a primary processing unit selected from a steam cracker, thereby providing a primary processing unit feed comprising the pyrolysis oil in a known concentration; and
 (d) converting the primary processing unit feed into a primary processing unit output stream comprising circular ethylene, wherein the weight or the fraction of the circular ethylene attributable to the pyrolysis oil or plastic waste is determined by mass balance;
 (e) transferring the circular ethylene to one or more secondary processing units comprising an olefin oligomerization unit, thereby providing one or more secondary processing unit feeds comprising the circular ethylene in a known concentration;
 (f) converting the one or more secondary processing unit feeds into one or more secondary processing unit output streams comprising at least one circular alpha-olefin selected from 1-butene, 1-hexene, 1-octene, 1-decene, 1-dodecene, 1-tetradecene, 1-hexadecene, 1-octadecene, or combinations thereof, wherein the weight or the fraction of each circular product attributable to the pyrolysis oil or plastic waste is determined by mass balance;
 (g) transferring the circular alpha-olefin to one or more tertiary processing units selected from an olefin polymerization reactor or an olefin oligomerization unit, thereby providing one or more tertiary processing unit feeds, each comprising the circular alpha-olefin in a known concentration; and
 (h) converting the one or more tertiary processing unit feeds into one or more subsequent processing unit output streams comprising at least one circular product selected from a circular alpha-olefin polymer or a circular alpha-olefin oligomer, wherein the weight or the fraction of each circular product attributable to the pyrolysis oil or plastic waste is determined by mass balance.

* * * * *